(12) United States Patent
Kagan

(10) Patent No.: US 7,034,264 B2
(45) Date of Patent: *Apr. 25, 2006

(54) HEATING SYSTEMS AND METHODS UTILIZING HIGH FREQUENCY HARMONICS

(75) Inventor: Valery Kagan, Colchester, VT (US)

(73) Assignee: iTherm Technologies, LP, Merrimack, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/884,851

(22) Filed: Jul. 2, 2004

(65) Prior Publication Data

US 2005/0006380 A1   Jan. 13, 2005

Related U.S. Application Data

(63) Continuation-in-part of application No. 10/612,272, filed on Jul. 2, 2003.

(51) Int. Cl.
   *H05B 6/04*   (2006.01)

(52) U.S. Cl. ...................... 219/661; 219/601; 219/628; 219/635; 219/660; 219/672

(58) Field of Classification Search ................ 219/601, 219/635, 628–630, 660–675, 656; 363/39–41; 323/265–290
   See application file for complete search history.

(56) References Cited

U.S. PATENT DOCUMENTS

| | | | |
|---|---|---|---|
| 1,771,918 A | 7/1930 | Fry | |
| 2,163,993 A | 6/1939 | Dufour | |
| 3,436,641 A | 4/1969 | Biringer | |
| 3,436,642 A | 4/1969 | Segsworth | |
| 3,440,384 A | 4/1969 | Schroeder | 219/10.49 |
| 3,639,782 A | 2/1972 | Lord | 307/252 T |
| 3,708,645 A | 1/1973 | Osborn | 219/10.41 |
| 4,017,701 A | 4/1977 | Mittelmann | 219/10.49 |
| 4,025,864 A | 5/1977 | Kennedy | 321/68 |
| 4,085,300 A | 4/1978 | MacKenzie et al. | |
| 4,151,387 A | 4/1979 | Peters, Jr. | 219/10.49 R |
| 4,211,912 A | 7/1980 | Kiuchi | 219/10.77 |
| 4,277,667 A | 7/1981 | Kiuchi | 219/10.49 R |
| 4,289,946 A | 9/1981 | Yarwood et al. | |
| 4,290,039 A | 9/1981 | Tochizawa | 335/262 |
| 4,355,222 A | 10/1982 | Geithman | 219/10.57 |
| 4,473,732 A | 9/1984 | Payne | 219/10.77 |

(Continued)

FOREIGN PATENT DOCUMENTS

GB            752268         7/1956

(Continued)

OTHER PUBLICATIONS

Stanley Zinn and S.L. Semiatin: "Coil design and fabrication: basic design and modifications," (pp. 32-36), Heat Treating, Jun. 1988.

(Continued)

*Primary Examiner*—Philip H. Leung
(74) *Attorney, Agent, or Firm*—Kudirka & Jobse, LLP

(57) ABSTRACT

Heating systems and methods for inductive heating or a combination of resistive and inductive heating. A heater coil is inductively coupled to an article and a current signal is supplied to the heater coil. The heater coil generates a magnetic flux, based on the applied current signal, for inductively heating the article. Current pulses of a certain profile are used to enhance the rate, intensity and/or power of inductive heating delivered by the heating element or coil and/or to enhance the lifetime or reduce the cost of the inductive heating system.

37 Claims, 43 Drawing Sheets

U.S. PATENT DOCUMENTS

| | | | |
|---|---|---|---|
| 4,589,059 A | 5/1986 | Tanino | 363/49 |
| 4,733,342 A | 3/1988 | Mueller | 363/132 |
| 4,798,926 A | 1/1989 | Sakai | 219/10.43 |
| 4,814,567 A | 3/1989 | DeAngelis | 219/10.51 |
| 5,053,593 A | 10/1991 | Iguchi | 219/10.493 |
| 5,183,985 A | 2/1993 | Sidky et al. | |
| 5,216,215 A | 6/1993 | Walker et al. | 219/10.51 |
| 5,294,769 A | 3/1994 | Nishi et al. | |
| 5,331,127 A | 7/1994 | Chen | 219/661 |
| 5,343,023 A | 8/1994 | Geissler | 219/661 |
| 5,414,247 A | 5/1995 | Geithman et al. | 219/667 |
| 5,444,229 A | 8/1995 | Rudolph et al. | 219/630 |
| 5,789,721 A | 8/1998 | Hayashi et al. | 219/664 |
| 5,847,370 A | 12/1998 | Sluka et al. | |
| 5,854,473 A | 12/1998 | Malnoe | |
| 6,043,635 A | 3/2000 | Downey | 323/282 |
| 6,393,044 B1 | 5/2002 | Fishman | 373/138 |
| 6,405,785 B1 | 6/2002 | Gellert | 164/312 |
| 6,465,990 B1 | 10/2002 | Acatrinei et al. | 323/222 |
| 6,717,118 B1 | 4/2004 | Pilavdzic | 219/601 |
| 6,781,100 B1 | 8/2004 | Pilavdzic | 219/601 |
| 2003/0121908 A1 | 7/2003 | Pilavdzic | 219/630 |

FOREIGN PATENT DOCUMENTS

| | | |
|---|---|---|
| GB | 772424 | 4/1957 |
| JP | 02117088 A | 5/1990 |
| JP | 02117089 A | 5/1990 |
| JP | P2003-136559 A | 5/2003 |
| WO | 03/001850 A1 | 1/2003 |

OTHER PUBLICATIONS

Stanley Zinn and S.L. Semiatin: "Coil design and fabrication: part 2, specialty coils," (pp. 29-41), Heat Treating, Aug. 1988.

Stanley Zinn and S.L. Semiatin: "Coil design and fabrication: part 3, fabrication principles," (pp. 39-41), Heat Treating, Oct. 1988.

Induction Calender Profiler System Control Card Programmers' Manual, PCB version 1.0, Comaintel Inc., 2001.

Induction Calender Profiler System Operator's Manual, Comaintel Inc. 2001.

Invitation to Pay Additional Fees and International Search Report mailed Dec. 13, 2004 in related application PCT/US2004/021533.

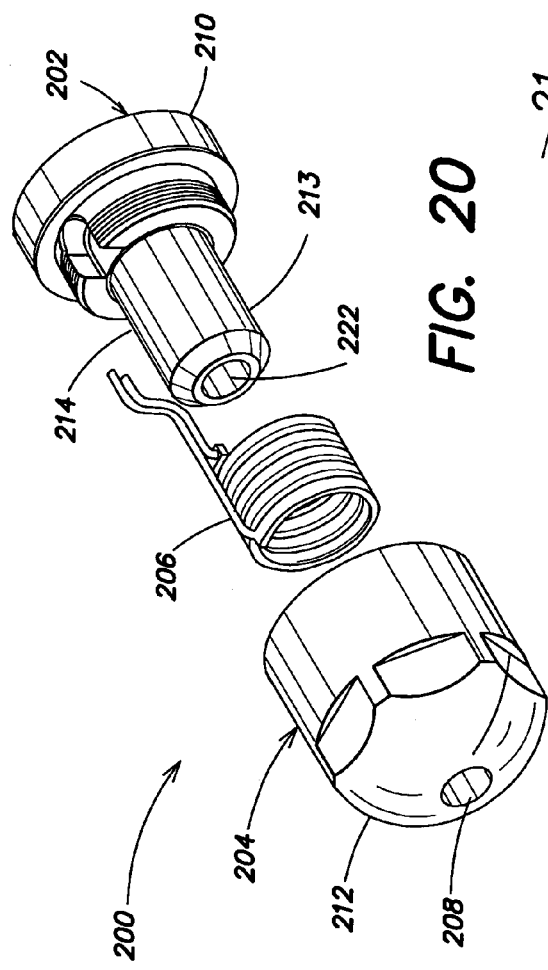
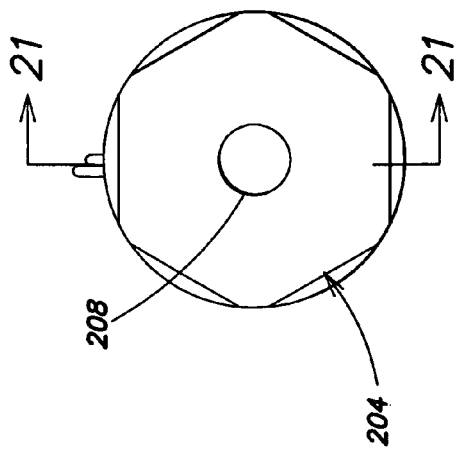
FIG. 20
FIG. 22
FIG. 21

HEATING SYSTEMS AND METHODS UTILIZING HIGH FREQUENCY HARMONICS

RELATED APPLICATION

This is a continuation-in-part of U.S. Ser. No. 10/612,272 filed Jul. 2, 2003, by Valery Kagan entitled "Apparatus and Method for Inductive Heating," from which priority is claimed and which is hereby incorporated by reference in its entirety.

FIELD OF THE INVENTION

This invention relates to heating systems and methods which include, in various implementations, utilizing inductive heating or a combination of resistive and inductive heating; furthermore, the heating may be localized (directed to particular areas), and/or the heating may be continuous or intermittent.

BACKGROUND OF THE INVENTION

It is common practice to inductively heat a cylinder or tube of a ferromagnetic (high magnetic permeability) material, such as steel, by an induction (eddy) current. The eddy current is induced in the ferromagnetic material by an applied magnetic flux, and the magnetic flux is generated by passage of an alternating current through one or more heater coils disposed around the cylinder or tube. This method of inductive heating can be adapted to various other types of materials, work pieces and loads, including fluid, semisolid or solid materials (e.g., molten steel or magnesium filled and non-filled polymers, billets and ceramics).

The article to be heated may itself be heated by an induction current, and/or it may be in thermal communication (e.g., by conduction or radiation) with another article or substrate being inductively heated, for example, when heat inductively generated in a ferromagnetic substrate is transferred to a semiconductor wafer. In this regard, the electrical resistivity of the heating element or coil may be varied, for example using a more resistive material to increase the amount of resistive heat generated in the coil and transferred to the article (by conduction or radiation). Nichrome, a nickel chromimum (NiCr) alloy having about sixty times the electrical resistivity of copper, has been used for the coil to generate both a magnetic flux for inductive heating of an article lying within the flux, and resistive heat (in the coil), which is then transferred by conduction and/or radiation to the same article.

Traditional inductive heating coils are made of copper and are water cooled to prevent overheating of the coil. Also, an air gap is provided between the water-cooled coil and the article being heated, to avoid removal of heat from the article by the coil cooling medium. The air gap and cooling requirements increase the complexity and cost of the heating system. They also reduce the strength (structural integrity) of the apparatus, which can be critical in applications where pressure is applied, e.g., a compression mold. However, without cooling, the coil is subject to failure (melting or burn out at elevated temperatures). Traditional inductive heating systems do not utilize more highly resistive (e.g., NiCr) coils, because the enhanced resistive heating of the coil would make coil cooling even more difficult, requiring still larger cooling channels and/or lower cooling temperatures, each of which results in greater energy consumption and cost. Furthermore, a resistive load cannot be driven by a traditional inductive power supply.

There is an ongoing need for heating systems and methods which address some or all of these problems and/or for energy sources to power such heating systems more efficiently and preferably at a lower cost.

SUMMARY OF THE INVENTION

Systems and methods consistent with the present invention include the following implementations.

According to one implementation, a heating apparatus includes a heater coil inductively coupled to an article and a current signal is supplied to the heater coil. The heater coil generates a magnetic flux, based on the current pulse signal, for inductively heating the article. The current signal is preferably a current pulse signal with high frequency harmonics.

The high frequency harmonics may be used to vary the inductive heating power. The harmonics may enhance a relative proportion of inductive heating, compared to resistive heating, of the heater coil. The high-frequency harmonics may enable use of a lower fundamental (or root) frequency supply current (e.g., line frequency of 50–60 Hz). The effective frequency of the current pulse, based on a combination of the root and harmonic frequency components, and their amplitudes, may enhance the lifetime of the heater coil in particular applications and/or enable more rapid heating of the coil.

In one embodiment, a heater coil is inductively coupled to a load which includes the article. The load includes a ferromagnetic core and ferromagnetic yoke, and the heater coil is in contact With, disposed between, and/or embedded within at least one of the core and yoke. In some cases the core has a passage for a flowable material, such that the core heats the flowable material. The heater coil may be positioned in the core so that heating is concentrated in the passage.

In another implementation, an article forms at least a part of a substantially closed loop for the magnetic flux. The article includes a first portion in which inductive heating is more concentrated, compared to a second portion of the article. The second portion may cause discontinuities in, or restrict the flow of, the eddy current, for example, by having slots, air gaps or a less ferromagnetic material in the second portion.

In another implementation, a power source is provided which supplies a current signal to a heater coil. The current is preferably supplied as current pulses with an adjustable harmonics energy content to the heater coil.

In one embodiment, a heater coil is positioned at least partially within an article having a passage for a flowable material to be heated, and heat generated inductively in the article is delivered by conduction and/or convection to the flowable material in the passage. The power source delivers current pulses which vary in amplitude and/or frequency spectrum (frequencies of the harmonics), to the heater coil for adjusting the delivery of inductive heating to the flowable material in the passage. The flowable material may itself be ferromagnetic such that eddy current are induced in the material (in addition to or instead of in the article).

According to another implementation, a method is provided which includes the steps of providing a heater coil inductively coupled to an article, and providing a current signal to the heater coil. The current signal is preferably a current pulse signal with high frequency harmonics.

According to another implementation, the method steps include providing a heater coil in thermal communication with and inductively coupled to an article, and providing an adjustable current pulse signal to the heater coil for adjusting the ratio between inductive and resistive heating of the article.

According to various implementations, the method steps may include simultaneous, discontinuous, intermittent and/or alternating periods of heating, cooling, and/or temperature control; adjusting the energy content of the current pulse signals with respect to amplitude, pulse width and/or frequency spectrum; and/or providing a cooling mechanism (cooling medium or heat sink) to withdraw heat from the article being heated. Particular structures are disclosed for accomplishing these method steps. Various embodiments of such heating systems and methods may provide one or more benefits such as more uniform heating, reduced thermal gradients, reduced thermal stresses, reliable high temperature operation, compact design, shorter cycle time, and reduced heat-up time.

These and other implementations will be described in the following figures and detailed description.

BRIEF DESCRIPTION OF THE FIGURES

FIG. 20 is an exploded parts view of an injection nozzle assembly with a coiled heater element;

FIG. 21 is a sectional view taken along line 21—21 of FIG. 22;

FIG. 22 is an end view (at the mold end) of the nozzle assembly of FIG. 20;

DETAILED DESCRIPTION

Figure 1A:
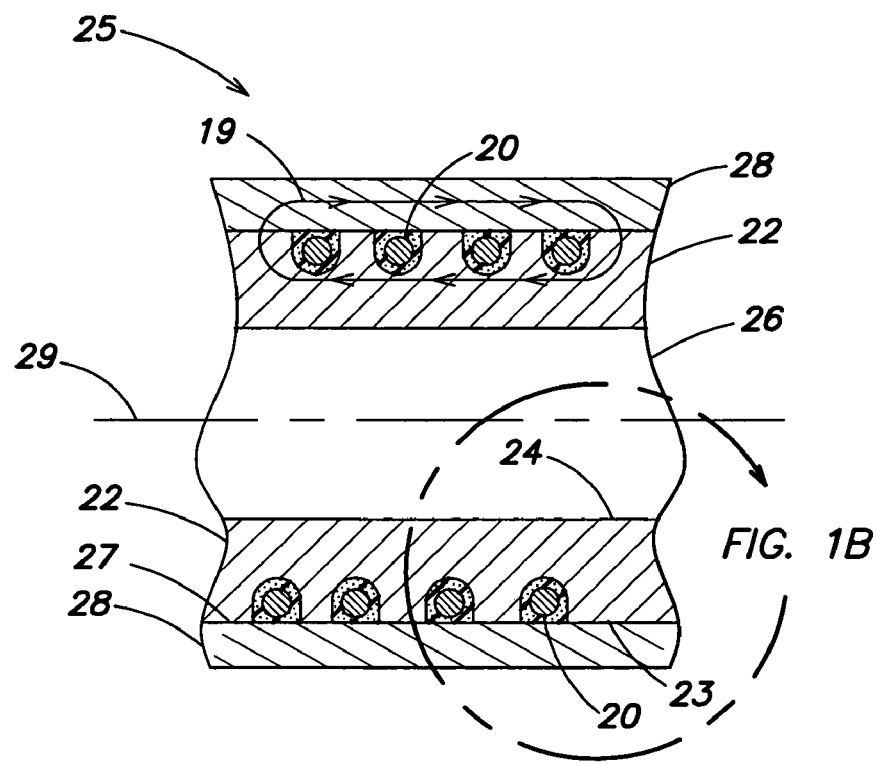
FIG. 1A is a cross-sectional schematic view of one implementation of a heating system for providing both inductive and resistive heating, wherein a wrapped heating coil is embedded between a co-axial inner ferromagnetic core and outer ferromagnetic yoke in order to provide a closed magnetic loop (see arrows) and enhanced magnetic coupling between the coil and core/yoke.
Figure 1B:
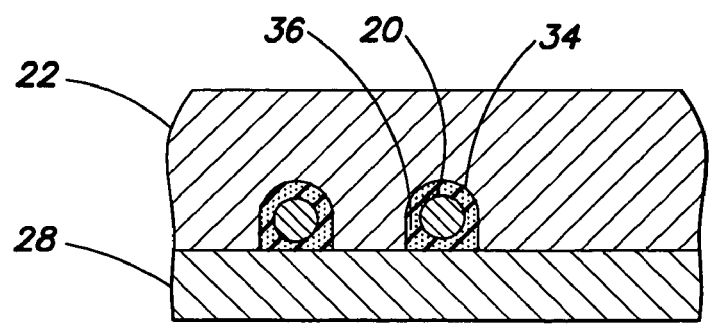
FIG. 1B is an enlarged fragmentary view of encircled section 1B of FIG. 1A, showing the electrically-insulated coil disposed in a groove in the core.

It has been determined that current pulses of a certain profile can be used in various embodiments described herein to enhance the rate, intensity and/or power of inductive heating delivered by a heating element or coil and/or to enhance the lifetime or reduce the cost of an inductive heating system. This may be accomplished, in select embodiments, without requiring a corresponding increase of current in the heater coil. It may also enable use of a lower frequency (e.g., 50–60 Hz) supply current and may be coupled with structural heating and cooling elements that enable directed (localized) heating and cooling effects for producing tighter temperature control or a reduced cycle time.

More specifically, these current pulses have a rapidly changing current profile which enhances the inductive heating performance. The current pulses are discrete narrow width pulses with steep edges (large first derivatives), which include harmonics of a fundamental or root frequency of the coil current. These harmonics, above the root frequency, are described herein as high frequency harmonics, which preferably occur above the border frequency of the heating coil and/or heating system. The provision of such pulses to a heater coil may be used to significantly increase the power inductively delivered to a ferromagnetic or other inductively heated load, without requiring an increase of the Root Mean Square (RMS) current in the coil. This may in turn decrease the energy consumption or cooling requirements of and/or increase the lifetime of the heater coil.

One problem that may be addressed by use of these current pulses, alone or coupled with the structural heating and cooling elements described herein, is the maximum tolerable coil current, or limit current ($I_{C-limit}$) which a heater coil can withstand and still provide a useful lifetime. Thus, for a given $I_{C-limit}$(RMS), number of coil turns N, and coefficient of electromagnetic connection $K_C$, one problem addressed here is how to increase the inductive heating power.

In the prior art, a solution is to increase the frequency of the power supply, in which case powerful capacitors are provided in parallel with the coil as a "resonant converter" to adjust (tightly control) the resonant frequency of the sinusoidal current supplied to the heater coil. One problem with this solution is that the power supply is not adapted to work with a resistive load (resistive coil).

Furthermore, the prior art's use of inductive heating for surface heating requires tight control of the depth of penetration, which in turn requires tight control of the frequency. As a result, harmonics are a disfavored and consequently insignificant (minimized) portion of the current signal supplied to the heater coil. This is consistent with the general disfavor of high frequency harmonics—e.g., when providing sinusoidal 60 Hz line current, the current providers use huge capacitors to rid their systems of harmonics because their customers do not want harmonics, referred to as noise, in the supplied signal interfering with their electrical equipment and computers, and altering the effective frequency.

In contrast here, current pulses are deliberately provided with harmonics above the root frequency of the coil current. These discrete narrow current pulses have steep edges (changes in amplitude) and relatively long delays between pulses. They appear as a chopped or compressed wave with a relatively large delay between pulses in each cycle.

The harmonics provide an increase in the effective frequency of the current pulse signal, particularly where the amplitudes of the harmonics are kept high so that the inductive heating power is high. Viewed with a spectrum analyzer, the current pulses would include multiple current components, at each of multiple harmonic frequencies. It is understood as used herein that current and voltage are interchangeable and equivalent.

Preferably, the harmonics are above the border frequency of the coil or heating system, and the root frequency of the current pulse signal is also preferably above the border frequency (as the root frequency may provide the largest amplitude component of the current pulse signal). The amplitudes of the harmonics may be enhanced, for example, by use of a transformer or the like. Various implementations are described below of systems and methods for configuring the current pulse signals, as well as select applications illustrating their use.

One benefit of this approach can be the provision of a simpler and less costly power supply, compared to the resonant sinusoidal high-frequency power supplies of the prior art inductive heating systems. In such prior art systems, an air gap provided between the heater coil and the inductively heated core constitutes a high magnetic resistance (low permeability) to flux, which produces a high border frequency. To resolve this problem, the prior art systems utilize a high frequency and a high amplitude current signal in a resonant circuit, which is believed to be necessary to overcome the effects of the air gap and enable rapid inductive heating of the core.

In contrast, select embodiments of the present invention provide better magnetic coupling between the coil and the substrate, for example, by eliminating the air gap and more preferably embedding the coil wholly or at least partially in the substrate, and by providing a partially or substantially closed loop for the magnetic flux (a ferromagnetic yoke to close the loop with the core), one or both of which can be used to decrease the border frequency of the system. This reduction of the border frequency can then be advantageously used to provide larger amounts of energy within the harmonic current pulses above the border frequency of the system. This may enable use of a lower (root) frequency current supply and/or without significantly increasing the root mean sequence (RMS) current in the coil.

The desired current pulses are provided, in select embodiments, by a lower cost power supply which includes a pulse generator supplied with a low or line frequency signal. Line frequency is typically defined as the Hertz (Hz) level of power sources generally used or readily available for personal, commercial and industrial users, e.g. 50 or 60 Hz. Various signal generating or switching devices, including thyristors, gate-turn-off (GTO) thyristors, silicon controlled rectifiers (SCR), and integrated gate bipolar transistor (IGBT) devices, can be used as the pulse generator to provide the short current pulses from a line frequency or direct current (DC). The pulsed, nonsinusoidal current signal, does not require a resonant circuit; in fact it is desirable not to provide a resonant circuit so that the high frequency harmonics in the pulses are maintained. The presence of these harmonics can significantly increase the power transferred inductively to the article to be heated.

The desired current pulses may substantially improve the performance of heating systems which utilize either a combination of inductive and resistive heating, or primarily inductive heating. The current pulses may be used in a system with a substantially closed magnetic loop, but they will also improve performance in inductive heaters that do not have a closed magnetic loop. The lack of a closed magnetic loop may occur in a system having an air gap between the heater coil and the substrate, an air gap in any portion of the magnetic loop, or in a system for heating an electrically-conductive, but non-magnetic core or load material.

The following equations illustrate a surprising improvement in performance obtainable in select embodiments with these current pulses. Equation (1a) is used to calculate the expected resistance to the flow of eddy currents ($R_e$) in a ferromagnetic material forming a cylinder; equation (1b) is a comparable equation for a flat plate. Here it is assumed that the cylinder or plate is part of a closed magnetic loop, and a sinusoidal current is applied to a heater coil wrapped around the cylinder, or surface mounted in snake (serpentine) shape on the flat plate, at a frequency above the border frequency. For the cylinder, the equivalent resistance to the flow of eddy currents ($R_e$) is:

$$R_e = \frac{\pi D}{L} \sqrt{\rho \mu \omega} \quad (1a)$$

where
D is the diameter of the cylinder,
L is the length of the cylinder,
ρ is the resistivity of the cylinder material,
μ is the permeability of the cylinder material, and
ω is the angular frequency of the eddy currents in the cylinder, and for a plate:

$$R_e = \frac{L}{p} \sqrt{\rho \mu \omega} \quad (1b)$$

where
L is the length of the coil conductor,
p is the perimeter of the coil conductor,
ρ is the resistivity of the flat plate material,
μ is the permeability of the flat plate material, and
ω is the angular frequency of the eddy currents in the plate, and in both cases (cylinder and plate) where $\omega = 2\pi f$, f is the fundamental frequency, and $f = 1/T$ for a period T.

Thus, for sinusoidal currents, the equivalent eddy current resistance $R_e$ increases as the square root of the frequency ω. In contrast, it has been experimentally determined that the equivalent eddy current resistance may increase much faster with use of the current pulses described herein. Without limiting the scope of the invention, it may be theorized that this increased resistance is due to the effective frequency of such current pulses being higher than their root (nominal or fundamental) frequency, because the pulses include high frequency harmonics. Thus, by providing current pulses with a high rate of change of current, with respect to time, the current pulses can actually be provided at a lower fundamental frequency than the sinusoidal current which these pulses are replacing, because the steeply varying portions of these current pulses provide high frequency harmonics that more than make up for their lower fundamental frequency. As a result, more power than expected is inductively provided to the core or load.

The desired current pulses can be generated by a variety of electronic devices which provide rapid switching to produce much of the pulse energy in high frequency harmonics. The use of multi-phase devices can further be used to boost the fundamental frequency of the pulses. These aspects are described in various embodiments below and with respect to a comparative experiment (see the text accompanying FIGS. 7–9).

Various implementations of an inductive heating system will now be described that may advantageously utilize these current pulses.

FIGS. 1A–1D Embedded Coil, Coaxial Core/Yoke

FIGS. 1A–1B and 1C–1D show respectively two embodiments of a heating system in which a heater coil is embedded in an article (ferromagnetic core and yoke) being inductively heated. In both embodiments, there is close physical (thermal) contact and magnetic coupling between the heater coil, core and yoke.

More specifically, FIG. 1A shows a cross-sectional portion of an inductive heating system 25 which includes a ferromagnetic core 22 of a generally cylindrical shape (disposed about center line 29) having a hollow central passage 26 through which a flowable material to be heated is passed. For example, core 22 may be part of an extrusion die, a melt manifold or melt conveyer, or a dynamic mixer or plasticizing unit, and the flowable material may be any food, plastic, metal, etc., the flowable material being the ultimate target for the heat from the inductive heating system. A substantially cylindrical and coaxial outer ferromagnetic yoke 28 surrounds the inner core, with substantially direct contact (substantial elimination of air gap) between the outer diameter 23 of the core and the inner diameter 27 of the yoke. The outer yoke 28 closes the loop (magnetic flux lines 19) so as to retain substantially all of the magnetic flux within the adjacent ferromagnetic core 22 and yoke 28, thus substantially increasing the magnetic coupling, reducing the equivalent resistance to magnetic flux, and decreasing the border frequency of the system.

A heater coil which includes a wire conductor 20 surrounded by an electrical insulator 36, is embedded within core 22. Heater coil 20 is wrapped in a helix-shaped groove 34 around the outer diameter 23 of core 22. This provides close physical contact and enables the heat resistively generated in the coil 20 to be transferred to the core 22.

Coil 20 is highly magnetically coupled to the core 22, as shown by the flux lines 19. Coil 20 can be made from a solid conductor such as copper, or from a more highly resistive material such as nickel chromium. Core 22 is fabricated of a magnetically permeable material such as iron, or other ferromagnetic material to facilitate magnetic coupling.

Coil 20 is also thermally coupled by close physical contact With core 22 and yoke 28. The coil 20 is covered by a thermally-conductive, electrically-insulating material (e.g., layer or coating 36). Suitable materials include magnesium oxide and various alumina oxides; other electrically insulating materials can be used as well.

A central hollow passage 26 through the ferromagnetic core 22 is defined by internal wall 24. The substance to be heated, which can be a gas, liquid, solid or some combination thereof, is positioned in (or passes through) the passage 26. Heat inductively generated in core 22 is transmitted to the material in passage 26 via thermal conduction and/or radiation.

Yoke 28 is made of a magnetically permeable material such as iron or steel, or other ferromagnetic material. Yoke 28 is located adjacent to and in thermal communication with heater coil 20. Core 22 and yoke 28 are in direct contact (substantial elimination of air gap) to provide a closed magnetic loop, as well as enhanced thermal conduction. The close coupling of coil 20 to core 22 and yoke 28, substantially reduces the border frequency of coil 20.

Figure 1C:
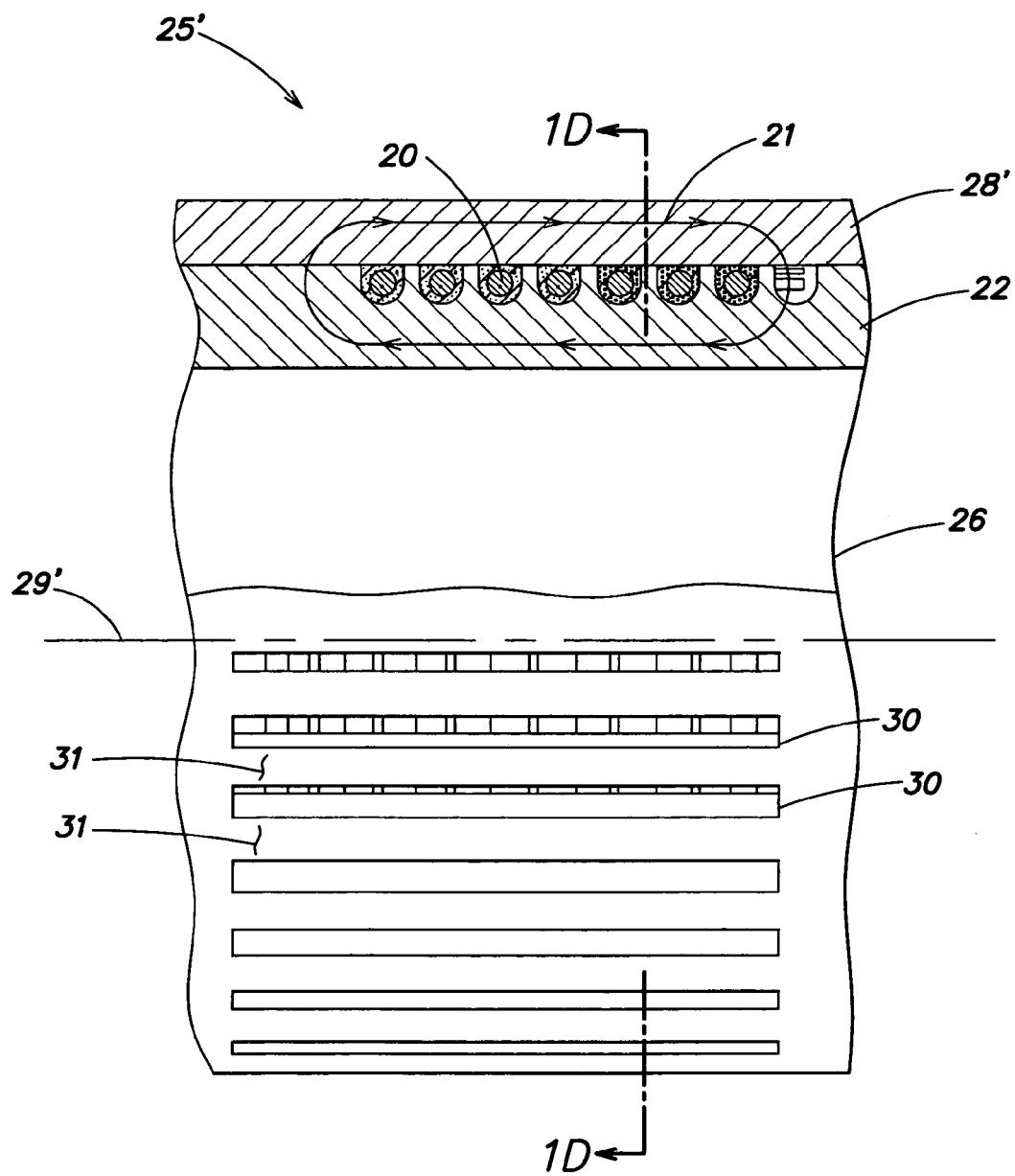
FIG. 1C is a partial, broken away side view, of a second implementation of a heating system similar to that shown in FIG. 1A but with slots in the yoke.
Figure 1D:
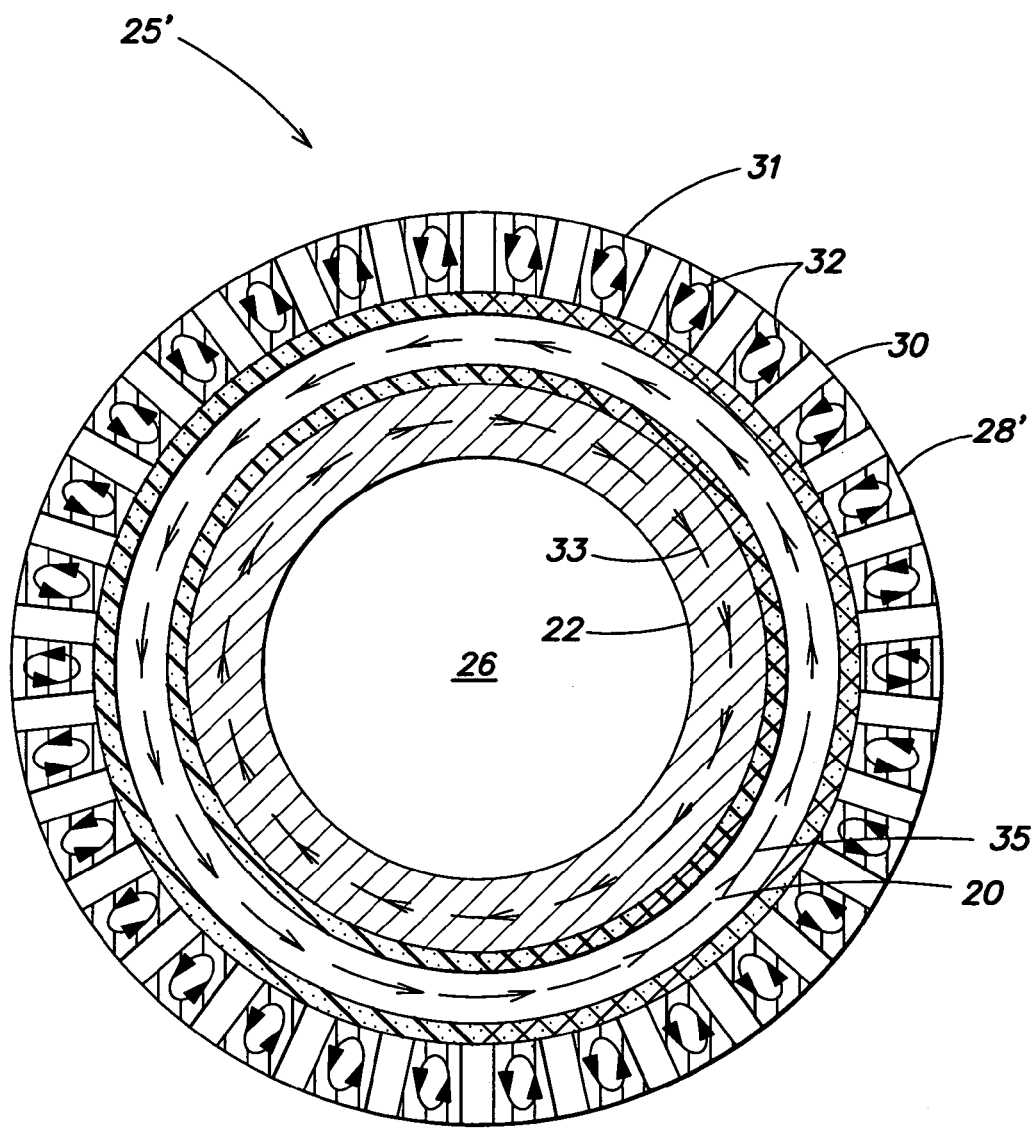
FIG. 1D is a sectional view taken along line 1D—1D of FIG. 1C showing induction (eddy) currents in the core directed oppositely to the current in the coil, and showing discontinuities in the eddy current in the yoke because of the slots.

A second embodiment of a similar heating system is shown in FIGS. 1C–1D. This modified system 25' includes a modified yoke 28' having elongated hollow portions or slots 30, and between the slots, elongated solid portions or ribs 31; the slots 30 and ribs 31 are disposed substantially parallel to the core/yoke center line 29'. The slots 30 are at right angles to the loops of coil 20 wrapped around core 22. The slots 30, which are effectively air gaps, create discontinuities or restrictions in the eddy currents 32 within the yoke 28', as shown in FIG. 1D (a sectional view taken along section line 1D—1D in FIG. 1C). In contrast, there are no slots in core 22 restricting the eddy currents 33 in the core 22. This arrangement results in preferential inductive heating in the core 22, rather than the yoke 28'; this is desirable when the ultimate article to be heated is a material in the passage 26 of the core 22. Thus, a greater percentage of the power delivered to the heating system is transmitted to the article to be heated, rather than to yoke 28'. In FIG. 1D, the current 35 in coil 20 is shown in a counterclockwise direction, and the resulting eddy current 33 in core 22 in a clockwise direction. The eddy current 32 in each rib 31, between two slots, is in a counterclockwise direction.

Figure 1E:
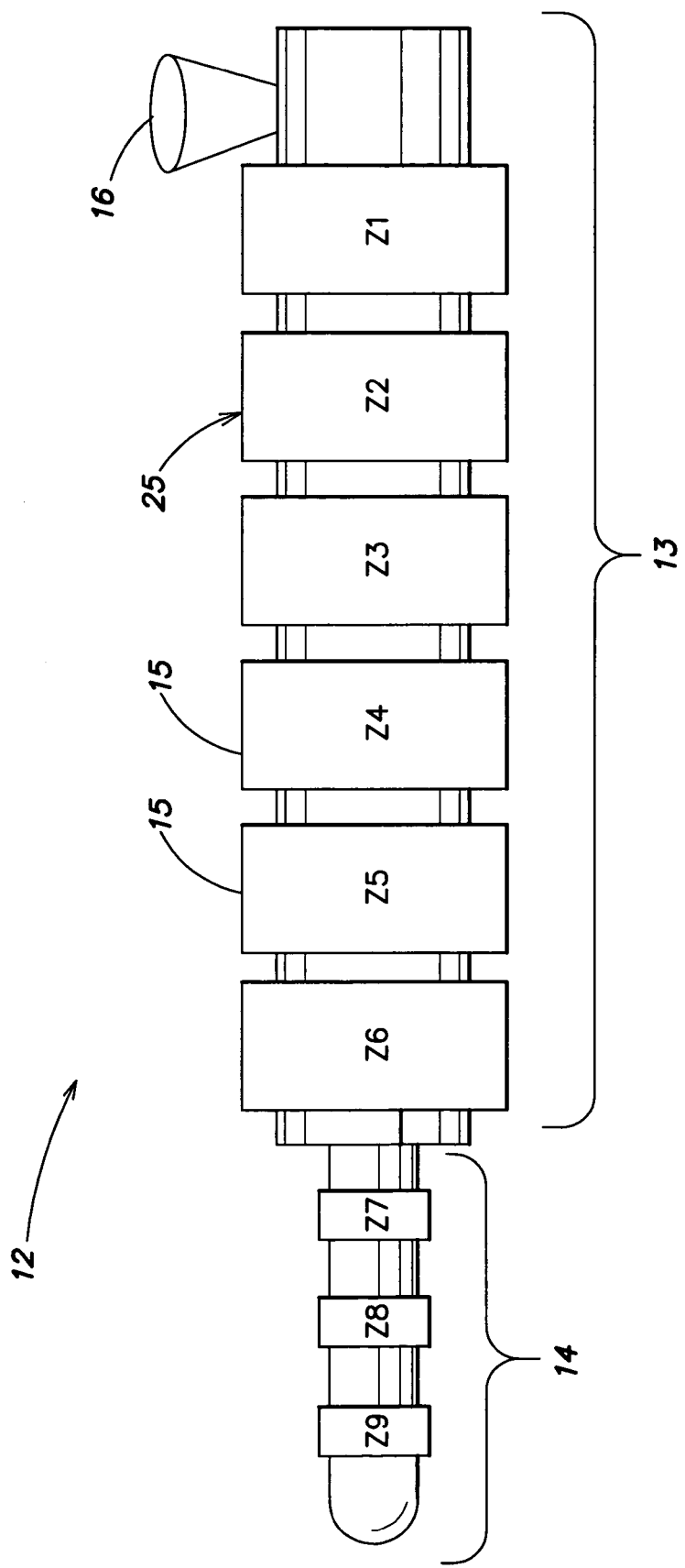
FIG. 1E is a schematic view of a barrel extruder with multiple temperature zones which may incorporate the heating systems of FIGS. 1A–1D.

FIG. 1E Multiple Heating Zones

FIG. 1E shows a multi-temperature zone barrel extruder 12 incorporating an inductive heating system 25 of the type previously described. The extruder includes a barrel zone 13 with a plurality of heating zones Z1–Z6, and a nozzle zone 14 with additional heating zones Z7–Z9. A flowable material (to be heated) enters the barrel through an inlet funnel 16 at one end of the extruder, and proceeds through the various heating zones 15 of the barrel and nozzle. Any one or more of the heating zones 15, such as zone Z2, may utilize the heating system 25 as previously described.

FIGS. 2–6 Power Supply and Switching Devices

Figure 2:
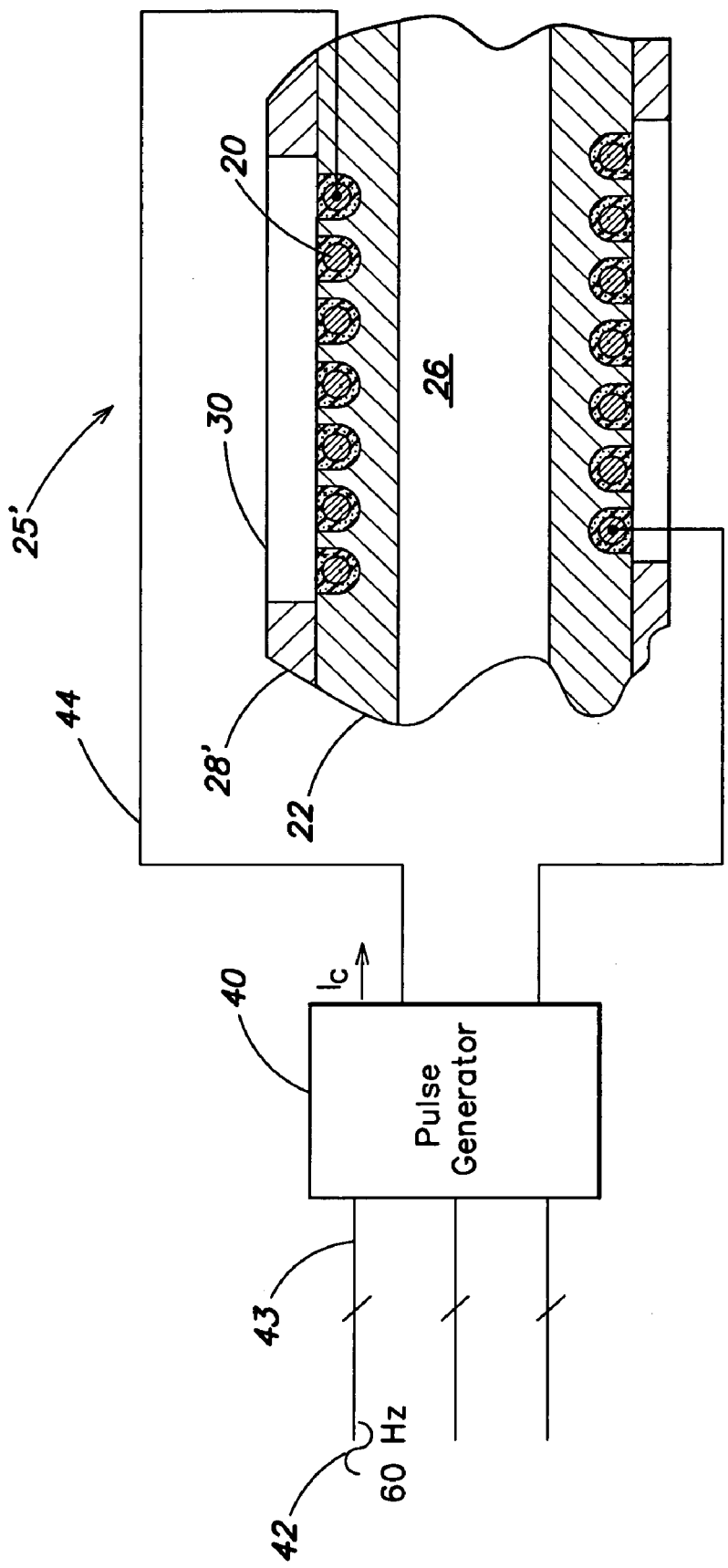
FIG. 2 is a general schematic diagram of a power supply providing current pulses with high-frequency harmonics to a heating system of the type shown in FIGS. 1A–1D, according to one implementation of the invention.

FIG. 2 shows a power supply for providing current pulses to a heating system 25', similar to that shown in FIGS. 1A–1D. A pulse generator 40 receives on input line(s) 43 a line frequency sinusoidal current signal 42 of approximately 60 Hz, and generates on output line 44 current pulses $I_c$ at that line frequency, or at a multiple of the line frequency, for delivery to coil 20. The current pulses applied to coil 20 generate a rapidly changing magnetic flux that is closely coupled to core 22 and which inductively heats core 22 (and ultimately the material in passageway 26). Significant eddy currents are avoided in yoke 28' because of slots 30, so that yoke 28' is not substantially inductively heated. By focusing the eddy currents in core 22, the overall inductive heating efficiency is significantly improved.

Figure 3A:
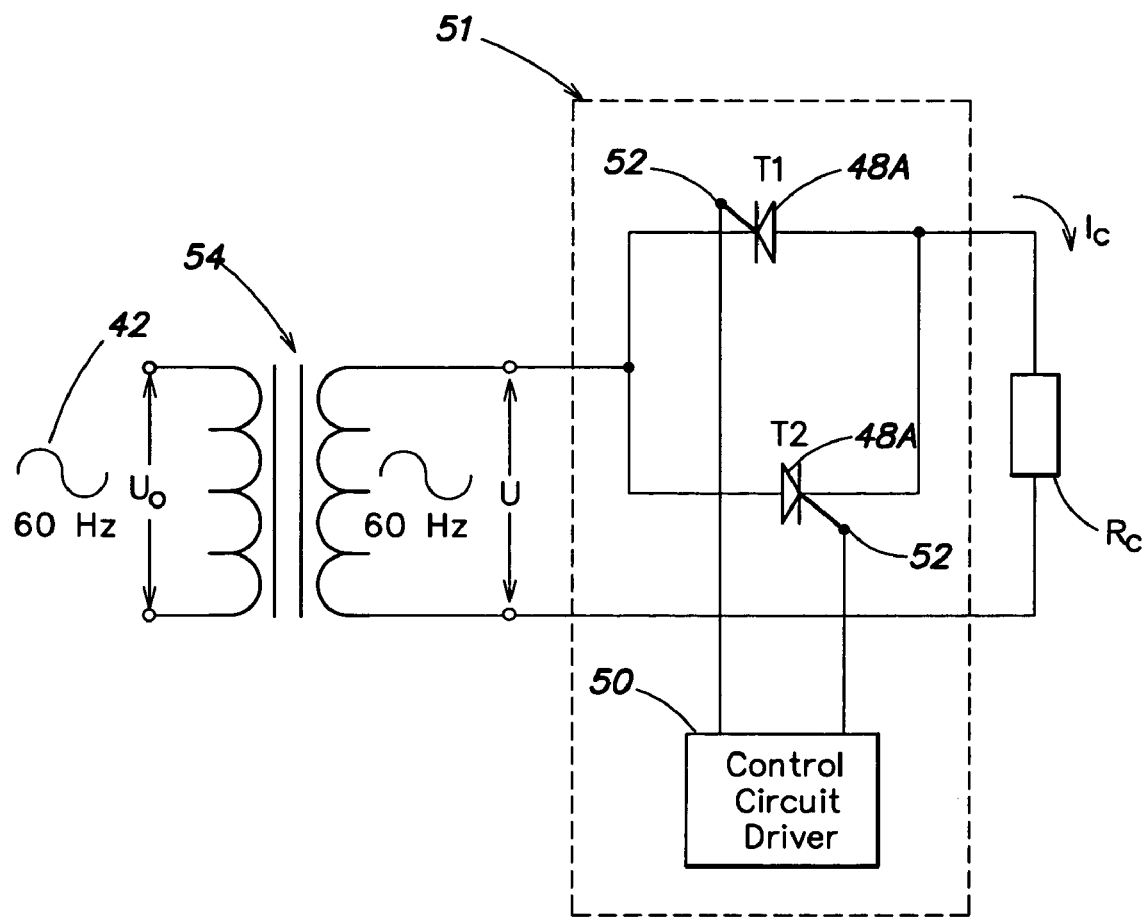
FIG. 3A is a circuit diagram of a power supply using thyristors to provide the current pulses.
Figure 3B:
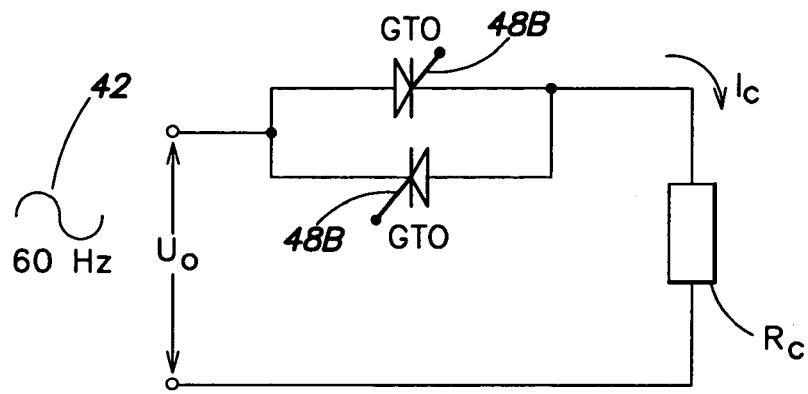
FIG. 3B is a circuit diagram of a power supply using gate-turn-off (GTO) thyristors to provide the current pulses.
Figure 3C:
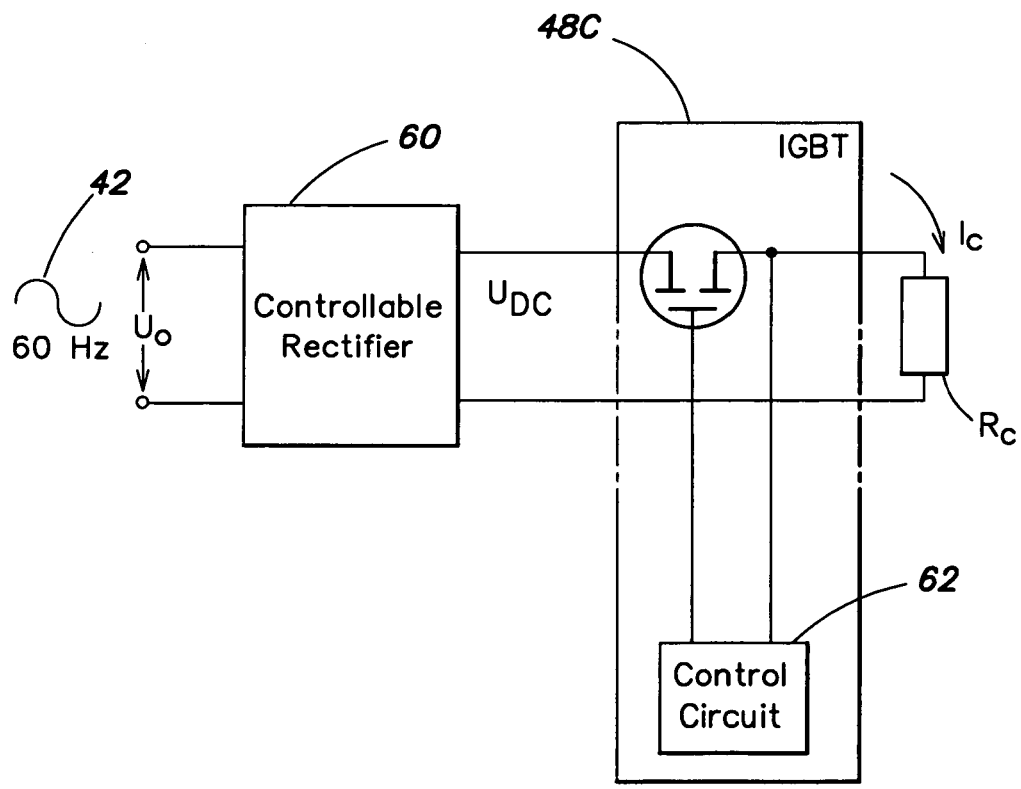
FIG. 3C is a circuit diagram of a power supply using an integrated gate bipolar transistor (IGBT) device to provide the current pulses.
Figure 4A:
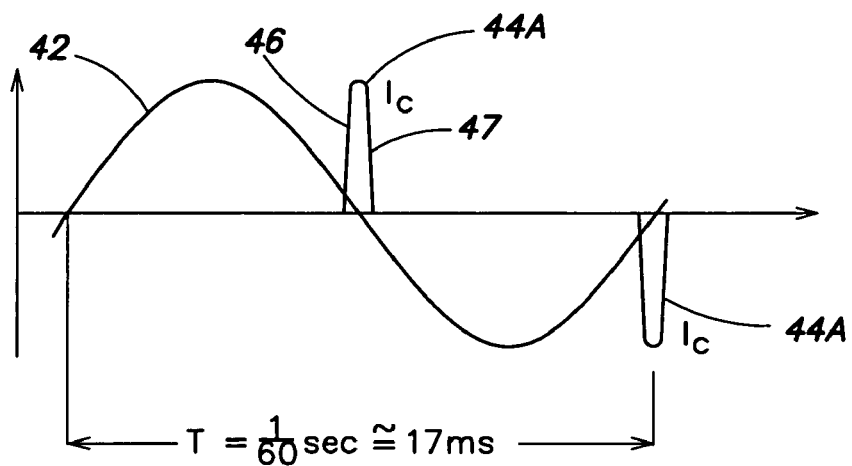
FIG. 4A is a timing diagram illustrating the current pulses generated from a line frequency current supply by the thyristors of FIG. 3A.

The pulse generator 40 may include one or more high-speed switching devices, such as thyristors 48A, GTO thyristers 48B, or IGBT device 48C, as shown in FIGS. 3A–3C, respectively. These devices convert the line frequency sinusoidal current signal 42 into current pulses $I_c$, as shown in FIGS. 4A–4C, respectively.

Referring to FIG. 3A, thyristors 48A can be used for high power applications, e.g., in the thousands of kilowatts range. A one-phase bipolar commutator 51 (shown in a dashed box in FIG. 3A) includes a pair of oppositely oriented thyristors T1 and T2 in parallel arrangement. Circuit driver 50 provides a control signal to pins 52 to turn T1 (or T2) on when the supply line voltage is close to reversing (input signal 42 crosses the horizontal axis in FIG. 4A). Once turned on, the thyristor can only turn off when the applied voltage reverses, which happens a short time later as shown in FIG. 4A. The period of the input 60 Hz line frequency is T=(1/60)seconds, which is approximately 17 milliseconds (ms). As a result, narrow current pulses 44A are generated near 180, 360 . . . degrees (as shown in FIG. 4A), at twice the line frequency. The amplitude of current pulses 44A can be increased by transformer 54 that boosts the input voltage $U_0$ of the line frequency sinusoidal current signal 42 to output voltage U. The RMS current provided in short pulses 44A is approximately equivalent to the RMS current directly from the line frequency sinusoidal current signal 42 of voltage $U_0$. The current pulses 44A supplied to heater coil 20 (represented by $R_c$, the equivalent total resistance of the heating coil circuit) include sharp slopes, in this case a steeply rising leading edge 46 and steeply falling trailing edge 47 (see FIG. 4A). A Fourier transformation of a pulse like 44A indicates that much of the energy of pulse 44A is in high frequency harmonics. Suitable thyristors T1 and T2 are available from International Rectifier Corp., El Sugendo, Calif. Integrated circuit chips with drivers 50 are also available for controlling the thyristors.

Figure 4B:
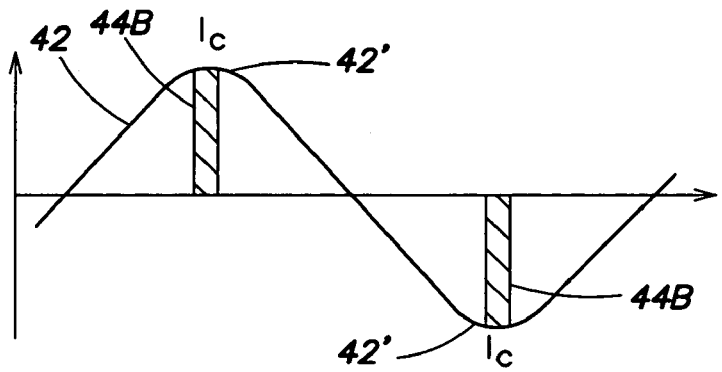
FIG. 4B is a timing diagram illustrating the current pulses generated from a line frequency current supply by the GTO thyristors of FIG. 3B.

For medium power level applications, in the hundreds of kilowatts range, a pair of oppositely oriented GTO thyristors 48B (see FIG. 3B) can be substituted for the thyristors T1 and T2 (of FIG. 3A) to provide current pulses 44B (see FIG. 4B) at any point in the sinusoidal input signal (see the circuit of FIG. 3B and resulting current pulses in FIG. 4B). Preferably, pulses 44B are provided at the peaks 42' of the line frequency sinusoidal current signal 42, as shown in FIG. 4B, reducing or eliminating the need to boost the sinusoidal current signal 42, with a transformer. Suitable GTOs are available from Dynex Semiconductor, Lincoln, United Kingdom.

Figure 4C:
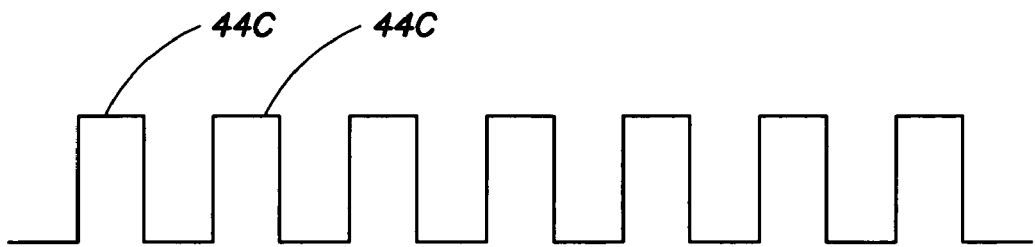
FIG. 4C is a timing diagram illustrating the current pulses generated from a line frequency current supply by the IGBT device of FIG. 3C.

For low (tens of kilowatts) and medium (hundreds of kilowatts) power level applications, an integrated gate bipolar transistor (IGBT) device 48C as shown in FIG. 3C can be substituted for the thyristors T1 and T2 (of FIG. 3A) to provide pulses 44C having high frequency harmonics, such as the square wave form shown in FIG. 4C. A controllable rectifier 60 rectifies the line frequency sinusoidal current signal 42 of voltage $U_o$ to provide a DC voltage $U_{DC}$ which is then input to IGBT device 48C. Under the direction of control circuit 62, IGBT device 48C generates current pulses Ic from the rectified voltage $U_{DC}$ to form square wave pulses 44C that are fed to the heater coil $R_c$. Suitable IGBT devices are available from International Rectifier Corp., such as the IRGKI140U06 device which provides hard switching at 25 KHz with a voltage over extended time of 600 volts and a current over extended time of 140 amps. Such IGBT devices have been previously used to provide a high frequency signal to a resonant sinusoidal circuit for induction heating; however in the prior resonant systems, the advantage of high frequency harmonics in the pulses was not obtained. In contrast, here the current pulses with their high frequency harmonics retained are provided directly to coil 20, avoiding any use or requirement of a resonant circuit.

In each of FIGS. 3A and 3B, a parallel arrangement of two oppositely oriented switching devices produces two pulses for each period T of the single-phase sinusoidal line current supply. More complex arrangements of thyristors or GTOs can be used to provide a greater number pulses for each period of a multi-phase supply.

Figure 5A:
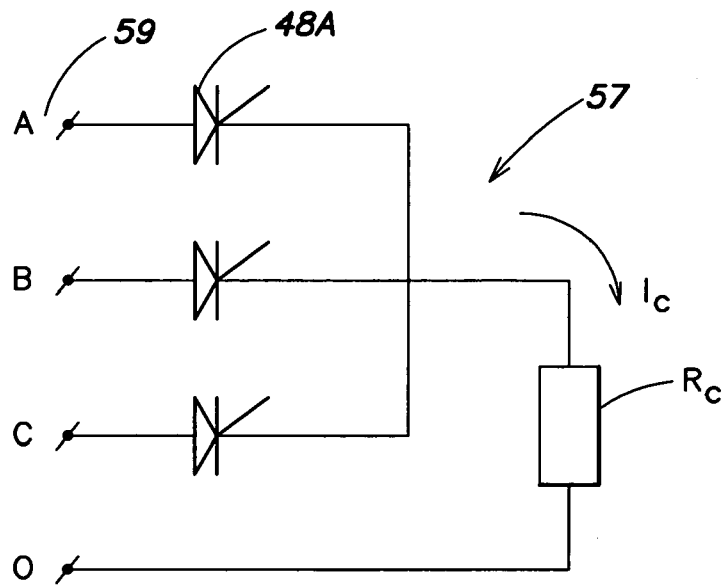
FIG. 5A is a circuit diagram of a three-phase, three-pulse unipolar commutator providing additional current pulses from additional phases of the line frequency supply.

One example is a three-phase, three-pulse unipolar commutator 57 shown in FIG. 5A in which a three-phase supply 59 provides three unipolar pulses to coil $R_C$. In the associated timing diagram, shown in FIG. 6A, the three voltage signals $U_A$, $U_B$, $U_C$ produce three pulses 44D in one period (T=(1/60) sec≅17 ms).

Figure 6A:
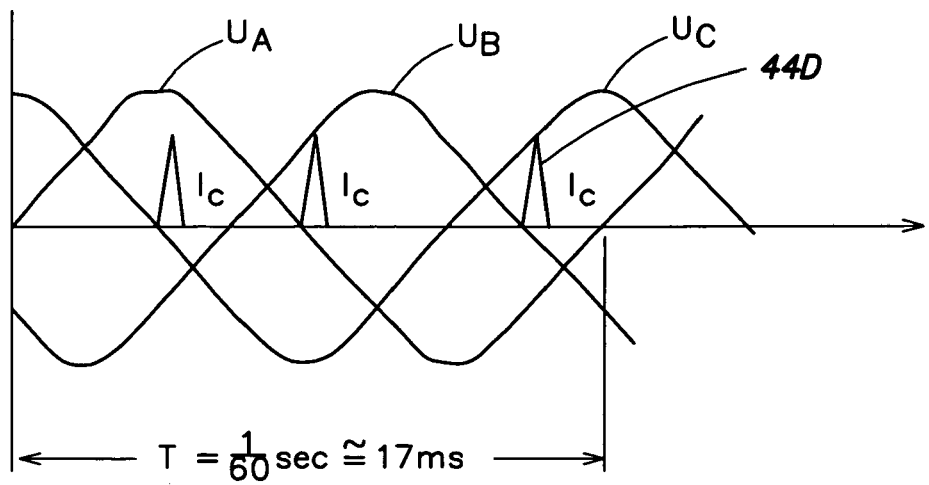
FIG. 6A is the associated timing diagram.
Figure 5B:
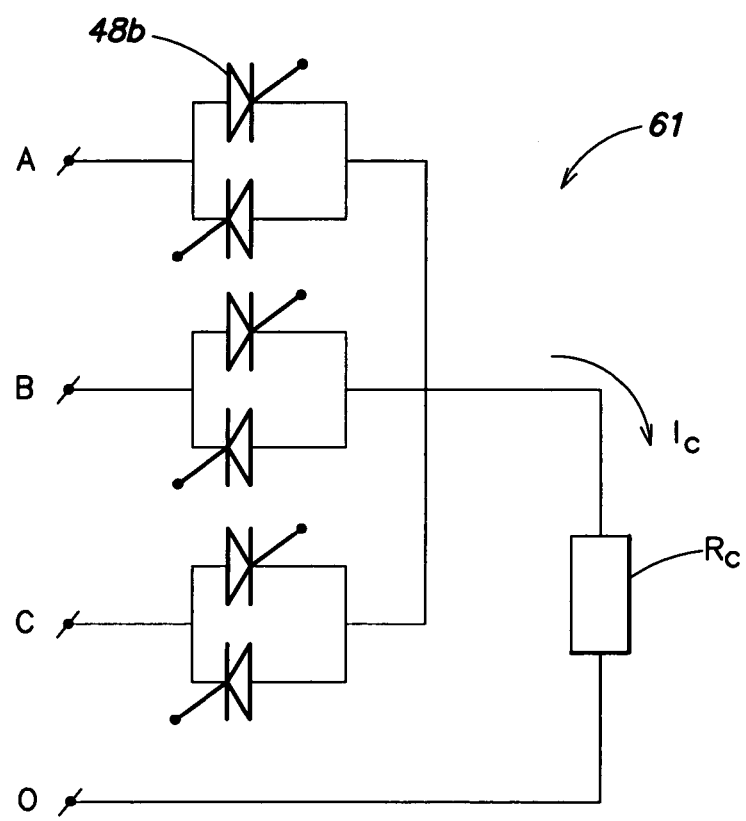
FIG. 5B is a circuit diagram of a three-phase, six-pulse bipolar commutator providing additional current pulses from additional phases of the line frequency supply.
Figure 6B:
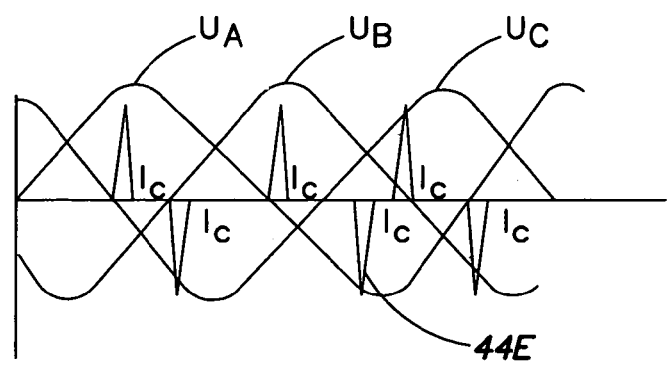
FIG. 6B is the associated timing diagram.

Alternatively, a three-phase, six-pulse bipolar commutator 61 is shown in the circuit of FIG. 5B which produces six bipolar pulses 44E in one period as shown in FIG. 6B.

In FIGS. 6A–6B, the curves $U_A$, $U_B$ and $U_C$ denote timing diagrams of voltages in phases A, B and C.

Figure 5C:
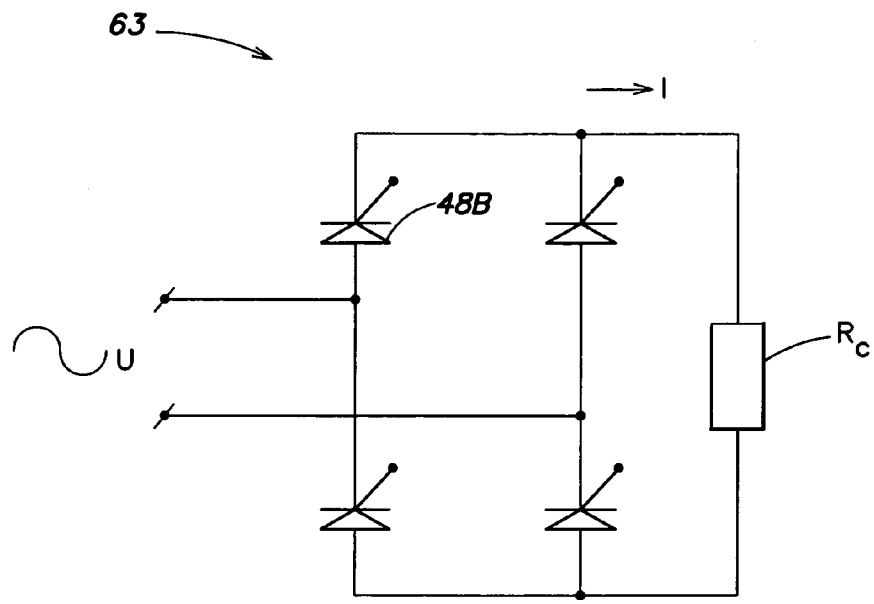
FIG. 5C is a circuit diagram of a one-phase, two-pulse unipolar pulsator providing additional current pulses from the bridge circuit of the line frequency supply.
Figure 6C:
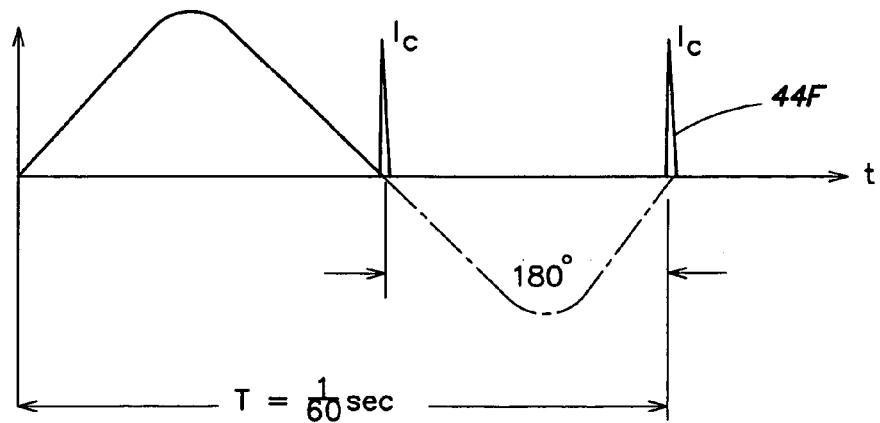
FIG. 6C is the associated timing diagram.

As a further alternative, a one-phase, two-pulse unipolar pulsator supply 63 is shown in the circuit of FIG. 5C which produces two unipolar pulses 44F in one period, as shown in FIG. 6C.

Figure 5D:
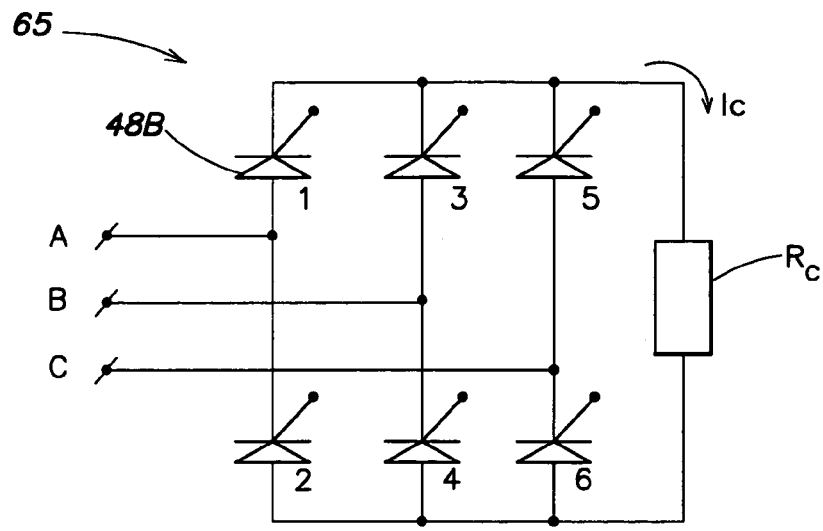
FIG. 5D is a circuit diagram of a three-phase, six-pulse unipolar pulsator providing additional current pulses from additional phases of the line frequency supply.
Figure 6D:
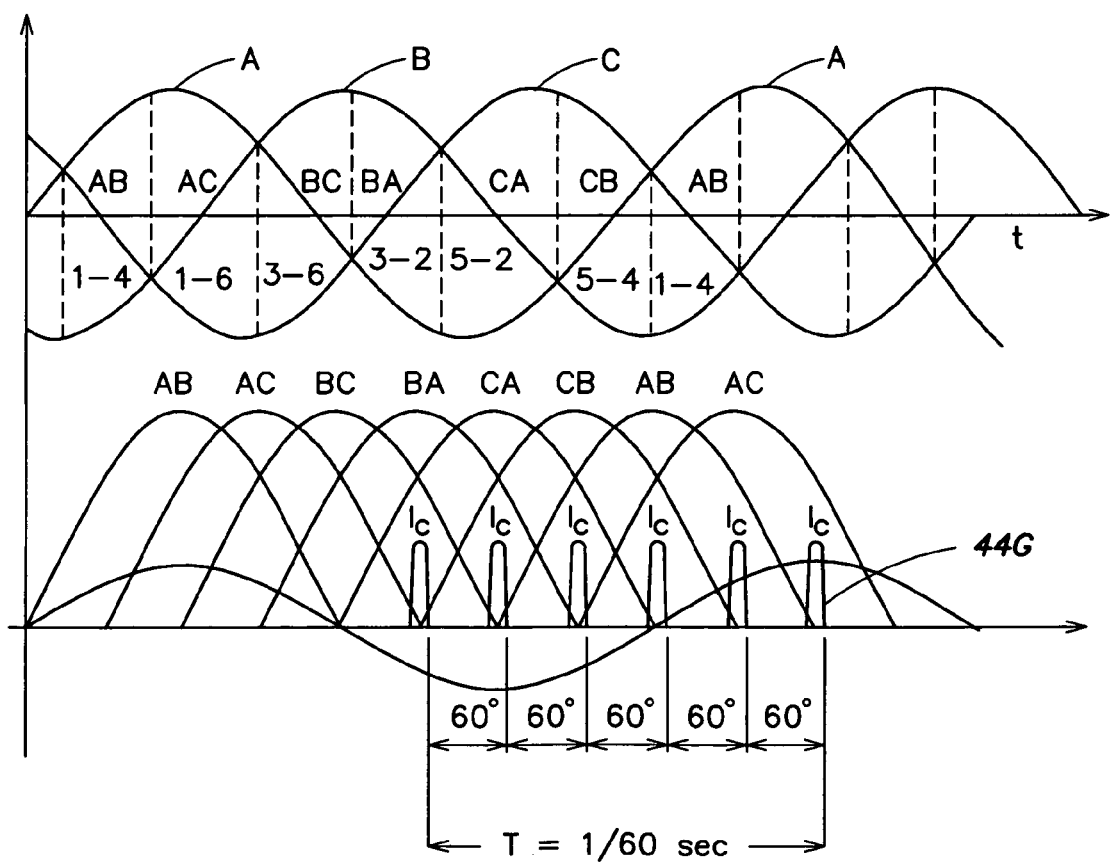
FIG. 6D is the associated timing diagram.

As a still further alternative, a three-phase, six-pulse unipolar pulsator supply 65 shown in the circuit of FIG. 5D produces six unipolar pulses 44G in one period as shown in FIG. 6D.

In FIG. 6D, the curves A, B and C relate to the voltages in phases A, B and C; the curves AB, AC, BC, BA, CA, CB relate to corresponding line voltages AB, AC and so on; in the interval 1–4 the thyristors 1 and 4 switch on and provide the current pulse to the load $R_c$ from the line voltage AB; in the interval 1–6 the thyristors 1 and 6 switch on and provide the current pulse to the load $R_c$ from the line voltage AC, and so on.

Figure 5E:
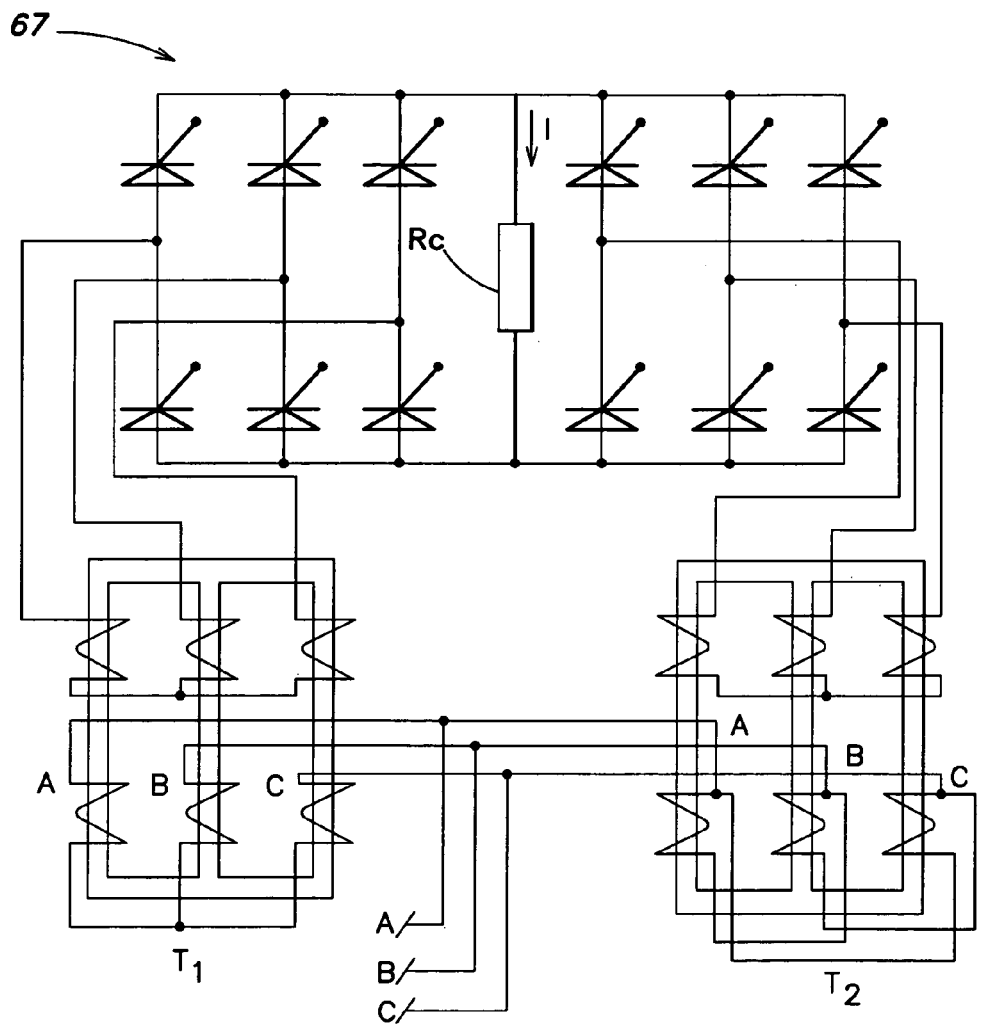
FIG. 5E is a circuit diagram of a three-phase, twelve-pulse unipolar pulsator providing additional current pulses from the line frequency supply.
Figure 6E:
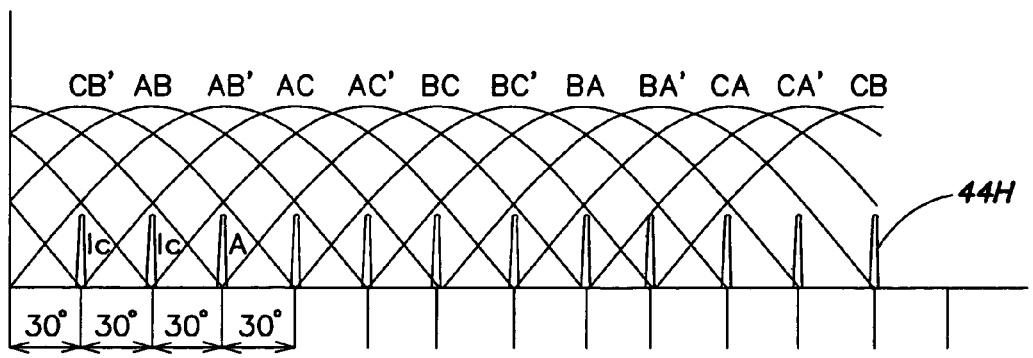
FIG. 6E is the associated timing diagram.

Finally, a three-phase supply 67 is shown in the circuit of FIG. 5E, which produces 12 unipolar pulses 44H in one period as shown in FIG. 6E. In FIG. 5E, the transformers T1 and T2 provide two systems of three-phase voltages shifted 30 degrees; T1 is fed from 3 phases in a star-connection and T2 is fed from 3 phases in a delta-connection. In FIG. 6E, the curves AB, AC, BC, BA, CA, CB correspond to the line voltages AB, AC and so on supplied from the transformer T1; the curves AB', AC', BC', BA', CA', CB' correspond to the line voltages AB, AC and so on supplied from the transformer T2.

In each of FIGS. 5A–5E, $R_C$ is the equivalent total resistance of the heating coil circuit.

Providing the additional pulses (for each period of a multi-phase supply) increases the fundamental (root) frequency, which further multiplies the effect provided by the high frequency harmonic component of the individual pulses. As such, the higher fundamental frequency provided by these more complex arrangements, combined with the high frequency of the steeply varying current pulse itself, provide significantly enhanced inductive heating.

Figure 7:
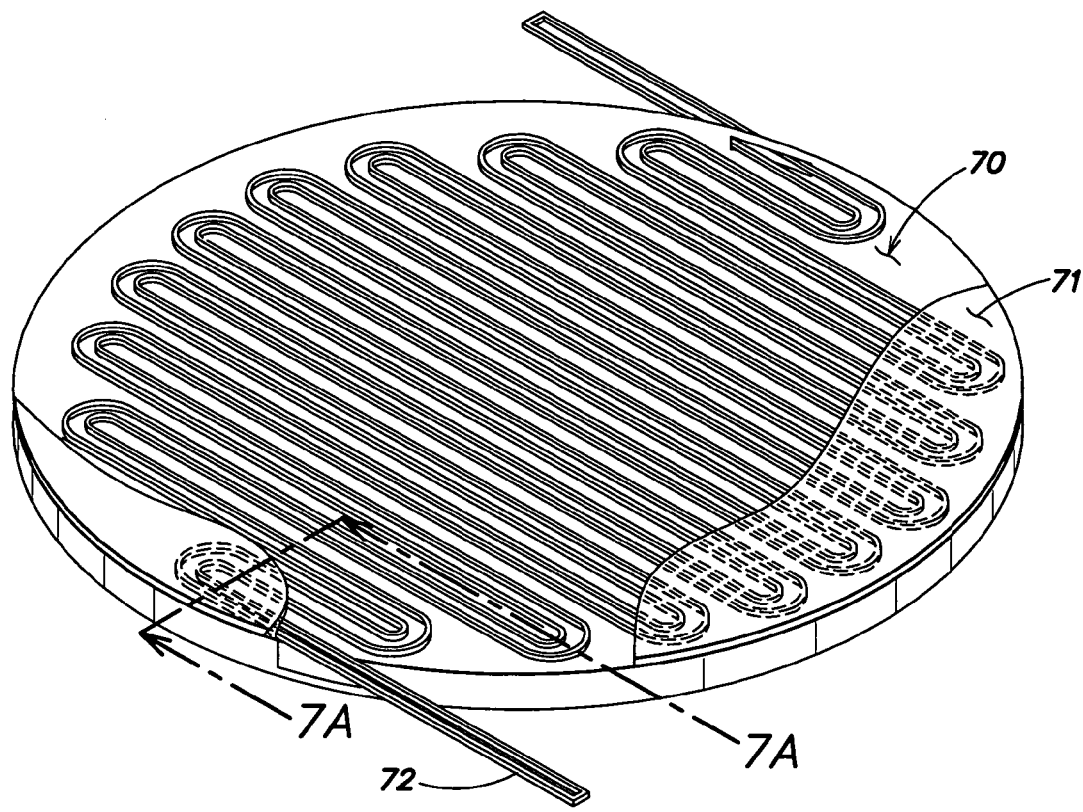
FIG. 7 is an isometric view of a heating system used in an experiment for comparing the heating performance of a sinusoidal line frequency current versus current pulses with high-frequency harmonics.
Figure 8:
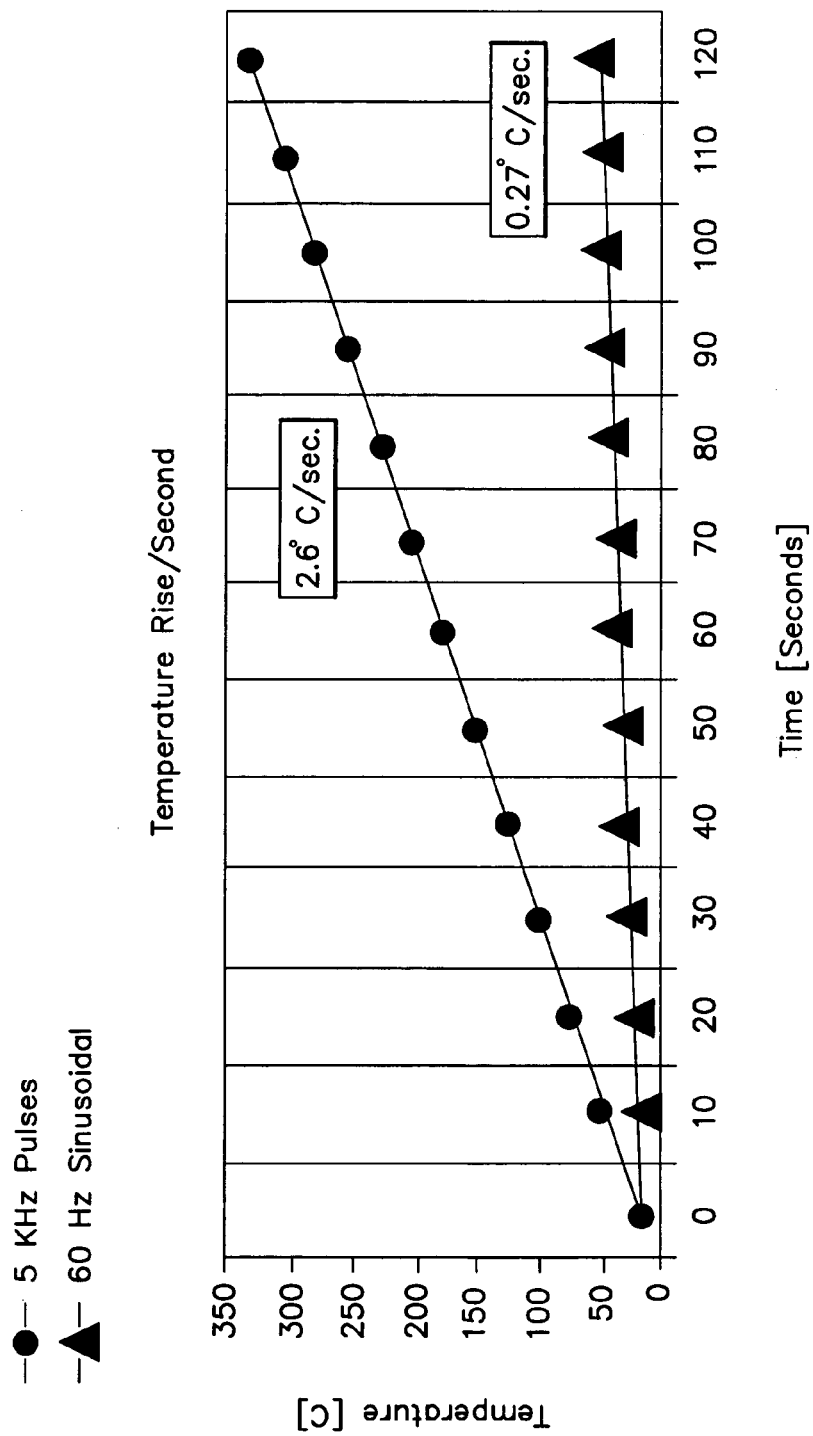
FIG. 8 is a temperature/time graph of recorded data from the experiment conducted with the heating system of FIG. 7, showing a substantially higher rate of heating with the current pulses as compared to a sinusoidal current.
Figure 9:
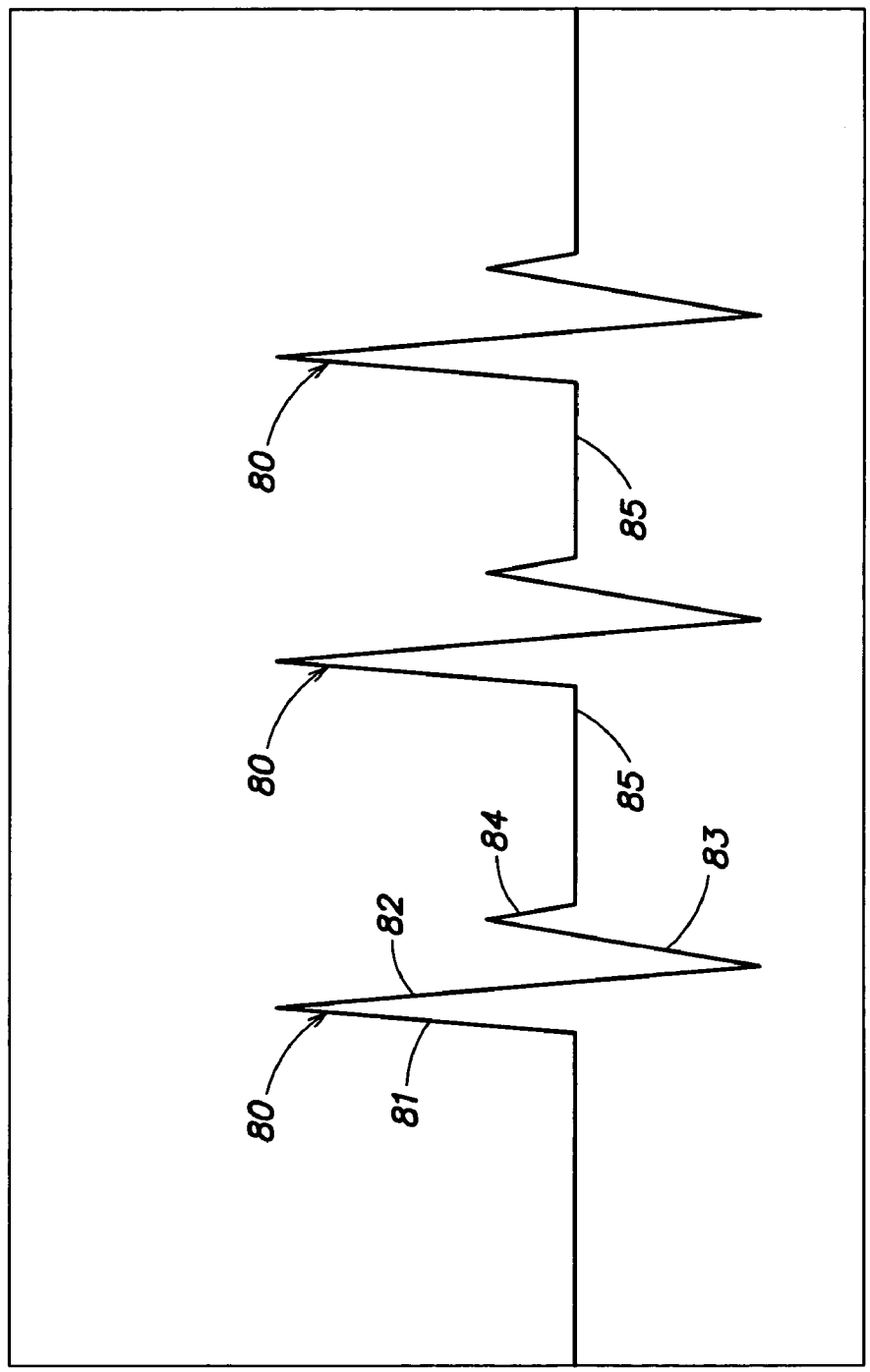
FIG. 9 is a schematic profile of the current pulses used in the experiment of FIG. 7.

FIGS. 7–9 Performance Comparison

An experiment was performed which illustrates an improved performance of a combined inductive and resistive heating system powered by the current pulses described herein, compared to the same heating system powered by a 60 Hertz sinusoidal signal voltage. FIG. 7 shows the heating apparatus. FIG. 8 is a comparison of the heating rates. FIG. 9 illustrates the shape of the current pulses used in this example.

Figure 7A:
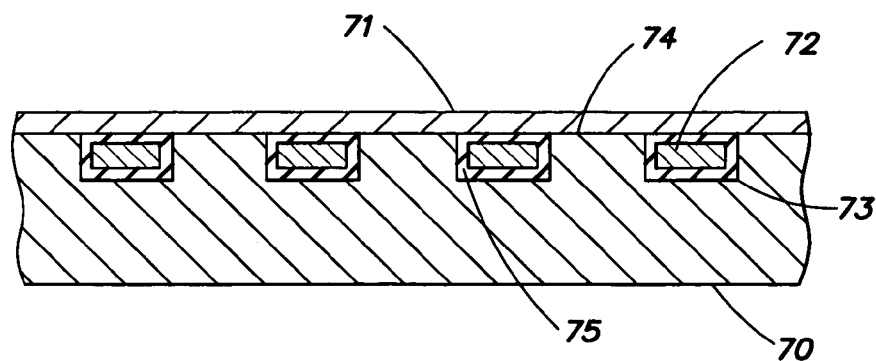
FIG. 7A is an enlarged cross-sectional view taken along line 7A—7A of FIG. 7.

As shown in FIG. 7, the article to be heated was a flat steel disc (core) 70, of 5 mm thickness and 160 mm diameter, covered by a flat steel yoke 71, of 1 mm thickness and 160 mm diameter (see FIGS. 7 and 7A). A heating coil 72, formed of nickel chromium rectangular wire, 2.92 meters long and having a cross-section of 2.5 mm×1 mm, provided a coil resistance of 1.17 ohm. The coil 72 was covered in an insulating material 75 and was embedded in a snake-shaped groove 73 in the top surface 74 of the disc; the coil and disc were covered by yoke 71 to provide a closed magnetic loop. The coil 72, disc/core 70 and yoke 71, were all in close physical contact (minimizing any air gaps). From the configuration of FIG. 7, with the electrically insulated coil 72 embedded between steel disc 70 and steel yoke 71, a border frequency was calculated from Equation 2 (set forth below)

of only 24 Hz. In contrast, a border frequency of about 2 KHz would be expected without the closed magnetic loop (without the yoke 71).

This article was first heated with a 60 Hz sinusoidal signal (industrial power supply). Then, after cooling to ambient temperature, the article was heated with current pulses from an IGBT source, similar to that shown and described in FIG. 3C.

With a sinusoidal 60 Hz signal voltage applied across coil 72, a voltage was measured of 9 volts RMS, thus providing a current of 10 amps RMS. The power delivered to the coil 72 and disc 70 was calculated to be 117 Watts. The measured rate of change of temperature of the disc 70, plotted in FIG. 8, was 0.27° C./sec. for the 60 Hz sinusoidal voltage input.

From an analysis of electromagnetic processes under inductive heating, and for frequencies higher than the border frequency, Kirchoff's equation for a heater coil circuit can be represented by:

$$U_{ps}=I_c(R_c+K_c^2N^2R_e)+I_cj\omega(1-K_c^2)L_c \quad (2)$$

where:
- $U_{ps}$ is the RMS voltage of the power supply source;
- $\omega$ is the frequency of the power supply source above the border frequency;
- $I_c$ is the current in the heating coil (RMS);
- $R_e$ is the eddy current equivalent resistance;
- $R_m$ is the equivalent magnetic resistance of the magnetic flux circuit;
- N is the number of turns of wire in the heating coil;
- $R_c$ is the resistance of the heating coil;
- $L_c$ is the inductance of the heating coil;
- $K_c<1$ is the coefficient of electromagnetic connection between the heating coil and the eddy currents;
- $j=\text{sqrt}(-1)$ is the imaginary unit; and
- where the border frequency $\omega_b=R_mR_c=2\pi f_b$.

For the 60 Hz sinusoidal supply signal, a total resistance of about 1.2 ohms was measured from the voltage and current at the coil. The eddy current equivalent resistance $R_e$ was calculated (from Equation 1b) to be 0.1 ohm. Adding in the resistance of the nickel chromium wire itself of 1.17 ohms, the total resistance expected to be measured at the coil was 1.27 ohms. The actual measured resistance of about 1.2 ohms was reasonably close to this expected value. It can be seen from these numbers that only about 8% of the power was delivered inductively using the 60 Hz sinusoidal supply signal. Most of the power delivered can thus be accounted for by resistive heating of the nickel chromium wire.

In comparison, when the 60 Hz supply signal was replaced with current pulses from an IGBT similar to that shown in FIG. 3C (obtained from International Rectifier Corp., IRGP450U, rated at 500 volts and 60 amps and hard switching to 10 KHz), current pulses with a frequency of 5 KHz were provided. These pulses 80 from the IGBT had the profile shown in FIG. 9, with four high slope segments (81, 82, 83, 84) in each pulse, and a delay 85 between pulses. The voltage was adjusted to provide the same current of 10 amps (as with the 60 Hz supply); however, to provide a 10 amp current with the high frequency pulses provided by the IGBT, the voltage had to be increased to 114 volts. The higher voltage was the result of the higher eddy current equivalent resistance in the heated article, as transformed back to the coil. The electrical power in the coil was now approximately 1140 Watts. The rate of temperature increase in the steel disc when utilizing these current pulses was now measured at 2.6° C./sec, as shown in FIG. 8.

The eddy current equivalent resistance for 5 KHz current pulses was calculated from Equation 1b, which shows that the eddy current equivalent resistance $R_e$ increases as the square root of the frequency. With a 5 KHz frequency, which is almost 100 times higher than the 60 Hz line frequency, the eddy current resistance is expected to be about 10 times higher, or about 1.8 ohms. In practice, the eddy current equivalent resistance at 5 KHz was actually measured to be about 10 ohms (dividing 114 volts by 10 amps and subtracting the 1.17 ohms resistance of the coil itself). The much larger equivalent eddy current resistance actually measured shows that the eddy current resistance increased much more than the 10 fold increase expected from the less than 100 fold increase in fundamental frequency. Thus, the effective frequency increase must have actually been much higher than 5 KHz. To account for the almost 6 fold greater equivalent resistance, the effective frequency increase must have been about 180 KHz. This much higher frequency could be obtained because of high frequency harmonics in each of the pulses, as shown in FIG. 9.

A Fourier transform of the pulses would show the high level of energy in these high frequency harmonics. The Fourier transform for periodic functions (the current pulses are periodic functions) leads to a Fourier series:

$$F(t)=A_0+A_1\sin(\omega t)+A_2\sin(2\omega t)+A_3\sin(3\omega t)+\ldots$$

where
- $\omega=2\pi f$=fundamental angular frequency,
- $f=1/T$=fundamental frequency,
- t=time,
- T=period of this periodic function,
- $A_0$=constant, and
- $A_1, A_2, A_3, \ldots$ =amplitudes of first, second, third, ... harmonics.

For example, a unity square wave function $F_{sw}(\omega t)$, with fundamental frequency $\omega$, has the Fourier series:

$$F_{sw}(\omega t)=4/\pi[\sin(\omega t)+\frac{1}{3}\sin(3\omega t)+\frac{1}{5}\sin(5\omega t)+\frac{1}{7}\sin(7\omega t)+\ldots]$$

In the present case, the 6-fold increase in $R_e$ means that about 5/6=83% of the pulse energy was in high frequency harmonics. Thus, the much higher than expected eddy current resistance can be explained by the presence of these high frequency harmonics in each pulse. As a result, a far greater proportion of the power is provided to the heated article (here a metal disc) from inductive heating, rather than from resistive heating.

In various implementations, providing greater than 15%, and more particularly at least 50% of the pulse energy in high frequency harmonics would be desirable. In particular embodiments, the higher end of this range, at least 70%, may be desirable (e.g., for rapid melting of a frozen plug in a nozzle; to allow the flow of a material through a bore; or for uniform heating of an extruder barrel); a middle range of 50–69% may comprise a second preference, and a lower range of 25–49% as a third preference. The operating range may vary from initial heat up to a steady state operating range.

As a basis of comparison, a rectangular shaped wave (instead of sinusoidal and with the same amplitude) has about 25% of its energy in high harmonics, while a triangular shaped wave (with the same amplitude) has about 10%.

In select embodiments described herein, where it is desired to utilize both inductive and resistive heating, the heating power which is consumed from the power supply includes two portions:
  a) power of the resistive heating
  $$P_R = I_C^2 R_c$$
  b) power of the inductive heating
  $$P_I = I_c^2 K_C^2 N^2 R_e$$

where $I_C$ is the current in the heater coil (RMS); $R_c$ is the resistance of the heater coil; $R_e$ is the equivalent eddy current resistance; N is the number of coil turns; and $K_C$ is a coefficient of electromagnetic connection between the heating coil and the eddy currents. In the combined resistive/inductive implementations described herein, the resistive component $P_R$ will contribute to the overall heating efficiency when this heat is transferred to the article to be heated, as compared to prior art systems which cool the heater coil and thus lose this resistive component of the heating power. Where the heating coil is embedded in the heated article, the coefficient of electromagnetic connection is increased almost to $K_C=1$, which increases the induction portion of the heating power $P_I$ under the same coil current. With $I_C$ (a maximum allowed current for a given coil), N and $K_C$ fixed, the inductive component of the heating power $P_I$ is increased by increasing the eddy current equivalent resistance $R_e$ (as previously described with respect to Equation 1).

An analysis of electromagnetic processes of inductive heating under an arbitrary input current (not necessarily sinusoidal variation), indicates that the eddy current resistance $R_e$ is a function of the rate of change of current in the coil.

The experimental data suggests that:
$$R_e \sim (dI_C/dt)^n$$

where n>1, $I_C$ is the current in the coil, and t is time. In view of this relationship, the proportion of heating from inductive heating can be significantly increased, without increasing the current in the coil, by replacing a high fundamental frequency sinusoidal current supply, with current pulses having steeply varying portions. These pulses can be provided at a lower fundamental frequency than the sinusoidal current they are replacing, because the steeply varying portions of the current pulses provide harmonics that more than make up for the lower fundamental frequency.

In select embodiments, with better coupling provided by eliminating the air gap, embedding the coil in the substrate, and/or providing a yoke to ensure a closed loop for magnetic flux, the border frequency can be decreased. This facilitates an improvement in inductive heating performance by providing current pulses with high frequency harmonics above the border frequency.

As described above, a lower cost power supply for induction heating can be provided, which includes a pulse generator excited with a low or line frequency. Signal generating devices, including thyristors, GTOs, and IGBT devices can be used to provide short current pulses from the line frequency or direct current. The high frequency harmonics in these current pulses are preserved (in the absence of a resonant circuit) to increase the power transfer to the inductively heated object. Also, cooling of the heater coil may not be required, in contrast to prior systems.

An IGBT device, capable of higher voltage and current than used in the described experiment, can be run at a frequency higher than 5 KHz, thus providing more power to the load for heating with the same coil and with the same current in the coil as provided in the 60 Hz experiment.

FIG. 10 Furnace

Figure 10:
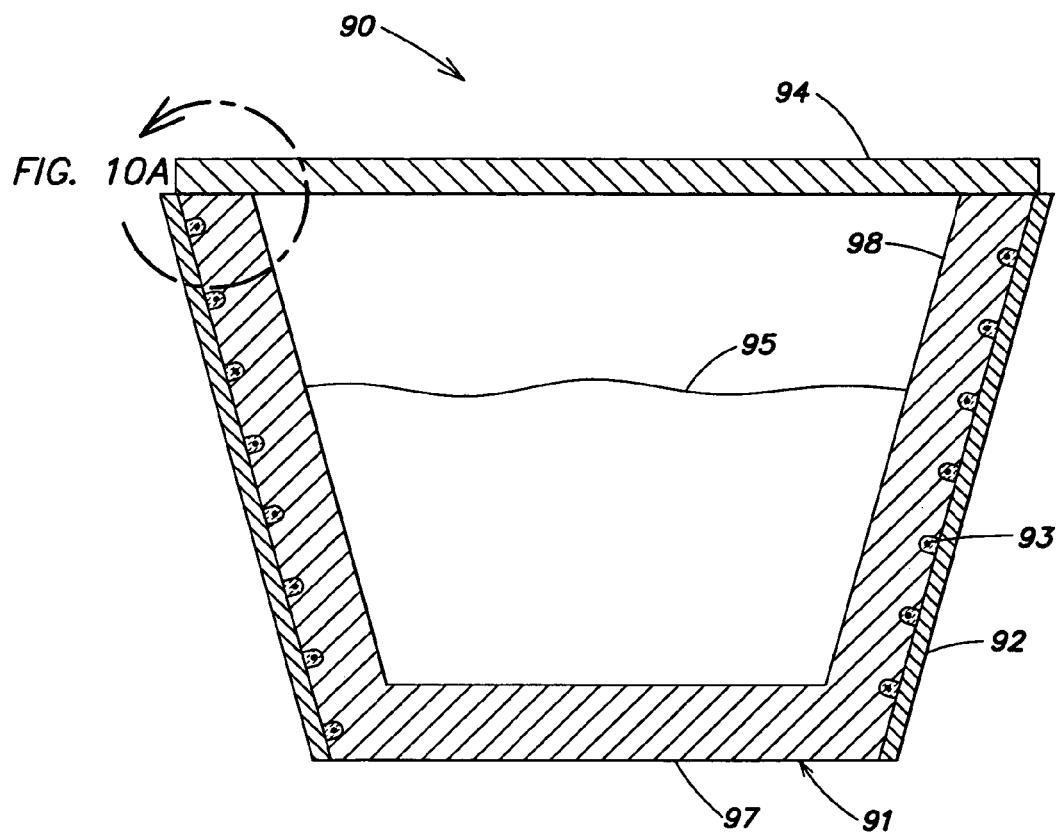
FIG. 10 is a cross-sectional schematic view of another implementation in which the heating apparatus is incorporated into a furnace.
Figure 10A:
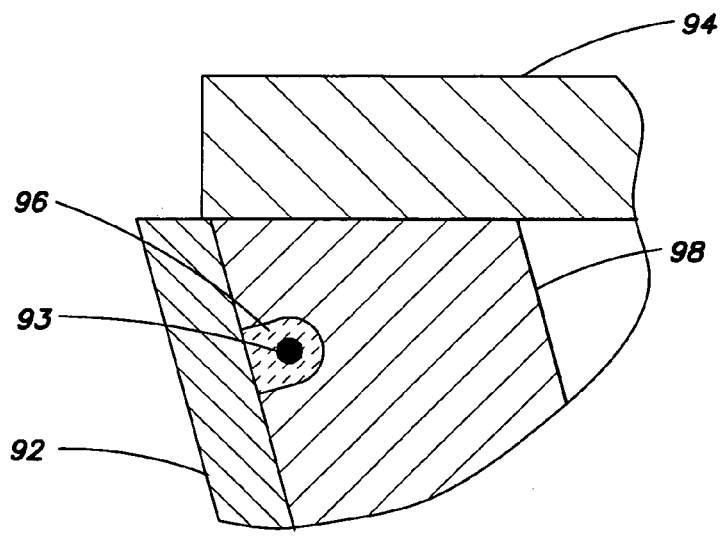
FIG. 10A is an enlarged fragmentary view of the encircled section 10A in FIG. 10.

FIG. 10 illustrates a furnace 90 as an alternative heating system. The furnace includes a bowl-shaped container 91 (as a ferromagnetic core), having a bottom wall 97 and an upwardly flared side wall 98, and a coil 93 embedded in a cubical groove wrapped around the outer circumference of the side wall. A sleeve-like yoke 92 covers the core side wall 98, in direct contact, closing the magnetic loop. A fixed or removable lid 94 covers the top opening of the container 91. A material 95, which is molten or otherwise desired to be maintained at a select temperature, is contained within the core 91. A detail section in FIG. 10A shows the coil 93, surrounded by an insulating layer 96, in close contact with the core side wall 98 and yoke 92.

Figure 11:
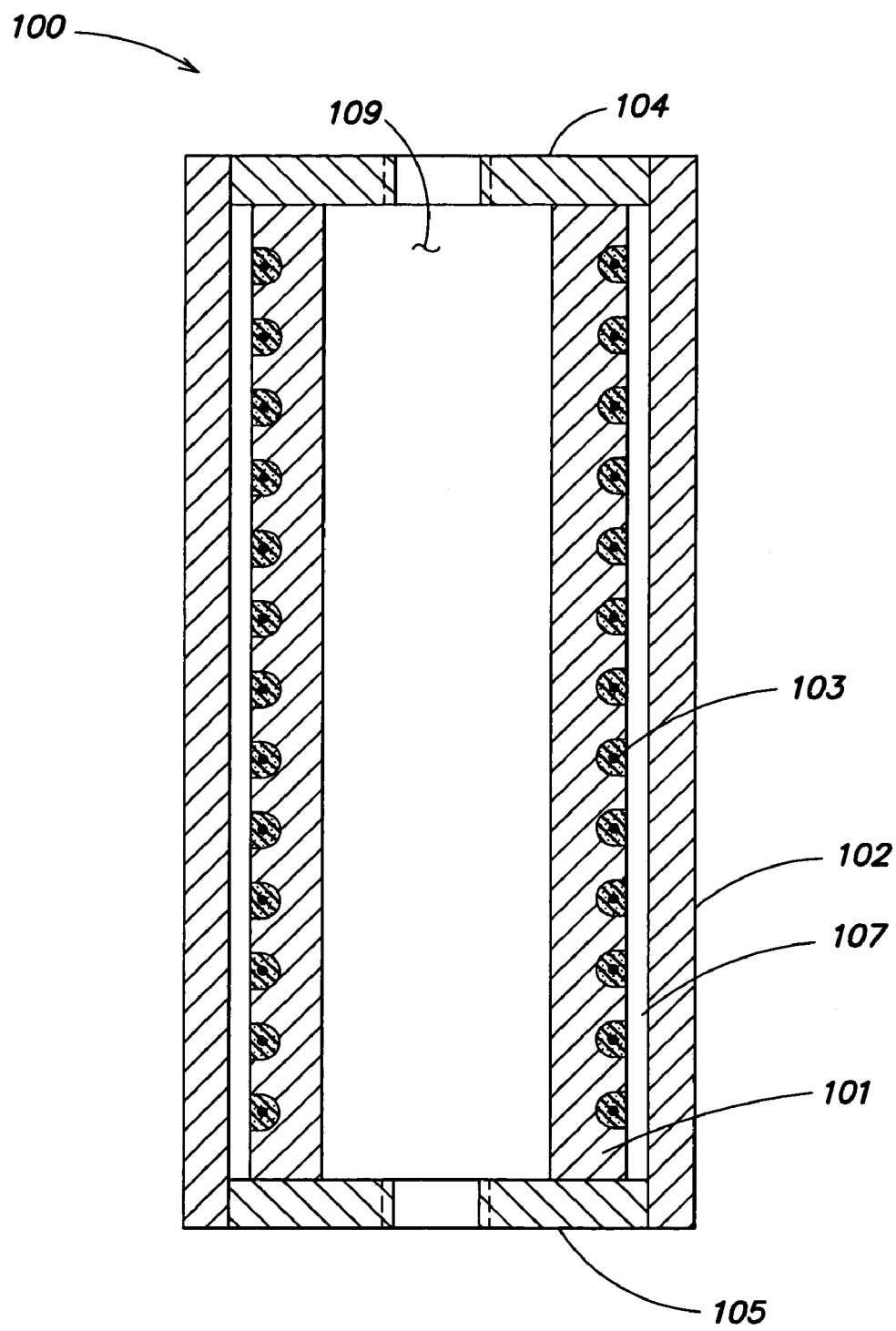
FIG. 11 is a cross-sectional schematic view of another implementation, in which the heating apparatus is incorporated into a water heater or chemical reactor.

FIG. 11 Water Heater or Chemical Reactor

FIG. 11 shows a water heater or chemical reactor 100 implementation in which a cylindrical core 101 has an embedded coil 103 in its outer surface, and a cylindrical yoke 102 surrounds the core but is separated therefrom by an air gap 107. A disc-shaped lower yoke 105 in direct contact with yoke 102 closes the bottom end of the heater/reactor, and a disc-shaped upper yoke 104 in direct contact with yoke 102 closes the top end of the heater/reactor, thus closing the magnetic loop. The close physical (direct) contact between the ferromagnetic core 101 with the upper and lower ferromagnetic yokes 104 105, and the ferromagnetic side wall yoke 102, enhances the coupling of the closed magnetic loop. A flowable material to be heated may be sent through the central passage 109 in the heater/reactor.

Figure 12:
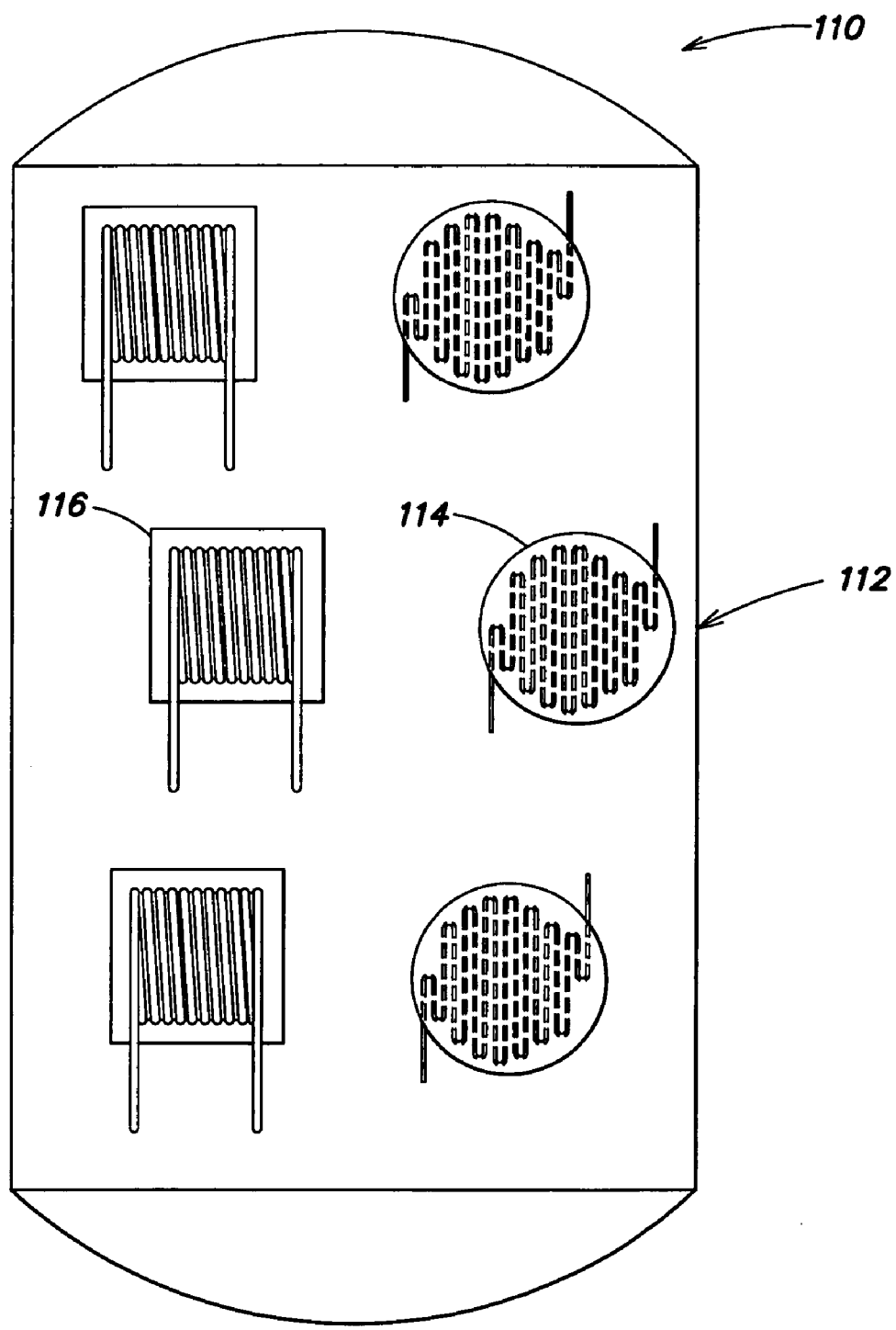
FIG. 12 is a schematic diagram of another implementation, in which the heating apparatus is incorporated as heater patches that are surface mounted on a chemical container or reactor.

FIG. 12 Heater Patches

FIG. 12 shows a further alternative heating system 110 in which a chemical container or reactor 112 has heater patches mounted thereon. Two alternative types of heater patches are shown, circular discs 114 on the right, and square or rectangular plates 116 on the left. The construction of these heater patches may be similar to the structure of FIG. 7.

FIGS. 13–19 Layered Heating Structures

Figure 13:
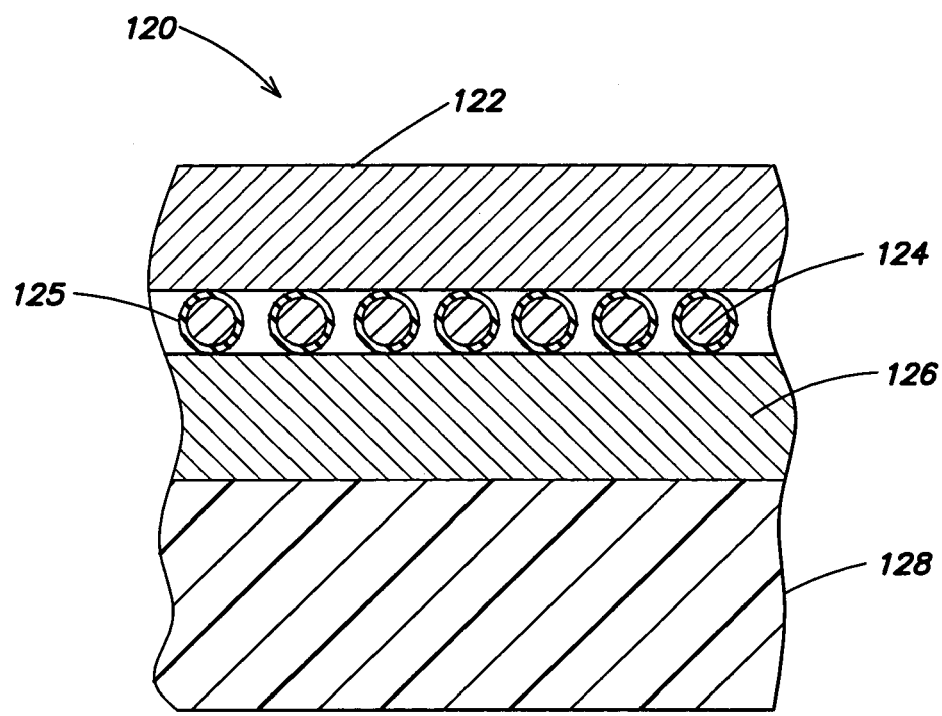
FIG. 13 is a cross-sectional schematic view of one implementation of a layered heating structure.

FIG. 13 is a schematic cross section of a heating apparatus 120 including an outer layer 122, an inner ferromagnetic layer 126, a heating element 124 disposed between the outer layer and inner layer, and an article to be heated 128 adjacent to the inner ferromagnetic layer. The heating element is surrounded with electrical insulation 125, to isolate the electrical conductor from the inner ferromagnetic layer and the outer layer. The outer layer may any of various materials, including ferromagnetic or non-ferromagnetic materials, electrically conductive or non-conductive materials, and thermally insulating or non-insulating materials. The outer layer may also be wholly or partly an air gap.

Figure 14:
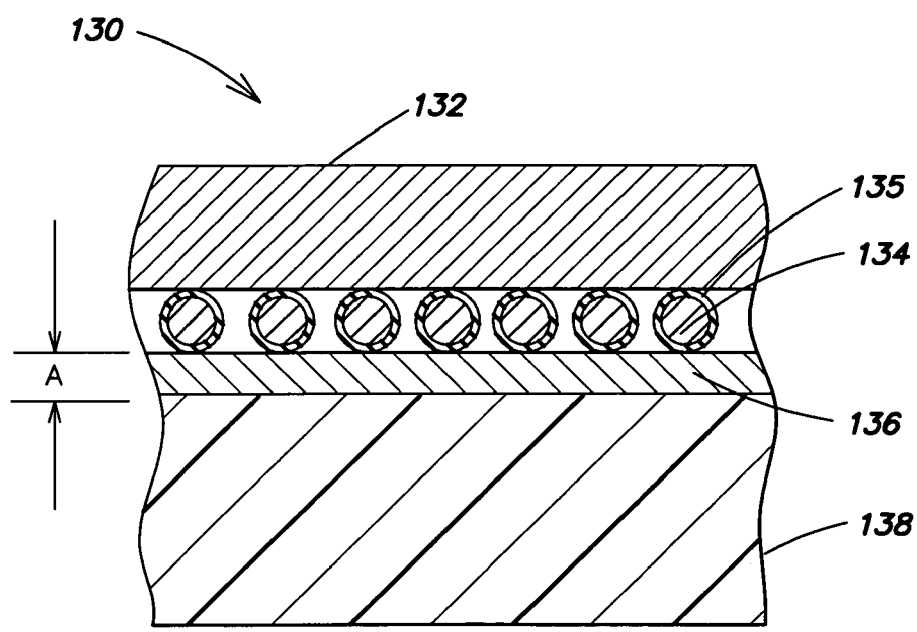
FIG. 14 is cross-sectional schematic view of another implementation of a layered heating structure, having an inner ferromagnetic layer of thickness A.

FIG. 14 shows an alternative apparatus 130 including an outer layer 132, an inner ferromagnetic layer 136, a heating element (with conductor 134 and insulating cover 135) disposed between the outer and inner layers, and an article to be heated 138 adjacent to the inner ferromagnetic layer. Here, the inner ferromagnetic layer has a thickness A of approximately 3δ. Delta (δ) is the depth of penetration of the induced eddy current in the ferromagnetic material of inner layer 136. This thickness A provides a preferred efficiency of transmission of heat from the ferromagnetic layer 136 to the article/material 138 to be heated.

Figure 15:
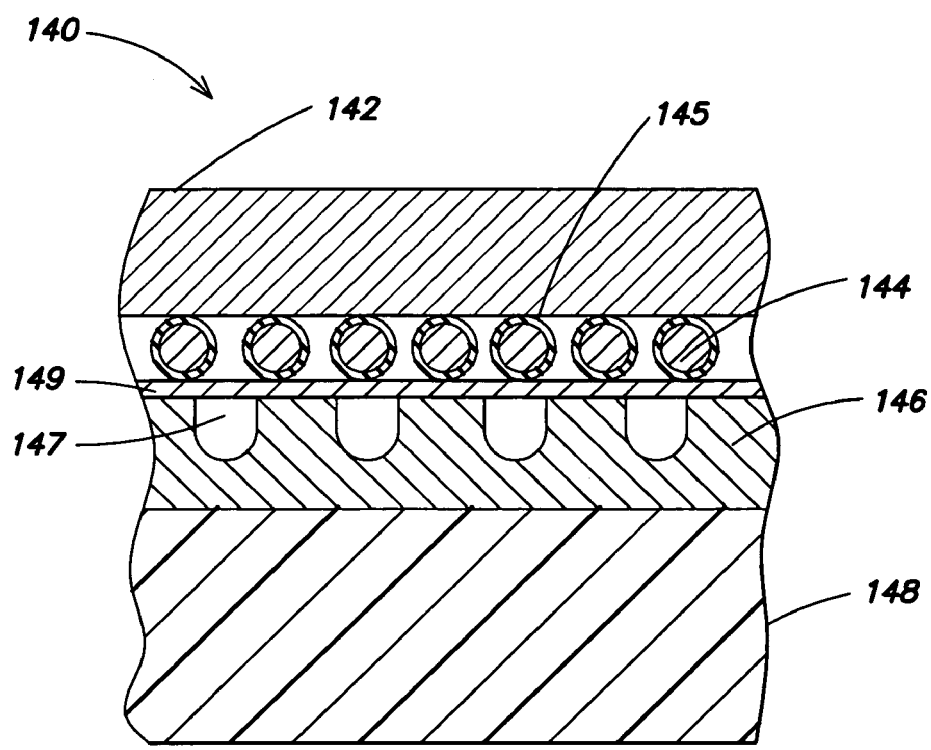
FIG. 15 is cross-sectional schematic view of another implementation of a layered heating structure, with cooling passages in the inner ferromagnetic layer.

FIG. 15 shows an alternative apparatus 140 including an outer layer 142, an inner ferromagnetic layer 146/149 and a heating element (conductor 144 with insulating cover 145) disposed between the inner and outer layers. Again, the article 148 to be heated is disposed adjacent to the inner ferromagnetic layer. Here, the inner layer 146/149 includes cooling passages 147 through which a cooling medium may be passed (e.g., intermittently) to reduce the temperature of the inner layer 146/149, as desired. Alternatively, the cooling passages can be placed in the outer layer 142, or they may be provided in both the outer and inner layers.

Figure 16:
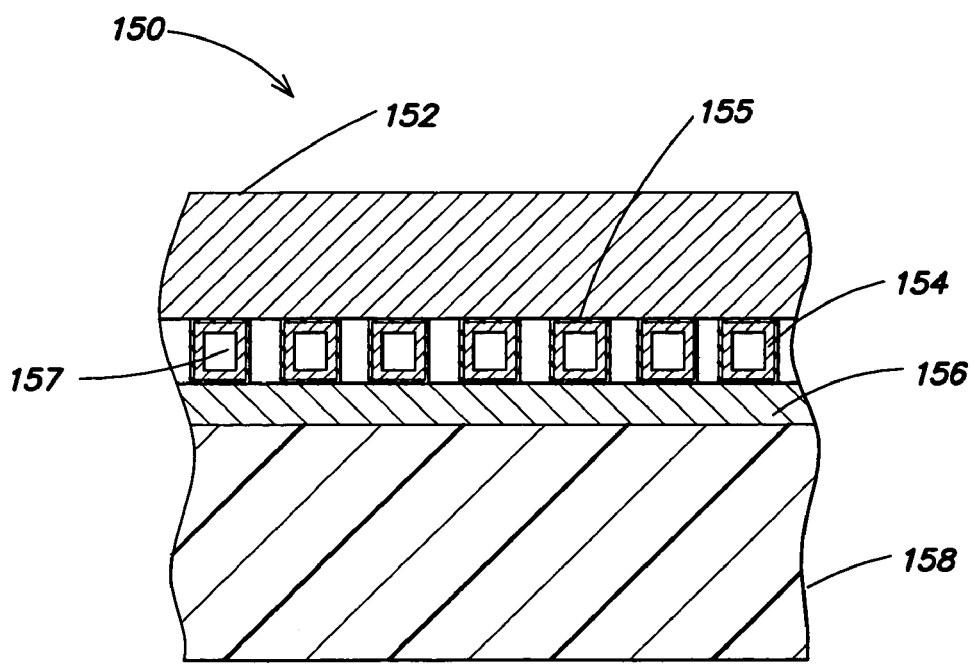
FIG. 16 is cross-sectional schematic view of another implementation of a layered heating structure, with cooling passages in the heating element.

FIG. 16 shows a further alternative apparatus 150, including an outer layer 152, an inner ferromagnetic layer 156, and a heating element (conductor 154 with insulating covering 155) disposed between the inner and outer layers. Again, the article 158 to be heated is disposed adjacent to the inner ferromagnetic layer 156. In this embodiment, the heating element is a hollow rectangular electrically conductive heating element 154 with an interior cooling passage 157. A cooling medium can be passed through the central cooling passage for cooling (e.g., intermittent) of the inner layer 156 and/or outer layer 152.

Figure 17:
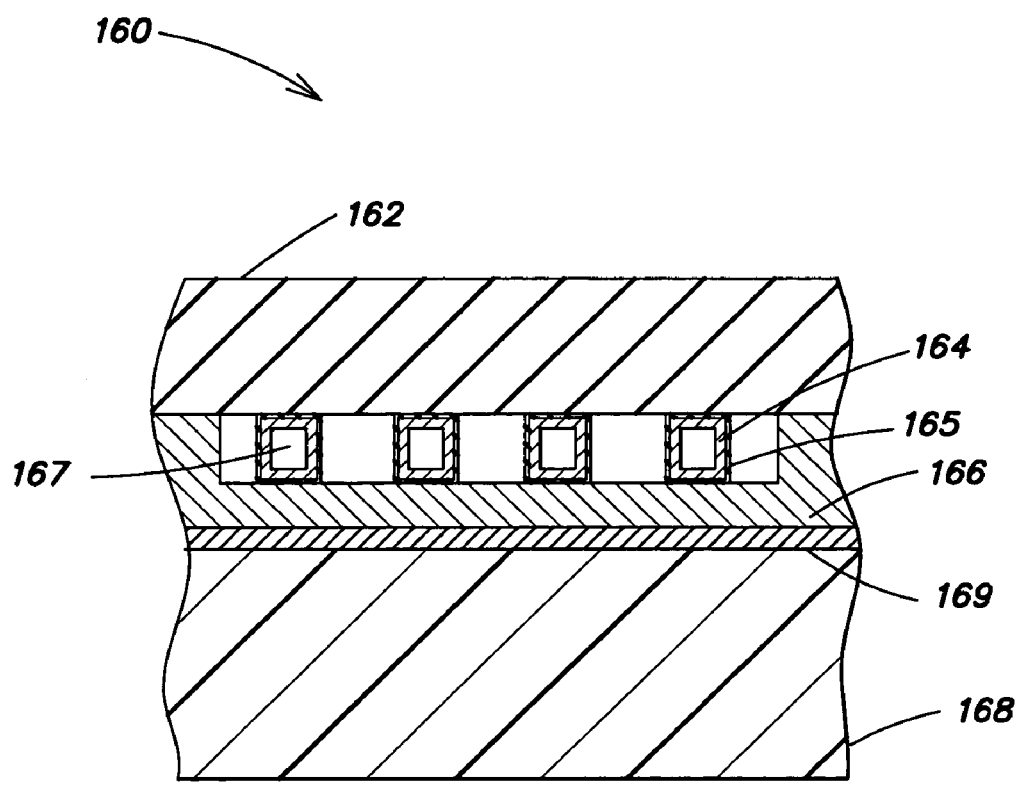
FIG. 17 is cross-sectional schematic view of another implementation of a layered heating structure, where the inner layer includes a corrosion-resistant and thermally-conductive liner.

FIG. 17 shows another apparatus 160 including ferromagnetic outer and ferromagnetic inner layers 162, 166, respectively, surrounding a heating element (conductor 164 with interior cooling passage 167 and insulative covering 165). The inner layer 166 includes a corrosion-resistant and thermally conductive layer 169 adjacent to the article to be heated 168. The inner and outer ferromagnetic layers 162, 166 form a substantially closed magnetic loop for the induced magnetic field. The outer layer 162 may be thermally insulative.

A thermal spray (TS) method may be used to manufacture an integrated layered heating element in the various structures described above in FIGS. 13–17, and below in FIGS. 18–19. These integrated layered structures enable the heating element to be part of a structural element of the apparatus, able to withstand compressive forces applied, for example, to a melt channel, blow mold, or compression molding system.

Figure 18:
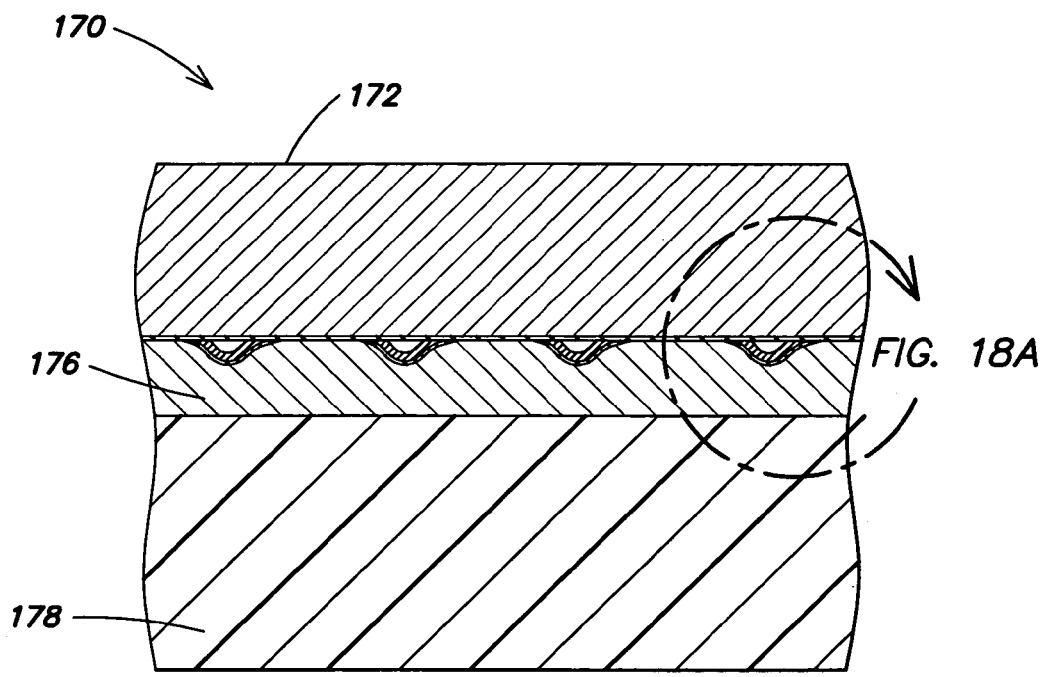
FIG. 18 is cross-sectional schematic view of another implementation of a layered heating structure, formed by a thermal spray method.
Figure 18A:
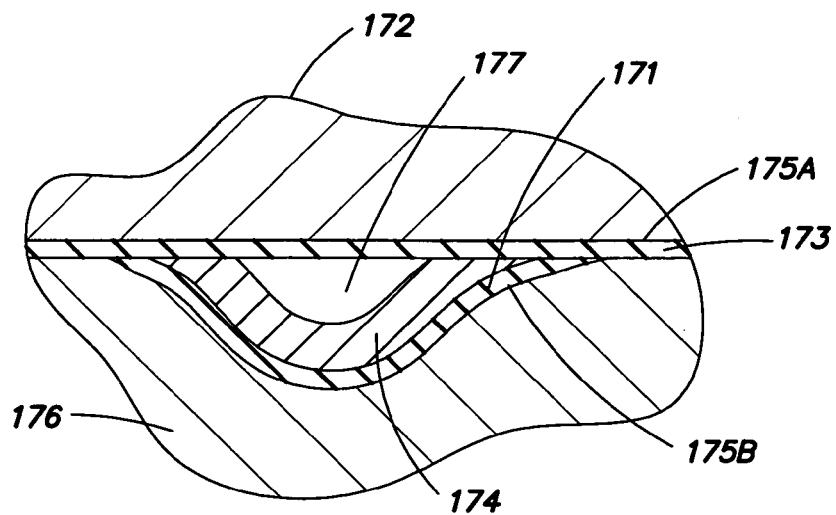
FIG. 18A is an enlarged fragmentary view of the encircled section 18A in FIG. 18.

FIGS. 18–18A shows for example a layered heating apparatus which includes a heating element disposed between an outer layer 172 and an inner ferromagnetic layer 176. The heating element has an outer dielectric layer 175A, an interior cooling passage 177, a conductive coil layer 174 and an inner dielectric layer 175B. Alternatively, the cooling passage can be eliminated from within the heating element or it may be provided at other locations in the heating apparatus. To manufacture this structure, channels 171 are formed in the outer surface 173 of the inner layer 176. The inner dielectric layer 175B is thermally sprayed in the channels 171. Next, the electrically conductive coil layer 174 is thermally sprayed over the inner dielectric layer 175B. The applied layers 175B and 174 may be removed from outer surface 173 except in the channels 171. The second dielectric layer 175A may be thermally sprayed on the inner surface of outer layer 172. The outer and inner sections are then joined together, leaving a cooling passage 177 between layers 175A and 174.

Figure 19:
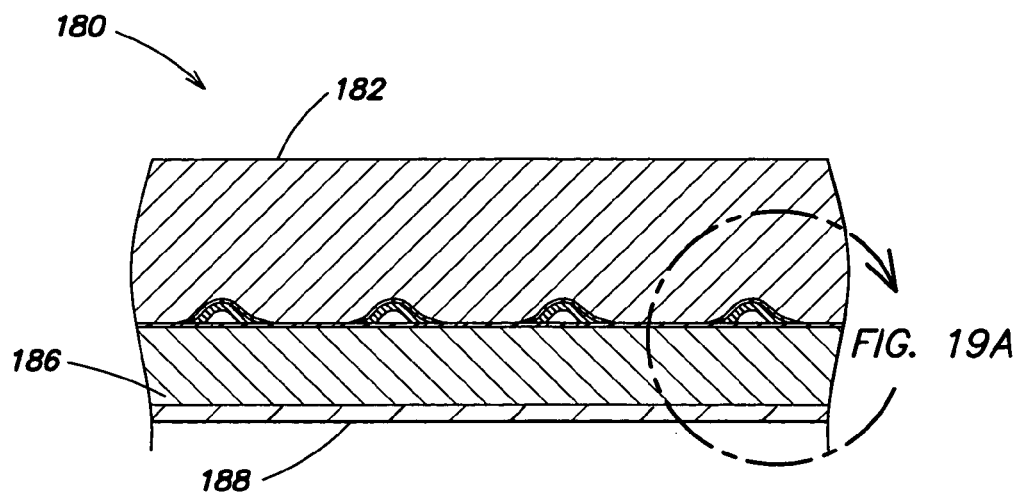
FIG. 19 is cross-sectional schematic view of another implementation of a layered heating structure, formed by a thermal spray method.
Figure 19A:
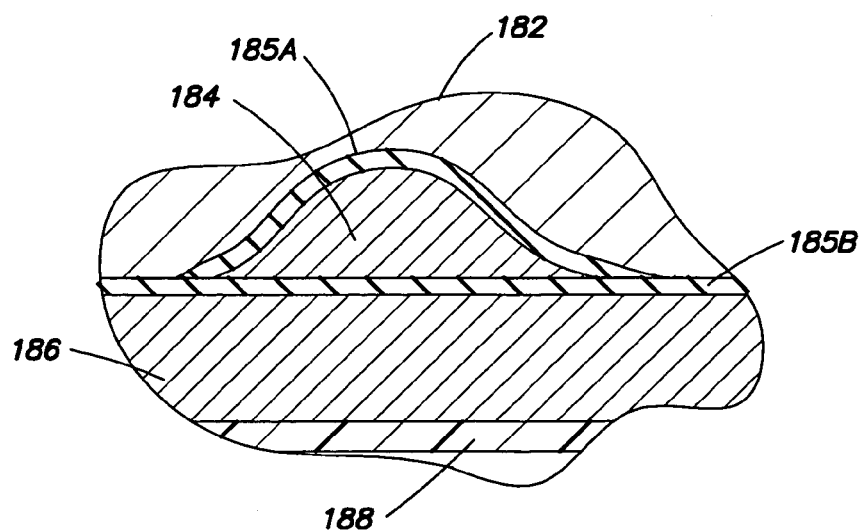
FIG. 19A is an enlarged fragmentary view of the encircled section 19A in FIG. 19.

An alternative thermal-sprayed implementation is shown in FIGS. 19–19A. Here, the apparatus 180 includes an outer non-ferromagnetic mold base 182, an outer dielectric insulating thermal-sprayed layer 185A, a heating coil layer 184, an inner dielectric thermal-sprayed layer 185B, an inner ferromagnetic molding surface layer 186, and an article to be heated 188 disposed adjacent the inner molding surface. An applied magnetic field induces an eddy current in the inner ferromagnetic molding surface layer 186. The substantially non-ferromagnetic (e.g., aluminum) mold base 182 will not have significant induced eddy currents, compared to the inner layer 186, and thus will be substantially cooler. Once the heating element 184 is turned off, rapid cooling of the molding surface layer 186 can take place. The substantially greater mass of the cooler outer mold base 182 will pull heat out of the substantially lower mass molding surface layer 186. Here, the cooling medium or mechanism is the outer non-ferromagnetic mold base 182 itself, acting as a heat sink.

FIGS. 20–22 Injection Nozzle

In a traditional nozzle heating assembly, resistive heater bands are located on the outer circumference of the injection nozzle. Heat resistively generated in the heater bands must then be thermally conducted from the outer surface of the nozzle to its the inner surface, where a material (to be heated) flows through a central nozzle passage. This is a relatively inefficient method of heating, and it is difficult to provide either a uniform temperature or rapid heating. If the nozzle is heated too rapidly, thermal gradients are produced which may lead to structural failure (e.g., cracks) in the nozzle. The nozzle itself is an extension of an extruder/barrel apparatus, and typically is subjected to several tons of force, e.g. 5–10% of the clamp tonnage. Thus, small cracks induced by excessive thermal gradients are likely to grow and lead to ultimate failure.

Also in the prior art design, a separate cooling circuit is provided in the injection nozzle to prevent "drool" or "stringing" of the plastic melt when the mold is opened for removal of the molded object. Thus, every molding cycle, the movable side of the injection mold is opened and, for the duration of the mold disengagement, the flow of molten plastic to the nozzle must stop. If drool or stringing occurs from the separated melt passages (in the mold and nozzle), it must be removed, causing down time and a loss of material. Alternative methods to control this problem are expensive, or in many cases not practical. Decompression of the extruder or mechanical shut-off of the nozzle may help prevent drool, but certain molding materials do not allow for decompression because it creates defects (air inclusion) in the molded part. Mechanical shut-off devices are problematic because they require extra moving components, electrical sensors, hydraulic hoses (with an accompanying risk of hydraulic leak and fire), wear of components, accurate fit of shutoff pins, and maintenance.

Thus, it would be desirable to control a melt passage orifice temperature at a precise level and/or allow rapid heating and cooling of the orifice. This could reduce or eliminate the need for mechanical shut-off devices. Further, such thermal control of the melt would enable formation of a solidified segment, partially solidified segment, or an increase of viscosity of the melt such that it does not drool or string.

It would also be desirable to provide a more compact and energy efficient heating apparatus, compared to the traditional resistive heater bands applied to the outer surface of the nozzle. With these prior known devices, heating and cooling are applied far away from the desired area (central passage) to be heated or cooled, thus resulting in poor thermal response time. As a result, the heating and cooling hardware are increased in size to compensate for the thermal inefficiencies, making the heating and cooling apparatus very bulky. Still further, the lifetime of a resistive heater, at temperatures such as 600° F., is very limited, increasing the down time when the heater needs to be replaced.

FIGS. 20–22 illustrate an improved heating and cooling system for an injection nozzle assembly. The nozzle assembly 200 is generally cylindrical, having a central through passage 208 extending from a first or barrel/extruder end 210 and to a second mold end 212. The nozzle includes an inner component 202 and a coaxial outer component 204, and a coiled heater element 206 disposed between the inner and outer components. The heating element 206 is shaped as a helical coil wrapped around the outer cylindrical surface 213 of tube 214, on the mold end of the inner nozzle component 202. The tube and heating element fit within an inner bore 216 of the outer component 204, as shown in FIG. 21. A continuous through passage is formed by a central bore 220 of the outer nozzle 204 at the mold end 212, and continues through a central passage 222 extending the length of the inner nozzle 202 to the barrel/extruder end 210.

A plastic melt passes through the central passage, coming from an extruder, through the nozzle 200, through a hot runner system, and into the mold. Following injection of a predetermined amount of plastic melt from nozzle 200 into the mold, and following some cooling time in the mold, the mold is opened, i.e., separated from the nozzle, at which time the flow of plastic melt through the nozzle must cease. The heating and cooling elements of the present nozzle enable an energy efficient and relatively simple mechanism for controlling that melt flow during the injection cycle.

During a first portion of the injection cycle, molten plastic will flow through the central passage 208 of the heated nozzle assembly. A current pulse signal is applied to the heating element 206, which generates an alternating magnetic field. This field generates an induced eddy current in the ferromagnetic tube 214 of the inner nozzle, heating the inner nozzle tube. Heat in the inner nozzle tube is transmitted to the molten plastic flowing through the central passage 222 of the inner nozzle. The heating element 216 is positioned relatively close to the central passage 222, compared to the prior art resistive heating bands applied on the outer surface of the nozzle assembly.

In the embodiment shown, the heater coil is a nickel chromium alloy (NiCr) coiled element having a relatively large cross section to reduce the amount of resistive heat generated in the coil. The coil is covered by an electrically insulating material in order to electrically isolate the heating element from the inner and outer nozzle components 202, 204. Furthermore, a passage 230 is formed between the inner and outer nozzle components through which a cooling medium can be passed. During a second portion of the injection molding cycle, the current pulse Signal can be partially or totally reduced, to reduce or eliminate the inductive heating generated in the ferromagnetic inner nozzle 202 and thus reduce the heat transmitted to the molten plastic in the passage 222. To cool the ferromagnetic inner nozzle 202, a cooling medium is passed through the cooling passage 230 in order to draw heat out of the inner nozzle tube 214. This enables rapid cooling of the plastic melt during the second portion of the cycle. The mold can then be opened and plastic will no longer flow through the nozzle, due to formation of a solidified segment, partially solidified segment, or increased viscosity of the plastic.

The outer nozzle 204 need not be formed of a ferromagnetic material, where inductive heating of the outer nozzle is not desired. Alternatively, the outer nozzle can be made of a ferromagnetic material where it is desired to inductively heat the outer nozzle as well as the inner nozzle.

This nozzle design enables rapid heating to achieve a uniform or steady state heating, as well as rapid cooling during another portion of the injection cycle. At relatively low temperature applications, it is possible to use a copper heating coil 206 without any cooling period. However, for higher temperature applications, e.g. 600° F., a copper coil would oxidize and incinerate within a short period of time. In higher temperature applications it is preferred to use a Nichrome (NiCr) coil which can withstand higher temperatures.

Furthermore, this implementation provides a compact and efficient nozzle design. Heat is generated closer to the central passage 222, where it is transmitted to the material to be heated. Cooling is also applied closer to the inner nozzle, to enable rapid cooling of the inner nozzle and melt during the mold open (disengagement) portion of the injection cycle.

Figure 23:
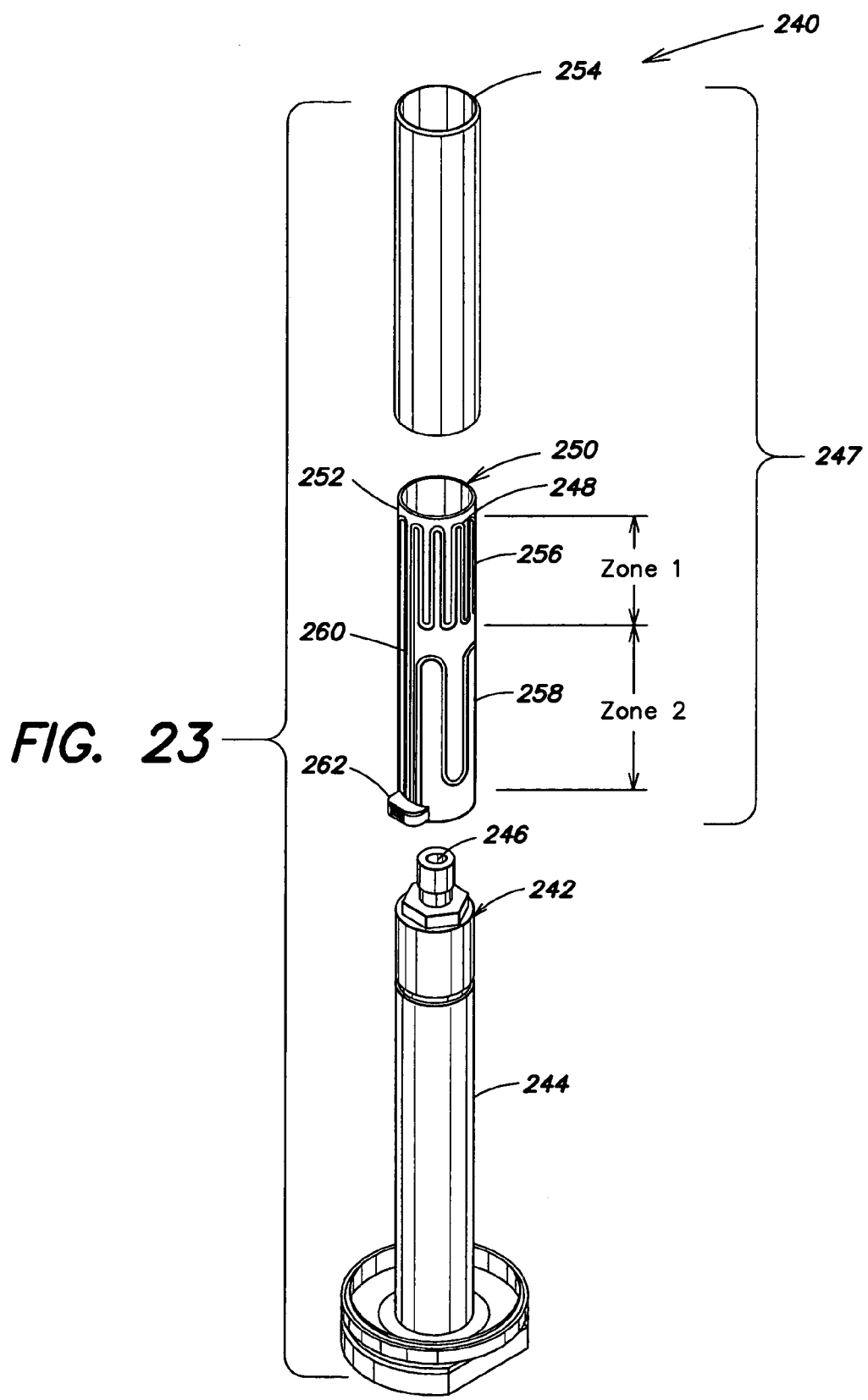
FIG. 23 is an exploded parts view of a multi-temperature zone nozzle assembly, having upper and lower serpentine conductor patterns.
Figure 24:
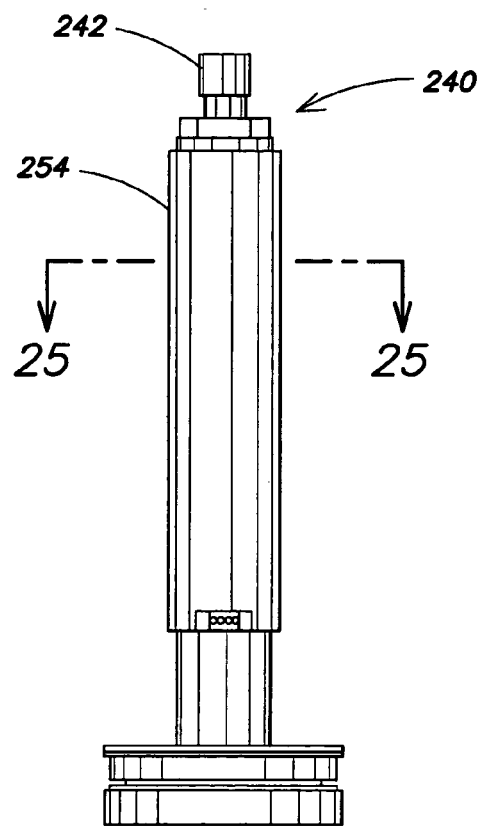
FIG. 24 is an elevational side view of the assembled nozzle of FIG. 23.
Figure 25:
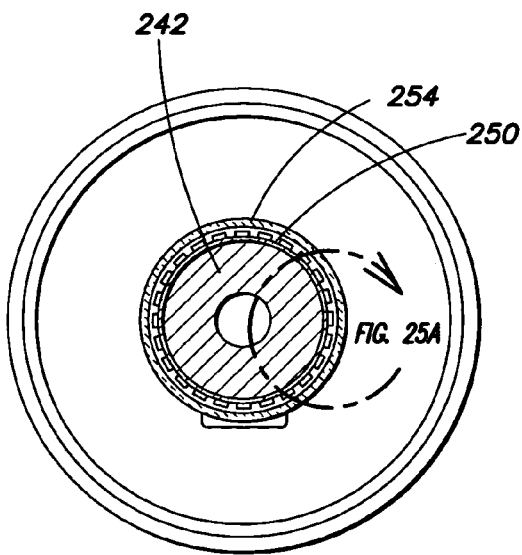
FIG. 25 is a sectional view taken along line 25—25 in FIG. 24.

FIGS. 23–25 Multi-Zone Hot Runner Nozzle

FIGS. 23–25 show another embodiment of a heating apparatus incorporated in a multi-temperature zone nozzle assembly 240. A steel hot runner nozzle 242 has an elongated cylindrical portion 244 with a central passage 246. A heater sleeve assembly 247 includes a heating coil 248 disposed on a tube or sleeve 250 and covered by outer layer 254. The electrically conductive coil 248 is provided in a serpentine pattern on an outer surface 252 of the inner sleeve 250. The sleeve assembly 247 slides over cylinder 244 of the nozzle 242. The inner sleeve 250 and outer layer 254 provide electrical insulation between the electrical conductor 248 and the ferromagnetic steel nozzle cylinder 244. In this embodiment, which relies primarily on inductive heating of the ferromagnetic steel nozzle, it is not required to have intimate physical contact between the heating assembly and nozzle (as would be required for transfer of resistive heat generated by the electrical conductor).

FIG. 23 shows an exploded view of the multi-zone heating assembly for the injection molding nozzle. The outer layer 254 is shown removed from the assembly, but in practice it is permanently attached over the heating element and inner sleeve 250. Two temperature control zones (Zone 1 and Zone 2) are shown, illustrated by an upper electrical conductor pattern 256 having fairly close spacing between adjacent elements in the serpentine pattern, and a lower more widely spaced pattern 258. If the upper and lower conductive patterns are powered by the same signal, the upper pattern 256 would deliver more heat than the more widely spaced lower pattern 258. The use of the serpentine pattern allows for rear exiting of the leads 260 from the multiple zones; an electrical connecter 262 is provided at the lower end of the inner sleeve.

Figure 25A:
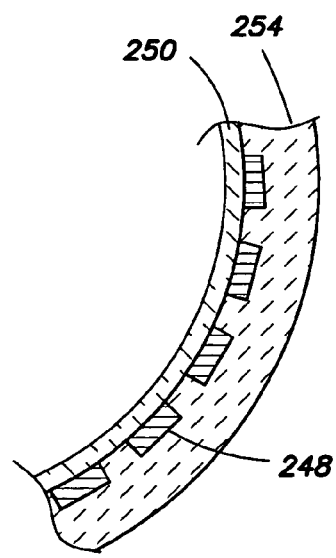
FIG. 25A is an enlarged fragmentary view of the encircled section 25A in FIG. 25.

FIG. 24 is a profile view of the assembly with the heater sleeve installed over the nozzle 242. Various lengths and numbers of zones can be implemented to accommodate different nozzle lengths. FIGS. 25 and 25A show cross-sectional views depicting the heating element 248 disposed between the inner dielectric (e.g., ceramic) tube 250 and the outer dielectric (e.g., ceramic) layer 254.

A benefit of this nozzle and heater sleeve assembly is the ability to rapidly remove the heater sleeve assembly 247 from the nozzle 242 in order to clean or otherwise service the nozzle. In contrast, prior heating elements required a close tolerance fit to the nozzle making service much more difficult and time-consuming. For example, if a resistive heating element fails and needs to be replaced, it often must be pried loose from the nozzle. Here, the relatively loose fitting ceramic sleeve can provide, for example, up to a half millimeter gap between the inner sleeve 250 and nozzle cylinder 244, and still provide effective inductive heating of the nozzle. Also, the heater sleeve assembly can be economically manufactured by providing an inner ceramic tube 250, spraying the heating element 248 over the outer surface of the tube 250, and then casting the outer ceramic layer 254 over the heating element 248 and tube 250. The cast outer layer 254 may provide the majority of the structural integrity of the sleeve.

FIGS. 26–29 Blow Mold

FIGS. 26–30 show another embodiment in which a heating apparatus is incorporated into a container blow molding apparatus 300. In this example, a heating element will provide primarily inductive heating in order to rapidly heat a thin film of ferromagnetic material (a mold insert) provided on the inner surface of the mold. The outer mold can then be maintained at a lower temperature. Rapid heating and cooling of this thin ferromagnetic molding surface layer enables a reduction in the overall cycle time for blow molding and/or thermally conditioning of a container.

Conventional thermal conditioning processes utilize a high mold temperature to condition a plastic container within the blow mold. This high mold temperature requires the use of air cooling, on the internal surface of the blown container, in order to permit removal of the container from the mold without excessive shrinkage or distortion. These conventional molds may have surface temperatures of 260–280° F., and require the constant introduction and exhausting of compressed air at pressures of 600 psi (40 bars), to cool the internal surface of the container while the outer surface is in contact with the hot mold. Depending upon the polymer used, this type of thermal processing may be used to provide increased levels of crystallinity.

The use of high mold temperatures and internal air flushing/cooling reduces the throughput, compared to a lower operating temperature mold. For example, at a lower mold temperature of 190° F., a bottle manufacturer may be able to produce 1400 containers per mold per hour; in contrast, at a higher mold temperature of 260–280° F., this number may be reduced to 1200 bottles per hour or less. This reduction in process throughput is a significant cost disadvantage, in addition to the greater cost and complexity of the molding apparatus required by air cooling.

Figure 26:
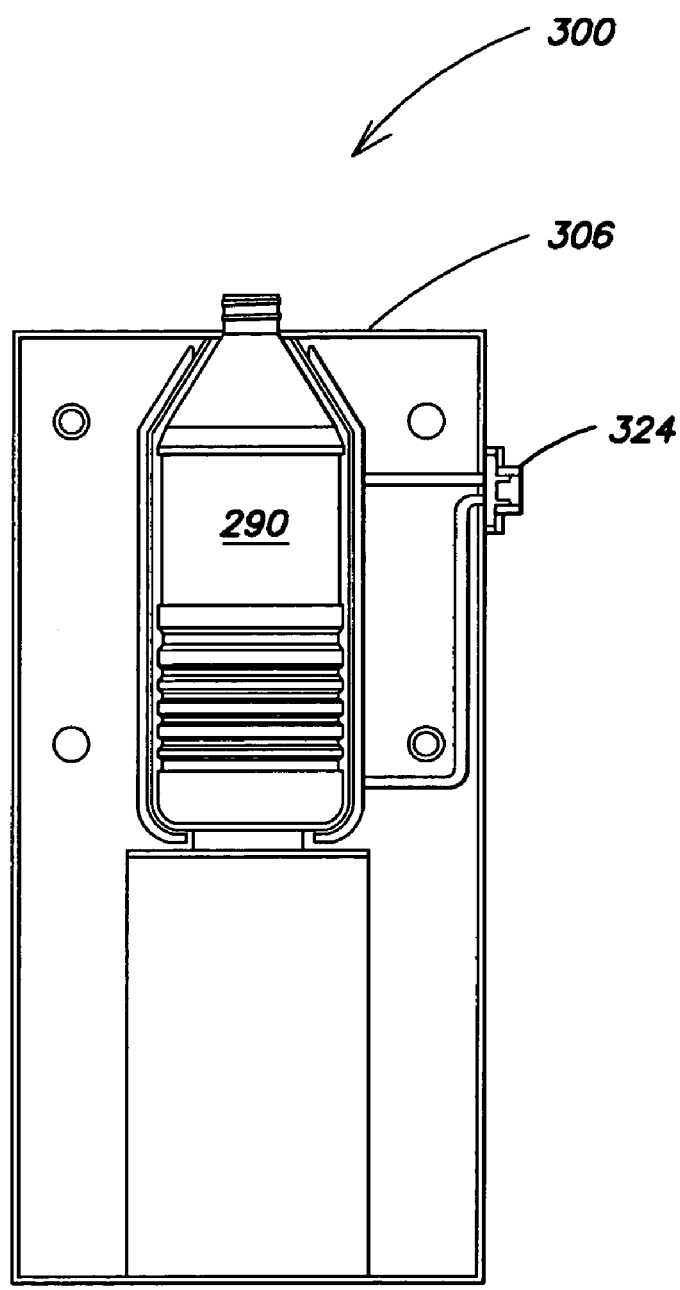
FIG. 26 is an elevational view of one half of a blow-molding apparatus.
Figure 27:
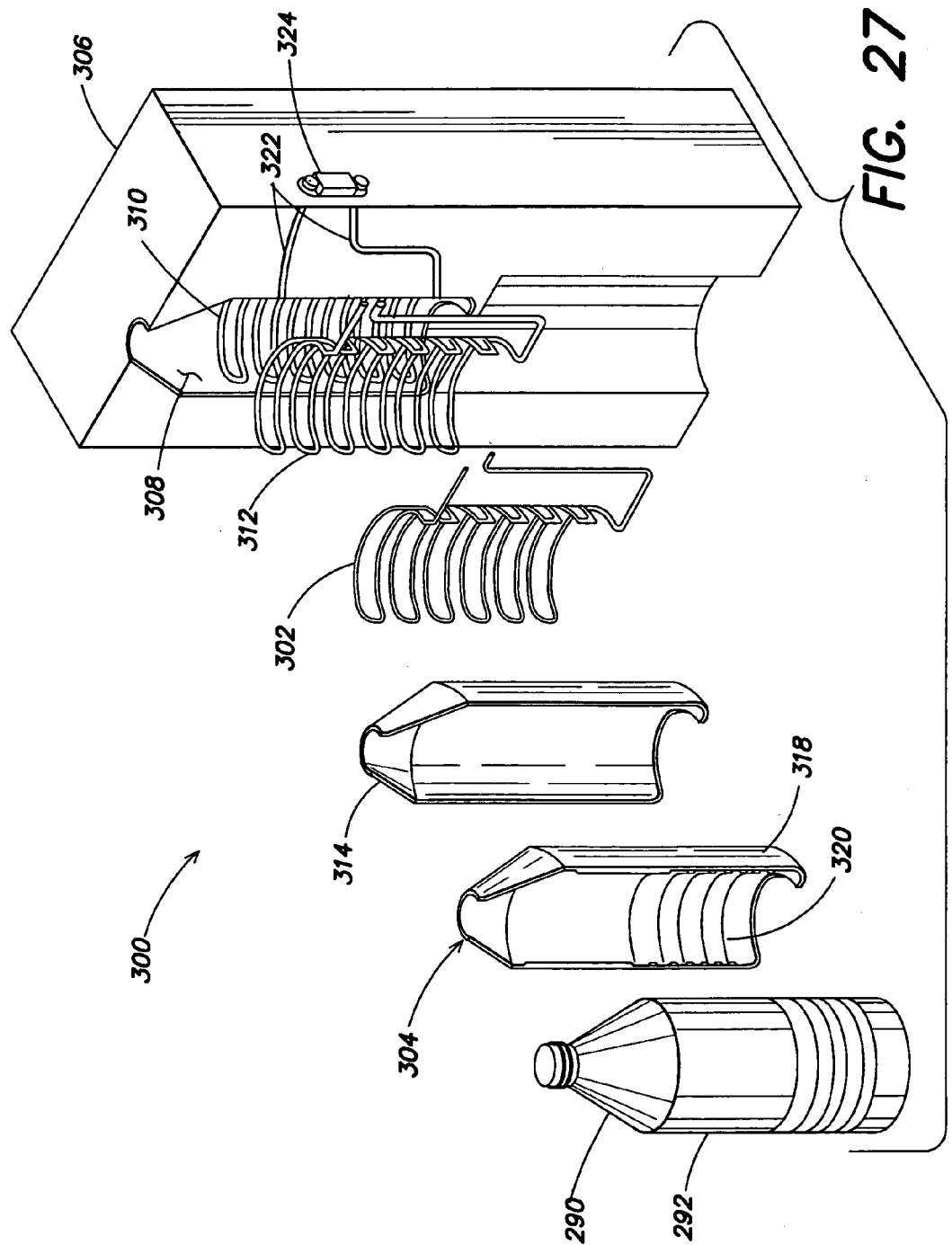
FIG. 27 is an exploded parts view of the blow-molding apparatus of FIG. 26.

FIGS. 26–27 show one half of applicant's blow molding apparatus 300 for making a plastic bottle 290. In the exploded view of FIG. 27, an outer mold portion 306 made of aluminum Al has an inner shaped contour 308 for forming one half of the container sidewall. A serpentine groove 310 is provided in this inner mold surface, which is shaped to accommodate a heating coil 302 and an adjacent outer dielectric coil 312. The heating coil 302 is disposed between this outer dielectric coil 312, which is also provided in a serpentine pattern, and an inner dielectric layer 314, shown as a continuous sheet. Adjacent the opposite side of inner dielectric layer 314 is a relatively thin layer (compared to the outer mold 306) ferromagnetic mold insert 304, here for example made of NiCr, and formed as a continuous sheet. The mold insert 304 has an outer surface 318 in contact with the inner dielectric layer 314 and has as an inner surface 320 a shaped contour with details to be reproduced in the blown sidewall 292. The outer mold base 306 is provided with grooves 322 and an electrical connector 324 for leads supplying current to the heating coil 302.

Figure 28:
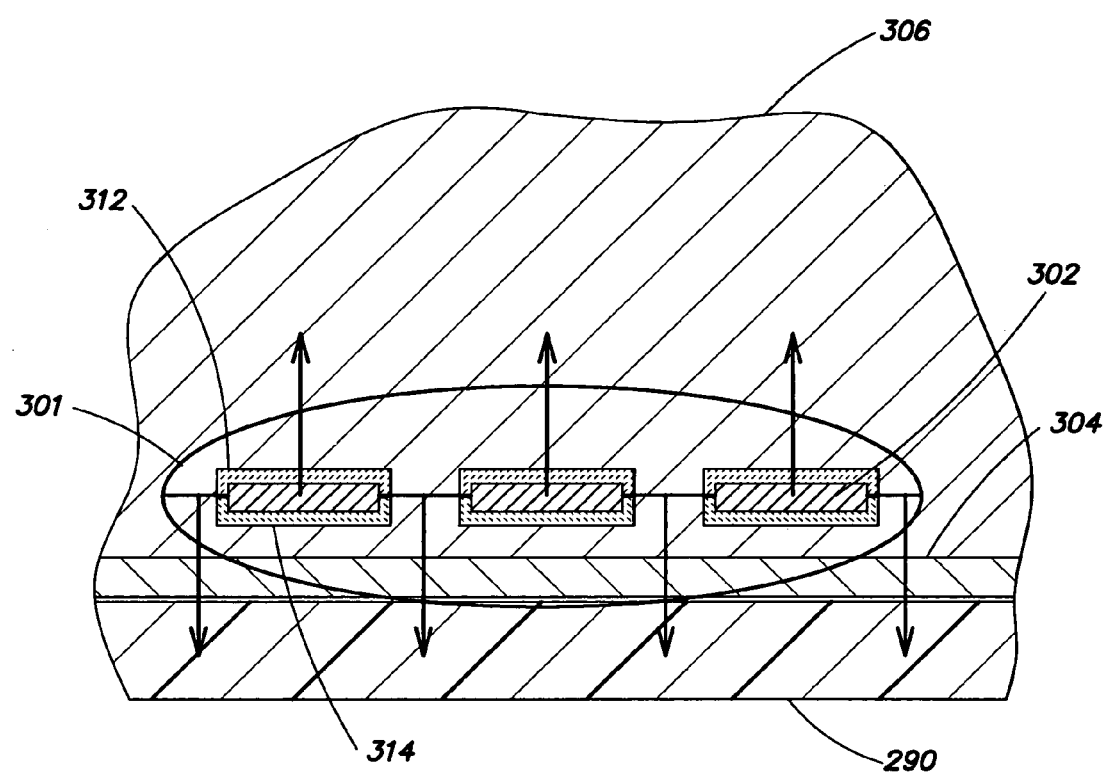
FIG. 28 is a schematic fragmentary view of the heating element and adjacent layers of the apparatus of FIG. 27.

FIG. 28 is a schematic sectional view illustrating the mold surface heating of the bottle wall. The heating coil 302, with surrounding dielectric layers 312, 314, is shown disposed between the outer mold base 306 and the much thinner mold insert 304. The current in heater coil 302 generates a magnetic flux 301 which extends through the NiCr mold insert 304 and also the Al mold base 306. Because the Al mold base 306 has much lower resistance to eddy currents compared to the NiCr mold insert 304, the mold base 306 will not generate significant heat from eddy currents. In contrast, the mold insert 304 will generate significant eddy currents that inductively heat the mold insert 304. The bottle sidewall 292 is held in close contact with the mold insert 304 during the molding process and thus heat is transferred from the inductively heated mold insert 304 to the bottle wall 292.

Figure 29:
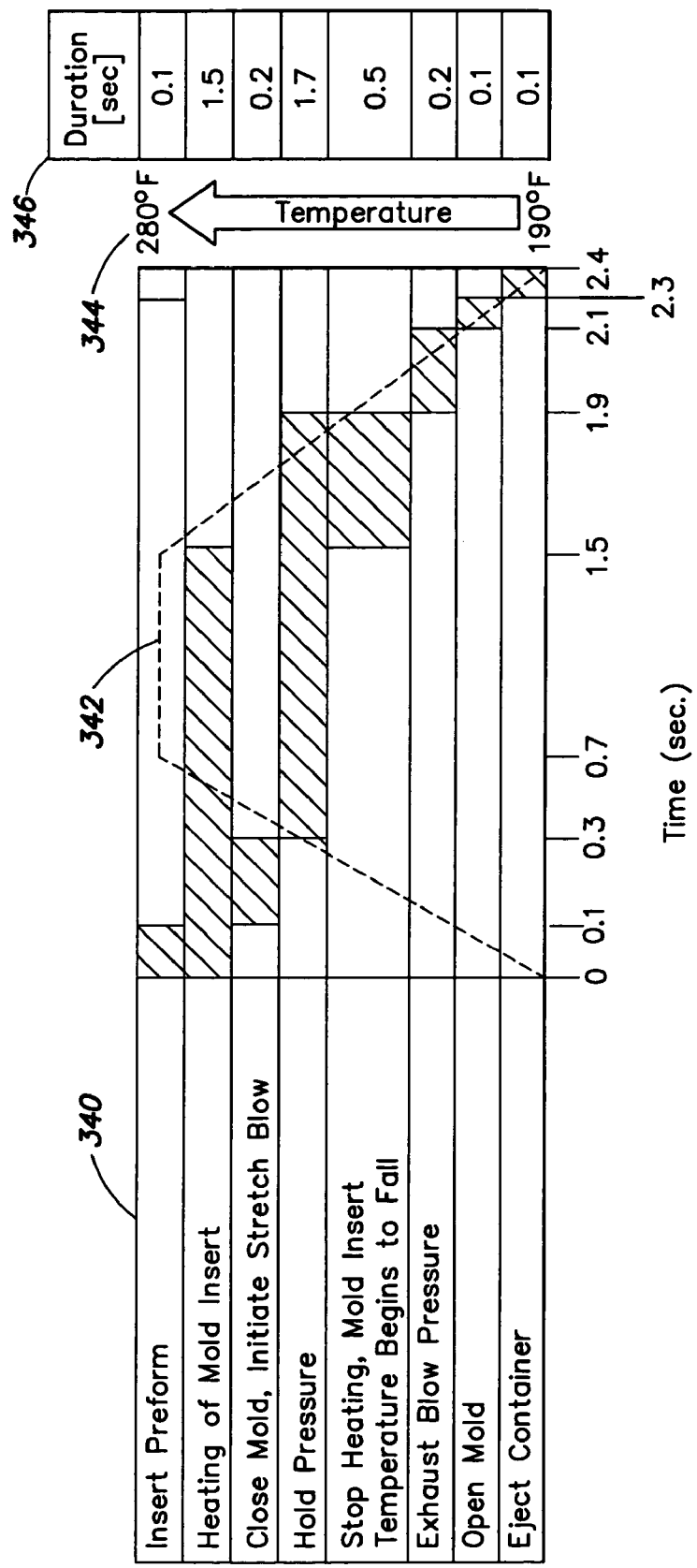
FIG. 29 is a timing diagram of a blow-molding and thermal-conditioning method.

FIG. 29 illustrates a reduction in cycle time that can be achieved by use of this blow mold apparatus. The steps of the blow molding cycle 340 are listed on the left side of the graph; the horizontal axis is time, in seconds (sec). The dotted line 342 represents the temperature of the bottle sidewall, according to a temperature scale 344 provided on the right side of the graph. Also provided on the far right is an approximate indication in seconds (duration 346) for each portion of the cycle.

At the beginning of a new cycle, a heated preform (from which the bottle will be formed) is inserted into the mold (duration 0.1 sec). The preform enters the mold at a temperature of about 190° F., about the same as that of the outer mold base. The mold insert is being heated to the desired maximum temperature, namely 280° F. Inductive heating of the mold insert will continue for 1.5 seconds of the cycle. The mold is closed (at t=0.1 sec in the cycle), and stretch blow molding of the preform is initiated (duration 0.2 seconds). The expanded preform container contacts the heated mold insert, and the sidewall temperature continues to rise until it reaches the mold insert temperature of 280° F. (at about t=0.7 sec in the cycle). The pressure is held in order to maintain the bottle sidewall in contact with the mold for purposes of thermal conditioning (duration 1.2 seconds; from t=0.3 to 1.5 sec in the cycle). At this point in the thermal conditioning, the inductive heating is reduced or turned off and cooling of the mold insert begins. The lower temperature outer mold base now draws heat from the mold insert, and as a result the bottle wall, still in contact with the mold insert, drops in temperature (from t=1.5 to 1.9 sec in the cycle). Next, as the blow pressure is exhausted (at t=1.9 sec), the cooled bottle wall reaches a temperature acceptable for ejection from the mold. The mold is opened (at t=2.1 sec) and the container is ejected (at t=2.3 sec). Once the part is ejected, heating of the mold insert begins again for the next cycle. The desired maximum mold insert temperature is reached and the next preform is inserted to begin a new cycle. The total cycle time (from insertion of the preform to ejection of the container), which includes heating, expanding and conditioning the container over a temperature range from 190° F. up to 280° F., is abut 2.4 sec.

In this example, inductive heating enables rapid heating of the thin film ferromagnetic molding surface (i.e., the mold insert 304). By terminating (or substantially reducing) power to the heating coil 302, the thin ferromagnetic film quickly cools to the lower outer mold temperature (190° F. of mold base 306); this eliminates the need for internal air circulation of the blown container. There are considerable capital, energy and maintenance savings by eliminating the need for internal air cooling of the container. The rapid thermal cycling of the blow molding surface may provide a container having improved properties from thermal conditioning, such as sharper detail in the sidewall and/or a stiffer feel to the container. This is achieved without the need for the slower throughput of a higher mold base temperature, and without the costs associated with internal air cooling.

This apparatus and method may also provide significant benefits over the prior art two-mold process used to produce containers with high levels of thermal conditioning. In the two-mold process, a container is blown in a first mold, removed and subjected to radiant heat in a conditioning oven, and then transferred to a second blow mold and reblown into a final desired shape. The resulting containers are typically used for very high use temperatures (e.g., pasteurization applications). By use of the present inductive heating elements, and molding over a longer cycle time, the required high crystallization levels can be achieved utilizing a single mold process. This significantly reduces the capital and operating cost requirements. As a still further alternative, it is possible to incorporate ferromagnetic additives to the polymer from which the bottle is blown in order to inductively heat the bottle wall directly, as well as by a transfer of heat from the molding insert.

FIGS. 30–36 Compression Mold

Figure 30:
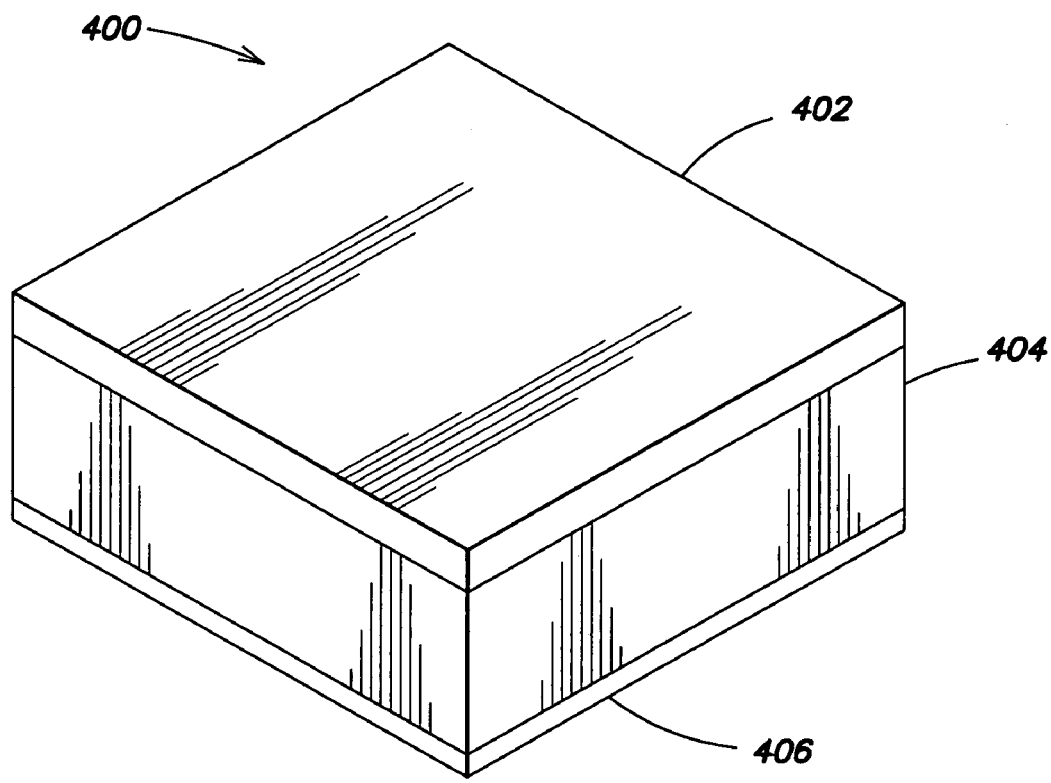
FIG. 30 is a schematic perspective view of a compression mold.
Figure 31:
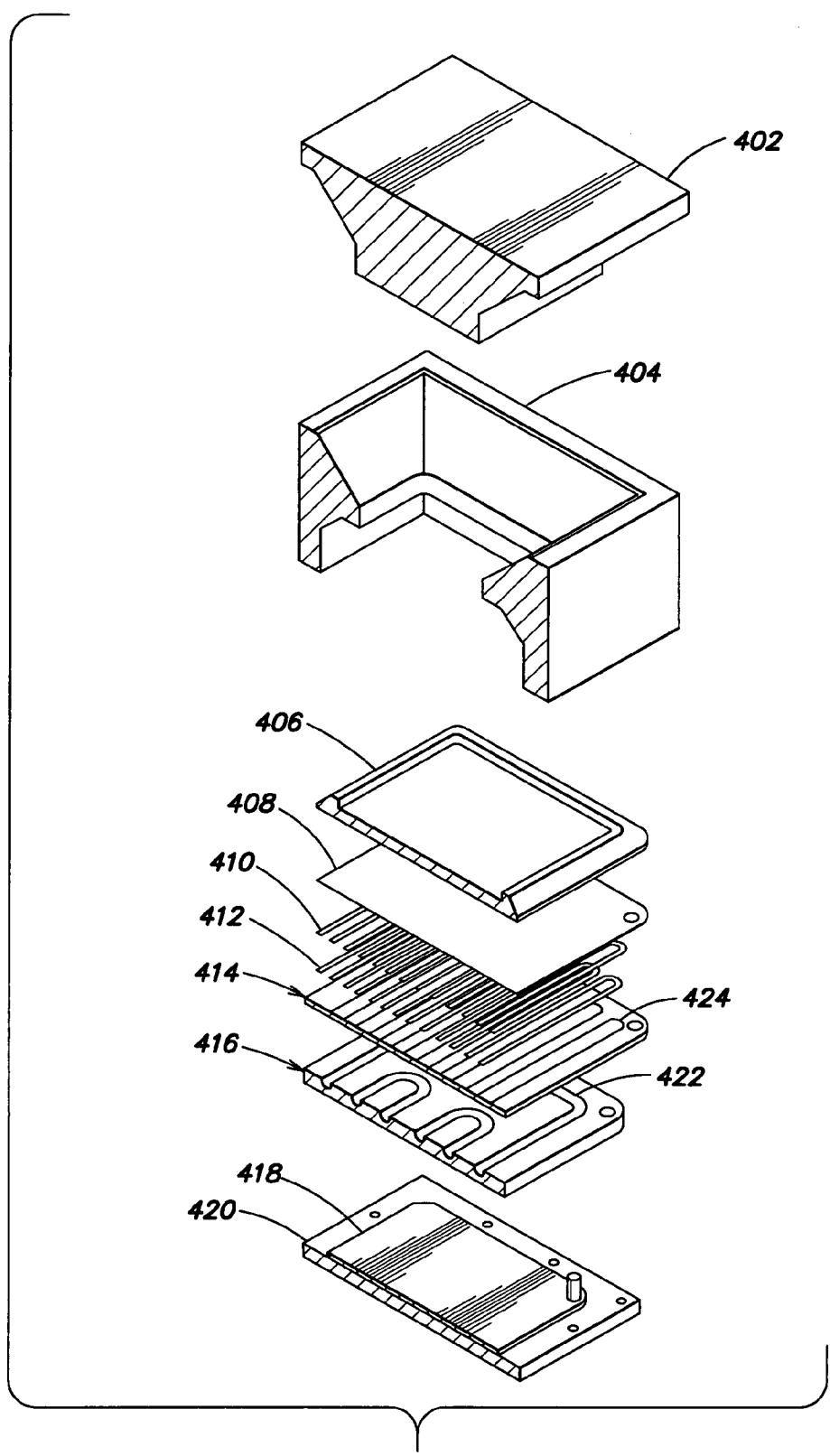
FIG. 31 is an exploded parts view of the compression mold of FIG. 30.

FIGS. 30–36 illustrate another embodiment in which a heating apparatus is incorporated into a compression mold 400. The closed compression mold is shown in FIG. 30. FIG. 31 is an exploded sectional view showing the various parts of the compression mold, which include in serial order from top to bottom:

core 402;
ring 404;
mold insert 406;
upper dielectric layer 408;
heating element 410;
lower dielectric layer 412;
heater plate 414;
cooling plate 416;
insulating board 418; and
backing plate 420.

Figure 33:
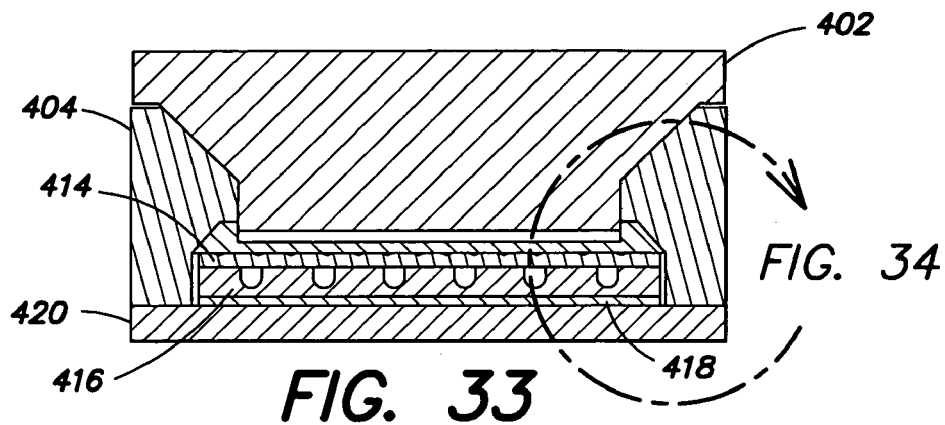
FIG. 33 is a schematic cross-sectional view of the assembled components of FIG. 31.
Figure 34:
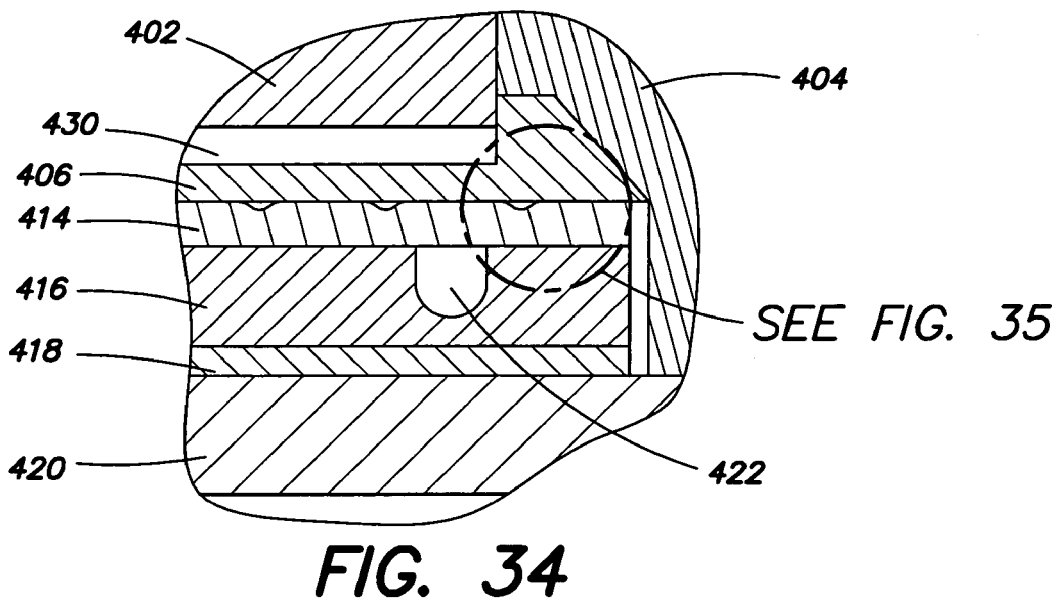
FIG. 34 is an enlarged fragmentary view of the encircled section 34 in FIG. 33.
Figure 35:
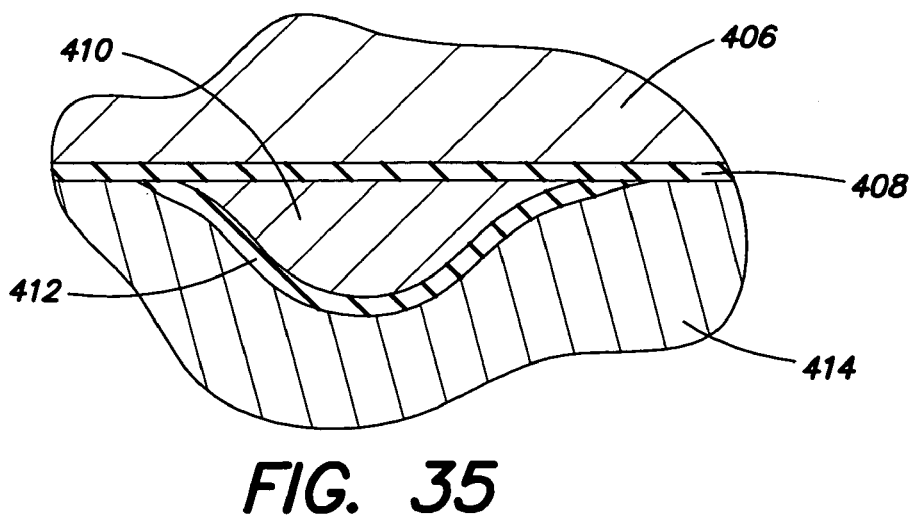
FIG. 35 is an enlarged fragmentary view of the encircled section 35 in FIG. 34.

The assembled components are shown in cross section in FIG. 33. FIGS. 34–35 are enlarged sectional views.

Figure 32:
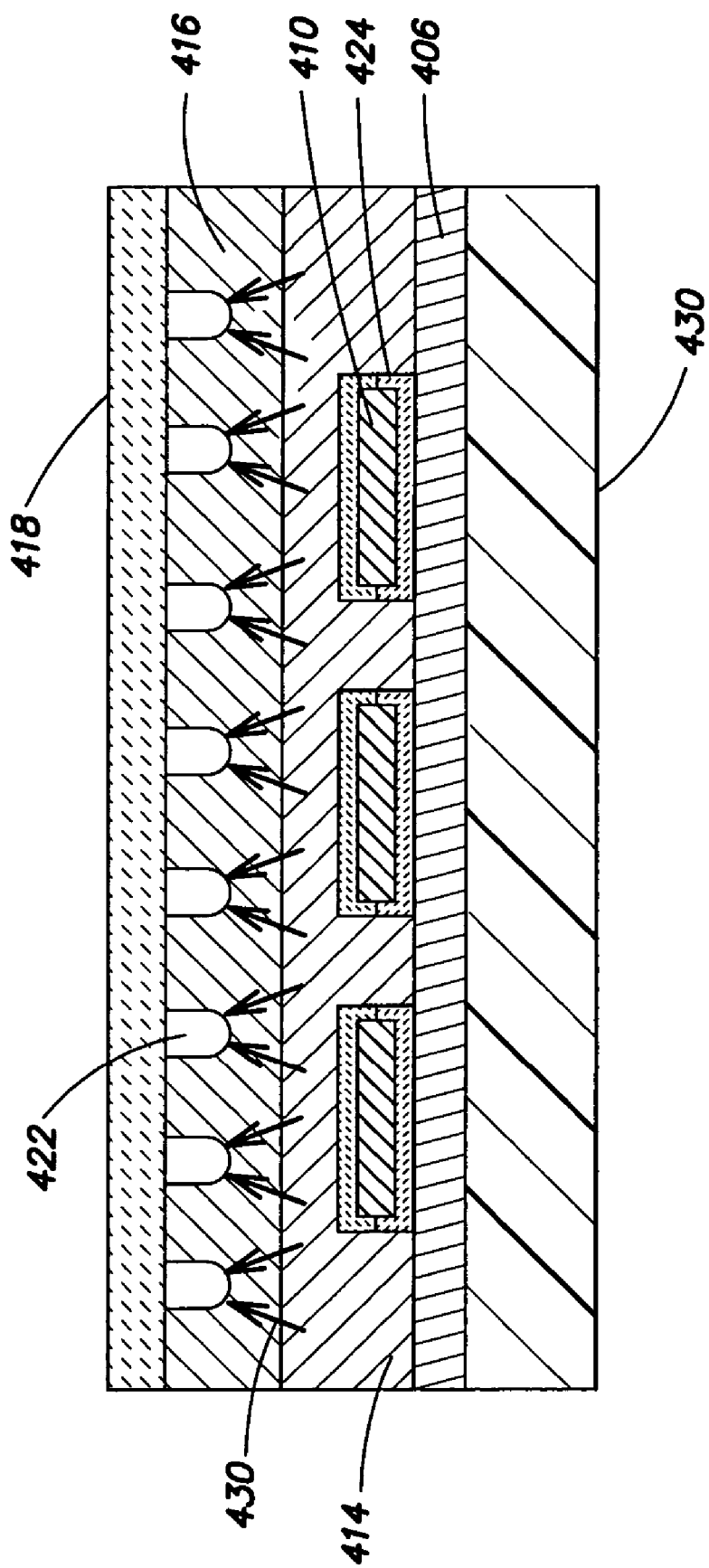
FIG. 32 is a schematic fragmentary view of the heating element and adjacent layers of the compression mold of FIG. 30.

A schematic partial cross section in FIG. 32 can be used to describe the inductive heating of the mold insert 406 and heater plate 414, and subsequent cooling of the heater plate 414. In FIG. 32, the insulating board 418 (now shown on top) provides thermal insulation. The next layer is the cooling plate 416 in which cooling passages 422 are provided for intermittent cooling, as described in the process below. The next layer is the ferromagnetic heater plate 414, and below that the mold insert 406 and molded part 430. The electrically-conductive element 410 is disposed in grooves 424 within the heater plate 414. A current in coil 410 generates a magnetic flux which induces an eddy current in both heater plate 414 and the adjacent mold insert 406. The heat generated in the mold insert 406 is then transferred to the adjacent article 430 (being molded in ring 404, between core 402 and mold insert 406). In this example, the article 430 is a bipolar plate or fuel cell. More heat will be transferred from the mold insert 406 to the adjacent article 430, than transferred to the heater plate 414. The cooling channels 422 in cooling plate 416 allow for intermittent cooling of the heater plat 414 (arrows 430 show heat being drawn from plate 414). In alternative embodiments, only one of heater plate 414 and mold insert 406 is ferromagnetic.

Figure 36:
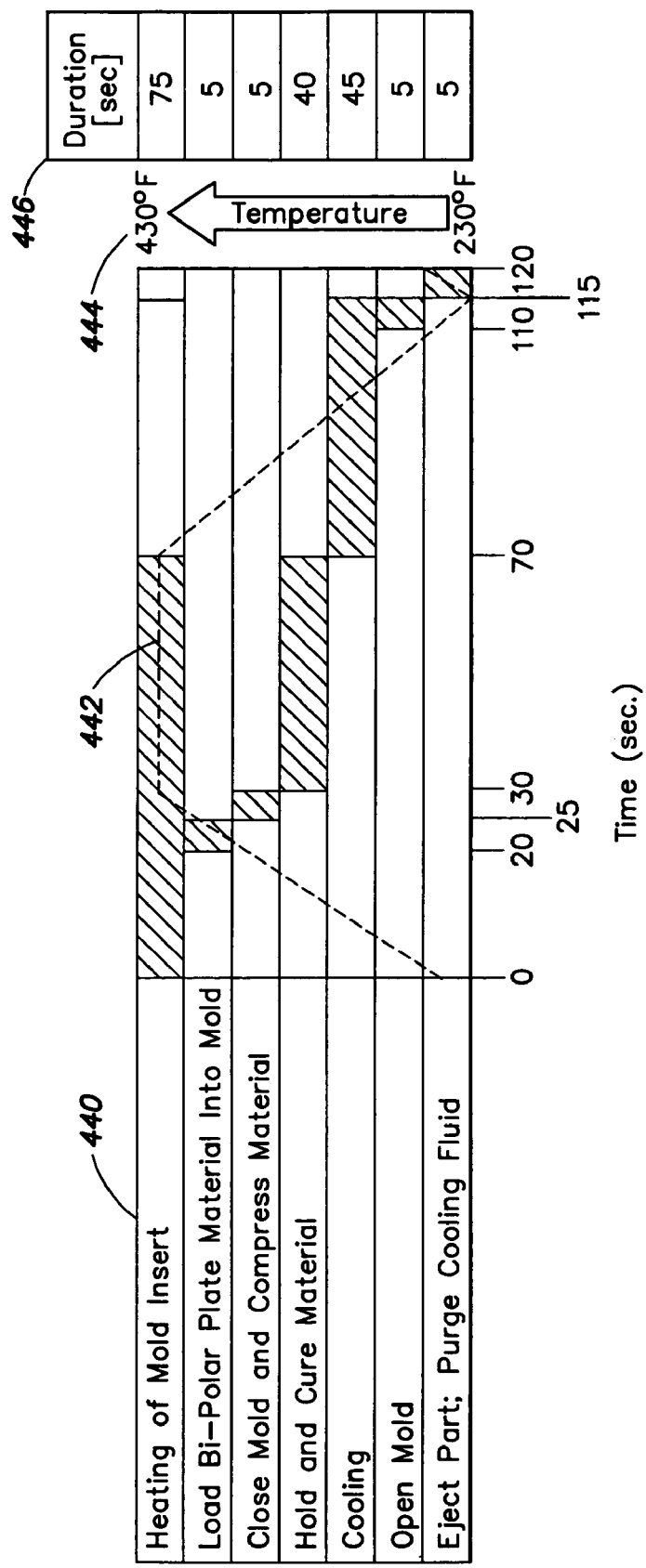
FIG. 36 is a timing diagram of a compression molding method.

According to one method embodiment described in FIG. 36, the apparatus shown in FIGS. 30–35 can be used as follows. The steps 440 of the method are shown in the leftmost column 440 of FIG. 36; the horizontal axis is time in seconds (sec). The dotted line 442 represents the temperature of the heater plate 414, according to a temperature scale 444 on the right side of the graph. The duration 446 of each method step is provided on the far right side of the graph. During this molding cycle, the change in mold temperature is 200° F., going from 230 to 430° F. The goal is to heat and cool the heater plate 414 within the shortest time, in order to reduce the overall cycle time.

In a first step at the start of a new cycle, the mold insert 406 has been heated to a maximum temperature of 430° F. During an initial 30 seconds of the cycle, the temperature of the heater plate 414 increases from 230 to 430° F. During a latter portion of this heat-up step, the molding material is loaded into the mold (at t=20–25 sec of the cycle). When the mold surface temperature reaches the high temperature of 430° F., the mold can be closed and compression applied (at t=25–30 sec of the cycle). During a hold and cure stage (t=30–70 sec), the mold temperature is maintained at 430° F. After holding the molded article for 40 seconds at 430° F., the cooling portion of the cycle begins. A cooling medium is applied (at t=70 sec) to the cooling channels in the mold base, and heat is drawn out of the heater plate 414, and consequently out of mold insert 406 and the molded article 430. The temperature of heater plate 414 steadily drops (from t=70–115 sec) until the mold can be opened (after 45 seconds) and the part ejected (at t=115 sec). The temperature of the mold insert is now 230° F. The cooling channels are then purged of cooling fluid (from t=115–120 sec) so that the heater plate 414 is at its low temperature of 230° F.; at the same time, heating element 410 is turned on to resume heating of the mold insert 406. This last step takes about 5 seconds. The overall cycle time is about 2 minutes.

Additional Embodiments and Alternatives

The heater coil may be any type of material or element that is electrically conductive (with varying levels of resistivity) for purposes of generating an alternating magnetic field when supplied with an alternating electric current. It is not limited to any particular form (e.g., wire, strand, coil, thick or thin film, pen or screen printing, thermal spray, chemical or physical vapor deposition, wafer or otherwise), nor to any particular shape.

A nickel chromium heater coil is described in one or more implementations herein, as being a substantially more resistive material than copper. Other "resistive conductor" heater coil materials include for example alloys of nickel, tungsten, chromium, aluminum, iron, copper, etc.

The article being heated can be any object, substrate or material (gas, liquid, solid or combination thereof) which is wholly or partly ferromagnetic and itself can be inductively heated by the application of a magnetic flux to induce eddy currents therein, or which receives heat by transfer from another article that is directly or indirectly being inductively heated. There is no restriction on the geometry, dimensions and/or physical location of the article with respect to the heater coil.

The article which undergoes inductive heating is not limited to a single article, e.g., a magnetic core as described in certain embodiments, but may include multiple articles. In addition to (or instead of) a core as the heated article, the ultimate material to be heated may be an electrically conductive material (such as aluminum or magnesium) passing through a flow passage in the core. The material in the flow passage can itself be heated by induction and/or by transfer of heat from the core.

A slotted yoke is described as one implementation of an article which closes the magnetic flux loop (with the core), but is less efficient in terms of inductive heating because the slots (essentially air gaps) create discontinuities or restrictions in the magnetic field. Many other structures can be used to create such discontinuities or restrictions, for example, portions of the yoke can be made of materials (other than air) which are not magnetically permeable or substantially less permeable, than the ferromagnetic core, or the yoke can be made from ferrite, fluxtron or similar materials with high resistivity to the flow of eddy currents. Also, yoke is used broadly and is not limited to a specific structure, shape or material.

The heater coil may be formed in a serpentine pattern disposed on or adjacent a surface of the article and provide a magnetic field in alternating directions (with respect to position) across the article. The heater coil may be formed in a cylindrical pattern wrapped around a three dimensional article and provide a magnetic field in the same direction (with respect to position) inside the coil. In various embodiments, the electrical conductor can be a hollow element or a solid element and it can take various shapes and forms, such as spiral, serpentine, looped spiral or looped serpentine. One benefit of a looped spiral or looped serpentine element is that both electrical leads can exit at the same location. The conductive coils can have a variable pitch (distance between coils), which will affect the resulting magnetic field generation. Depending on available space and desired heating power, the shape and distance between coils can be varied to vary the heating power density. A description of basic heater coil designs is found in S. Zinn and S. L. Semiaten, "*Coil Design and Fabrication*," a 3 part article, published in Heat Treating, June, August and October 1988.

The heating output of the coil is a function of the frequency, current and number of turns of the heating element. This correlation can be described as:

$$I^2 N^2 \sqrt{\omega} = \alpha P_{req}$$

where α is a function of the material and geometry.
I=current
N=number of turns
Ω=frequency of power source
$P_{req}$=power required to heat material The heating and cooling channel configurations can be varied to obtain a desired heating profile or pattern for speed, uniformity and efficiency.

Figure 43:
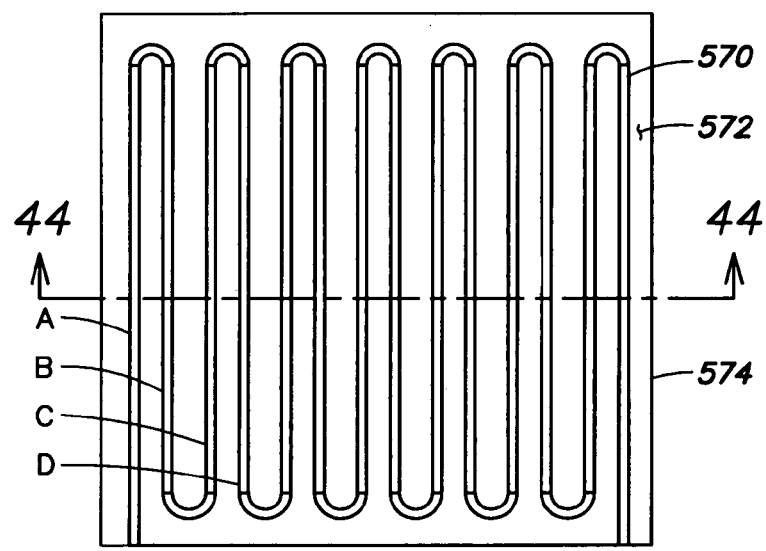
FIG. 43 is a schematic elevational view of a planar serpentine coil mounted on a plate.
Figure 44:
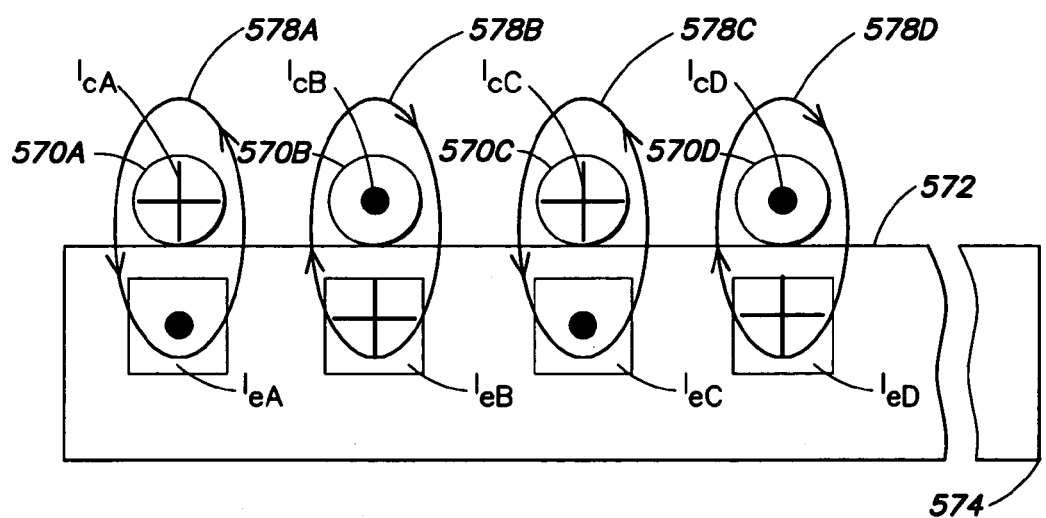
FIG. 44 is a cross-sectional schematic view of the coil and plate of FIG. 43.
Figure 45:
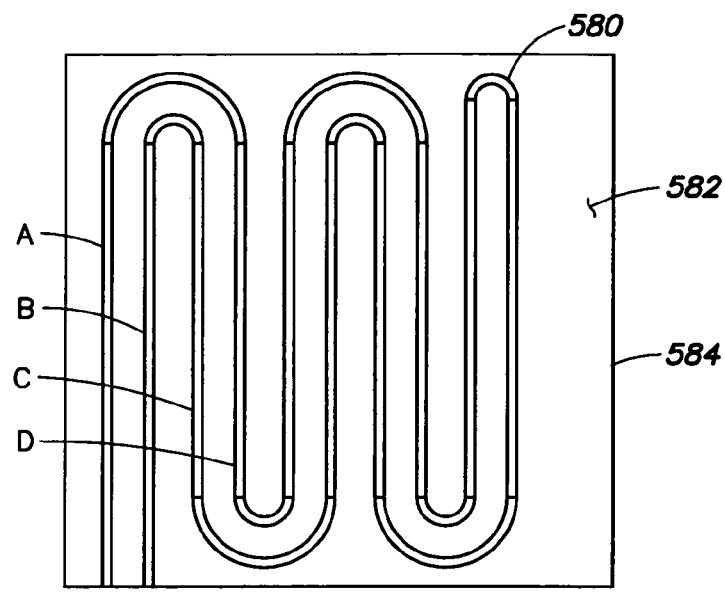
FIG. 45 is a schematic elevational view of a planar looped serpentine coil mounted on a plate.
Figure 46:
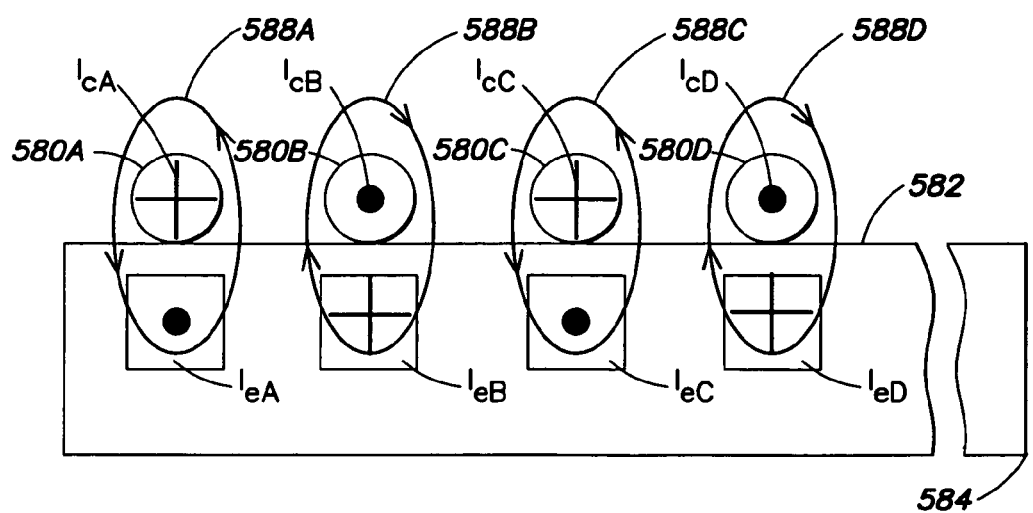
FIG. 46 is a cross-sectional schematic view of the coil and plate in FIG. 45.

FIGS. 37–46 illustrate how different induction fields are created by different configurations of the heater coil (heating elements). The examples include a coil shaped in the form of: a cylindrical helical coil (FIGS. 37–38); a planar spiral coil (FIGS. 39–40); a planar looped spiral coil (FIGS. 41–42); a planar serpentine coil (FIGS. 43-44) and a planar looped serpentine coil (FIGS. 45–46). A perspective view is provided, as well as a cross section. The magnetic flux is shown by arrows, the coil current by $I_C$ and the eddy current by $I_e$.

The following formulas can be used, for example, to calculate the inductive power $P_I$ produced by a coil having the respective shape:

Spiral:
$$P_I = \frac{\pi^3}{16} R^2 j_{gen}^2 d^2 \left[ \frac{d}{d + \Delta_1} \right] \sqrt{\mu \rho \omega}$$

Serpentine:
$$P_I = \frac{\pi^2}{4} R^2 j_{gen}^2 d^2 \left[ \frac{d}{d + \Delta_1} \right] \sqrt{\mu \rho \omega}$$

Figure 37:
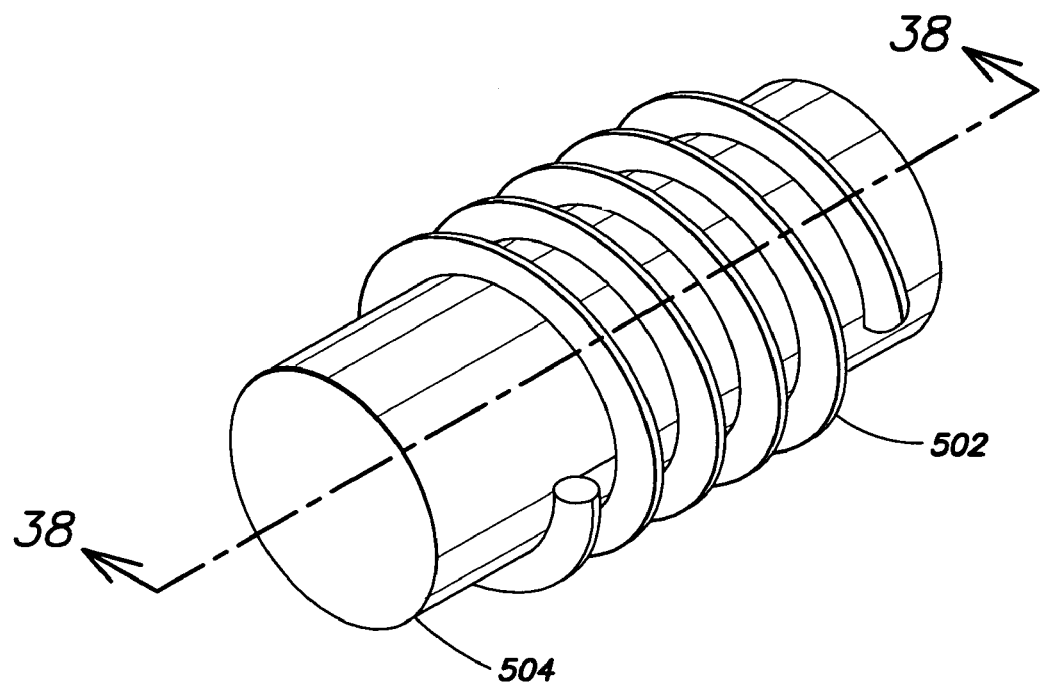
FIG. 37 is a schematic perspective view of a cylindrical heater coil wrapped around a core.
Figure 38:
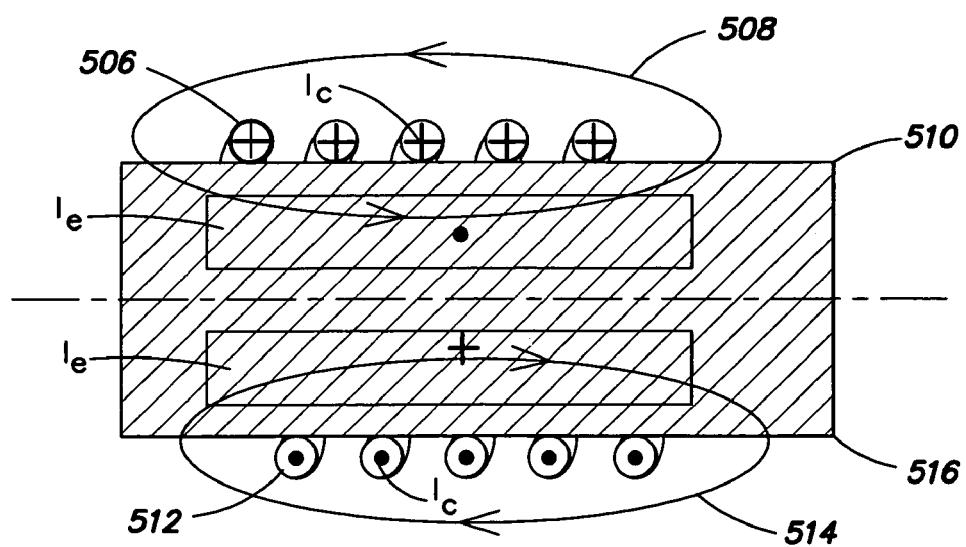
FIG. 38 is a schematic cross-sectional view of the coil and core of FIG. 37.

Looped Spiral:
$$P_I = \frac{\pi^3}{16} R^2 j_{gen}^2 d^2 \left[ \frac{d}{d + \Delta_1} \right] \sqrt{\mu \rho \omega}$$

where R=eddy current resistance of ferromagnetic load
$j_{gen}$=current density in the coil
d=diameter of the coil
$\Delta_1$=distance between coils
μ=magnetic permeability of ferromagnetic load
ρ=resistivity of ferromagnetic load
ω=angular frequency of eddy currents in load FIGS. 37–38 illustrate a cylindrical helical coil 502 wrapped around a solid cylindrical ferromagnetic core 504. FIG. 38 shows in cross-section an upper row of coil elements 506, for which the current direction $I_C$ is into the page, generating a magnetic flux 508 in a clockwise direction in an upper portion 510 of the core, which generates an eddy current $I_e$ coming out of the page in the upper portion of the core. In a lower set of coil elements 512, the current is coming out of the page, generating a magnetic field 514 in a clockwise direction in a lower portion 516 of the core and generating an eddy current $I_e$ going into the page in the lower portion of the core. The upper and lower magnetic fields 508, 514 reinforce each other in the core 504.

Figure 39:
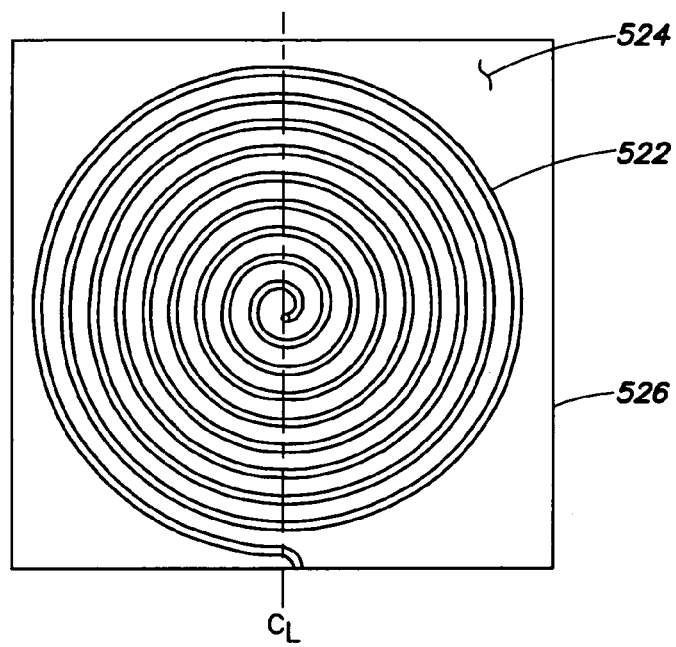
FIG. 39 is a schematic elevational view of a planar spiral coil mounted on a plate.
Figure 40:
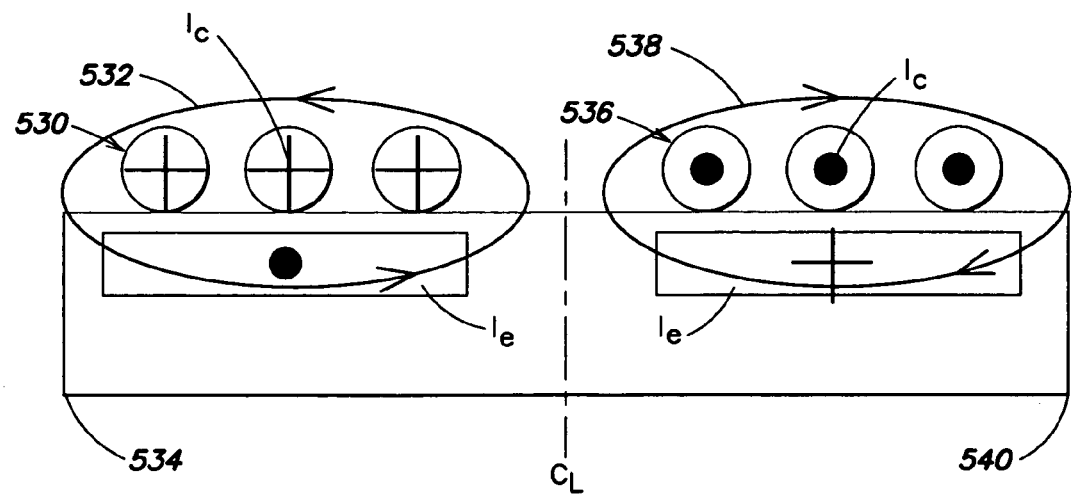
FIG. 40 is a cross-sectional schematic view of the coil and plate of FIG. 39.

FIGS. 39–40 illustrate a planar spiral coil 522 mounted on an upper surface 524 a flat ferromagnetic article 526. FIG. 40 shows in cross-section a left set 530 and a right set 536 of coil elements adjacent to upper surface 524 of the article. The left set 530 of coil elements have current $I_C$ going into the page, and generate a counter-clockwise magnetic field 532 in the left-portion 534 of the article, with an eddy current $I_e$ coming out of the page. The directions are reversed for the coil current $I_C$, magnetic field 538, and eddy current $I_e$ on the right portion 540 of the article.

Figure 41:
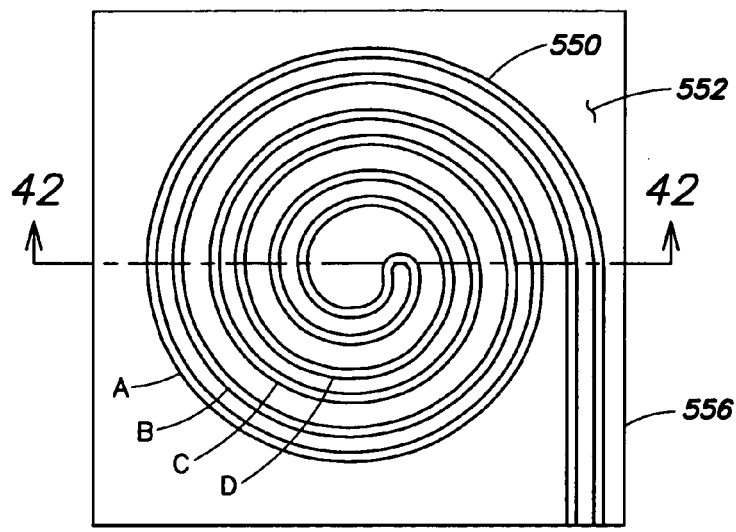
FIG. 41 is a schematic elevational view of a planar looped spiral coil mounted on a plate.
Figure 42:
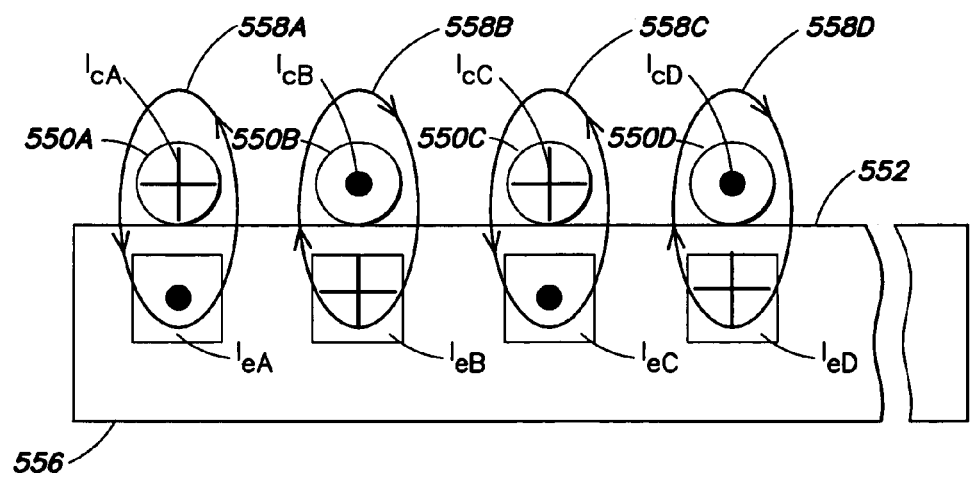
FIG. 42 is a cross-sectional schematic view of the coil and plate of FIG. 41.

FIG. 41–42 illustrate a planar looped spiral coil 550 mounted on an upper surface 552 of a flat ferromagnetic article 556. Four adjacent coil sections in the looped spiral are identified as A, B, C, and D. FIG. 42 shows in cross-section the directions of the respective coil current $I_C$, magnetic field 558, and eddy current $I_e$ for each of the four identified coil sections.

FIGS. 43–44 illustrate a planar serpentine coil 570 mounted on an upper surface 572 of a flat ferromagnetic article 574. Four adjacent coil sections in the serpentine coil are labeled A, B, C, and D. FIG. 44 shows in cross-section the directions of the respective coil current $I_C$, magnetic field 578, and eddy current $I_e$ for the four coil sections.

FIGS. 45–46 illustrate a planar looped serpentine coil 580 mounted on an upper surface 582 of a flat ferromagnetic article 584. Four adjacent coil sections are labeled A, B, C, and D. FIG. 46 shows in cross section the directions of the coil current, $I_C$, magnetic field 588, and eddy current $I_e$ for the four coil sections.

The RMS current in the coil and power provided by the coil can be controlled by varying the period (the fundamental frequency) of the pulses at constant pulse width, or by varying the width of the pulses at the constant fundamental frequency of the pulses provided to the coil, or by both.

By fundamental frequency it is meant the frequency of a pulse repetition. Each pulse may contain multiple sloping portions or steep edges (the harmonic portions), but between each pulse is a relatively larger delay period. The fundamental frequency is the frequency of the lowest periodic division which includes one such delay.

By effective frequency it is meant the frequency of a pure sinusoidal signal which provides the same inductive heating effect as the current pulse signal.

By high-frequency harmonics it is meant the harmonics at frequencies above (at a multiple of) the fundamental or root frequency.

Figure 47:
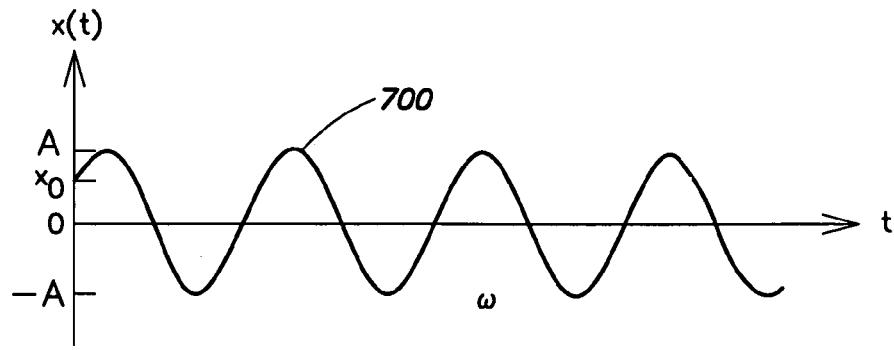
FIG. 47 is a graph of amplitude versus time showing a single sine wave.
Figure 48:
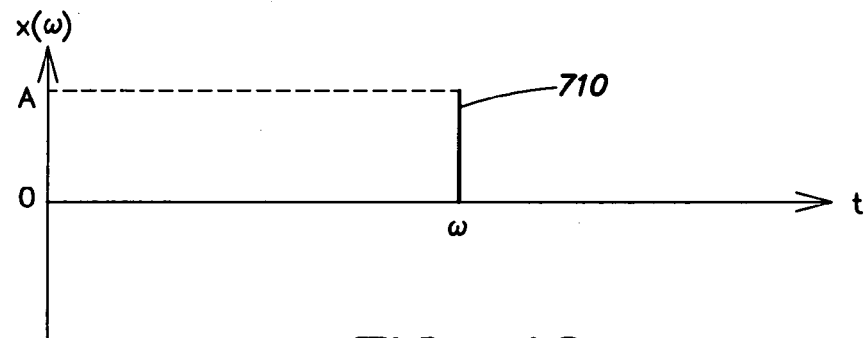
FIG. 48 is a graph of the frequency spectrum of a sine wave of FIG. 47.
Figure 49:
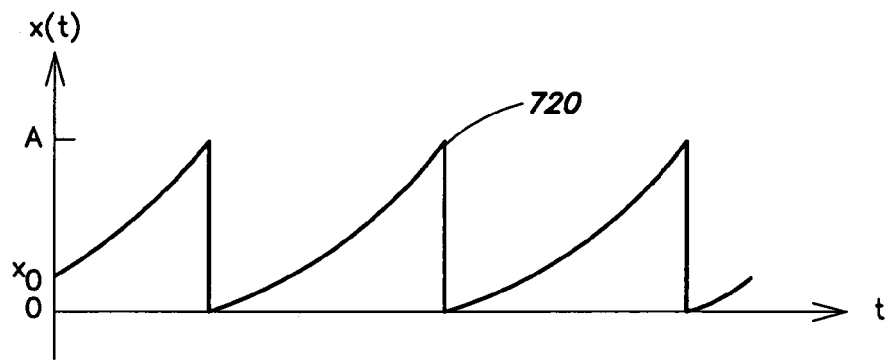
FIG. 49 is a graph of amplitude versus time showing a current pulse signal with high frequency harmonics.
Figure 50:
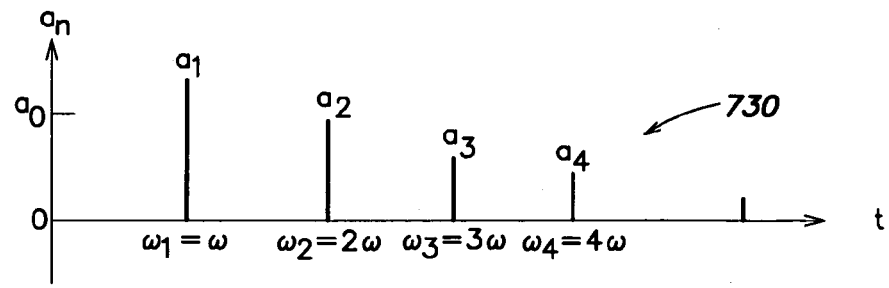
FIG. 50 is a graph showing the frequency spectrum of the current pulse signal of FIG. 49.

A spectrum analyzer can be used to analyze a current pulse signal with high frequency harmonics. By way of comparison, FIG. 47 shows the wave form 700 of a single sine wave of amplitude A and frequency ω, where the wave form is described by A sin(ωt+φ₀). FIG. 48 shows the frequency spectrum 710 of this single sine wave 700, where all of the amplitude A is carried by a single frequency ω. In contrast, FIG. 49 shows an example of a current pulse signal with high-frequency harmonics 720 (also referred to as a chopped wave). FIG. 50 shows the spectrum 730 of the chopped wave 720, which is a sum of cosine waves, starting with a root frequency ω of amplitude $a_1$ and the high frequency harmonics above the root frequency of 2ω and amplitude $a_2$, 3ω and amplitude $a_3$, 4ω and amplitude $a_4$, etc. The amplitudes are generally decreasing as the frequency increases. Preferably, the amplitudes stay high as the frequency increases.

In a heater circuit, the two things that generally dictate the amount of power (heat) generated are the frequency and the current. The current has a much bigger effect than the frequency as seen by the equation:

$$P = I^2 \sqrt{\omega}$$

Thus, preferably, the current is kept high while increasing the frequency.

The current pulse signal with high frequency harmonics is a wave with steep edges and long pauses between the jumps in voltage. It may be referred to as a chopped wave. The chopped wave can provide ten times the power of a sine wave of the same root frequency where the amplitude of the high frequency harmonics is kept high.

In summary, the "root frequency" is the smallest time one can break a wave into and still have it be periodic. The high frequency harmonics are waves of frequency above the root frequency and together with the root frequency "build" the desired wave. Generally, it is desirable is to generate large amplitudes within the harmonics so that the power stays high. It can be desirable to use a root frequency of 50–60 Hz because it is readily available from the grid; the power supply can then "chop" the sinusoidal wave coming off the grid to generate the high frequency harmonics that are desired.

A current pulse signal with high frequency harmonics has been described as including both the fundamental (root) frequency, or first harmonic, and higher harmonics above the root frequency. The signal may thus be understood as being constructed from such components. Such construction should be understood to include, in the physical world, constructing a pulse signal by starting with a root frequency signal (e.g., sinusoidal) and removing portions of waves to retain one or more harmonic components. It would also include, for example, starting from a rectangular pulse and changing the shape of the rectangular pulse.

In addition, the previous examples (FIGS. 3–6) show one pulse generated in each half-period of the sinusoidal signal. However, the sinusoidal signal could alternatively be "chopped" multiple times per half-period, generating multiple pulses per half-period. Also, instead of using a bi-polar switch, one can first rectify the sinusoidal signal with a diode bridge, before chopping the signal (one or multiple times each half-period).

Figure 51:
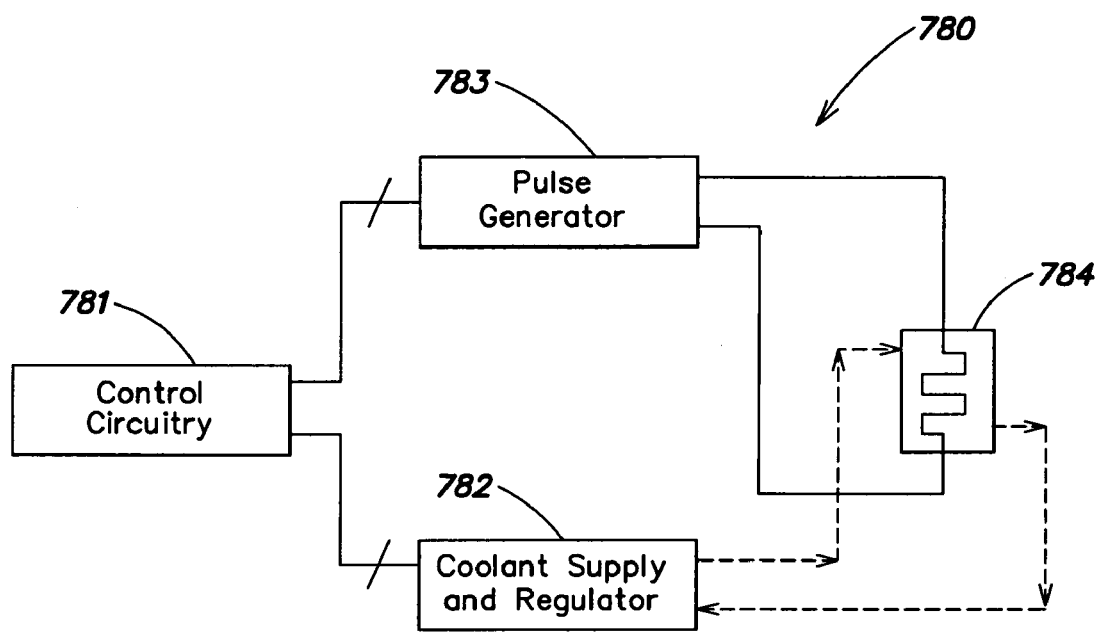
FIG. 51 is a schematic view of a control circuit for a heating and cooling apparatus.

Select embodiments described herein utilize a cooling medium for reducing the temperature of the heated article, e.g., intermittently, while not heating the article. FIG. 51 shows schematically a heating and cooling apparatus 780 having a control circuit 781 to alternately and/or simultaneously, as desired, supply a cooling medium from a coolant supply and regulator 782, and supply a current pulse signal from a pulse generator 783, to an apparatus 784 which includes a heating element, a cooling passage and an article to be heated and cooled.

Other embodiments of the invention will be apparent to those skilled in the art from consideration of the specification and practice of the invention disclosed herein. It is intended that the specification and examples be considered as exemplary only, with a true scope of the invention being indicated by the following claims.

The invention claimed is:

1. An apparatus comprising:
   a heater coil for inductive heating; and
   a power source for supplying to the heater coil non-sinusoidal current pulses having steeply varying portions providing at least 50% pulse energy in high frequency harmonics in the heater coil, wherein the heater coil generates a magnetic flux for inductive heating of an article.

2. The apparatus of claim 1, wherein the high frequency harmonics increase an inductive portion of heating power of the coil compared to a resistive portion.

3. The apparatus of claim 2, wherein the current pulses produce an increased amount of inductive heating without exceeding a current limit of the heater coil.

4. The apparatus of claim 1, wherein the current pulses produce an increased amount of inductive heating compared to a sinusoidal current signal having a same root frequency.

5. The apparatus of claim 1, wherein the current pulses have an associated energy component above a border frequency of the heater coil.

6. The apparatus of claim 1, wherein the current pulses increase an inductive portion of heating power without increasing the Root Mean Square (RMS) current in the heater coil.

7. The apparatus of claim 1, wherein the power source receives as input a line frequency sinusoidal current signal.

8. The apparatus of claim 1, wherein the heater coil includes an electrically resistive conductor for generating resistive heat in the coil.

9. The apparatus of claim 8, wherein the heater coil is in thermal communication with the article.

10. The apparatus of claim 1, wherein the heater coil is inductively coupled to a load which includes the article.

11. The apparatus of claim 10, wherein the load includes a ferromagnetic substrate or article and the magnetic flux induces eddy currents in the ferromagnetic substrate or article.

12. The apparatus of claim 10, wherein the load includes a closed or semi-closed loop of ferromagnetic components for the magnetic flux.

13. The apparatus of claim 12, wherein the components include a ferromagnetic core and a ferromagnetic yoke which form a substantially closed loop.

14. The apparatus of claim 10, wherein the load includes a ferromagnetic core and the heater coil is at least partially embedded in the core.

15. The apparatus of claim 10, wherein the load includes a ferromagnetic core and a ferromagnetic yoke and the heater coil is disposed between or embedded within at least one of the core and yoke.

16. The apparatus of claim 10, wherein the load includes a passage for a flowable material.

17. The apparatus of claim 10, wherein the load includes a molding surface for molding a formable material.

18. The apparatus of claim 10, wherein the heater coil is positioned in the load for preferential heating of a portion of the article.

19. The apparatus of claim 1, wherein the heating coil forms a serpentine pattern on a surface of the article.

20. The apparatus of claim 1, wherein the heater coil forms a cylindrical pattern wrapped around the article.

21. The apparatus of claim 1, wherein the article includes a ferromagnetic first portion and a ferromagnetic second portion and wherein the inductive heating is more concentrated in the first portion compared to the second portion.

22. The apparatus of claim 21, wherein the second portion creates discontinuities or restrictions to the flow of eddy currents.

23. The apparatus of claim 22, wherein the second portion has slots for creating the discontinuities or restrictions.

24. A method of supplying current to a heater coil of a heating apparatus for inductive heating, the method comprising: supplying to the heater coil non-sinusoidal current pulses having steeply varying portions providing at least 50% pulse energy in high frequency harmonics in the heater coil, wherein the heater coil generates a magnetic flux for inductive heating of an article.

25. The method of claim 24, including the step of increasing the amplitude of at least one harmonic component of the high frequency harmonics for increasing the power of the current pulses.

26. The method of claim 24, including the step of adjusting the harmonic energy content of the current pulses so as to adjust a ratio between inductive and resistive heating power produced by the coil.

27. The method of claim 24, including the step of providing the heater coil at least partially in contact with or embedded in the article.

28. The method of claim 24, including the steps of:
inductively coupling the heater coil to a ferromagnetic substrate;
supplying the current pulses to the heater coil for inducing an eddy current to heat the ferromagnetic substance;
transmitting the heat from the ferromagnetic substrate to the article; and
intermittently cooling the ferromagnetic substrate by reducing the current pulses supplied to the heater coil to reduce the induced heating.

29. The method of claim 28, wherein the intermittent cooling includes one or more of: supplying a cooling medium to cool the substrate, and drawing heat from the substrate.

30. The method of claim 28, including the steps of:
providing a flow passage in or adjacent to the ferromagnetic substrate; and
heating a flowable material in the flow passage.

31. The method of claim 24, including the step of providing the heater coil inductively coupled to a ferromagnetic substrate, wherein the heater coil forms:
a) a serpentine pattern disposed on or adjacent a surface of the substrate which provides a magnetic field in alternating directions across the substrate; or
b) a cylindrical pattern wrapped around the substrate which provides a magnetic field in the same direction inside the coil.

32. The method of claim 31, wherein the heater coil is the serpentine pattern and is shaped in the form of a spiral, serpentine, looped spiral, or looped serpentine.

33. The method of claim 31, wherein the heater coil is the cylindrical pattern and is shaped in the form of a helical, serpentine, looped spiral or looped serpentine.

34. The method of claim 24, wherein the heater coil comprises a nickel chromium alloy or a tungsten alloy.

35. The method of claim 24, wherein the article comprises: a nozzle; a sprue bar; a melt channel; a water heater; a blow mold; a compression mold; or a molding surface.

36. The method of claim 24, wherein the heater coil comprises one or more of a thermal-sprayed layer and a thin film layer.

37. The method of claim 24, wherein the heater coil is inductively coupled to a ferromagnetic substrate and the power and/or frequency spectrum of the current pulses are adjusted to accommodate different configurations of the heater coil and ferromagnetic substrate.

* * * * *